(12) United States Patent
Jung et al.

(10) Patent No.: US 12,527,524 B2
(45) Date of Patent: Jan. 20, 2026

(54) BED-BASED BALLISTOCARDIOGRAM APPARATUS AND METHOD

(71) Applicants: Hill-Rom Services, Inc., Batesville, IN (US); Georgia Tech Research Corporation, Atlanta, GA (US)

(72) Inventors: Hewon Jung, Atlanta, GA (US); Jacob P. Kimball, Douglasville, GA (US); Omer T. Inan, Marietta, GA (US); Timothy J. Receveur, Guilford, IN (US); Eric D. Agdeppa, Cincinnati, OH (US)

(73) Assignees: Hill-Rom Services, Inc., Batesville, IN (US); Georgia Tech Research Corporation, Atlanta, GA (US)

( * ) Notice: Subject to any disclaimer, the term of this patent is extended or adjusted under 35 U.S.C. 154(b) by 402 days.

(21) Appl. No.: 17/189,935

(22) Filed: Mar. 2, 2021

(65) Prior Publication Data
US 2021/0298683 A1 Sep. 30, 2021

Related U.S. Application Data

(60) Provisional application No. 63/086,724, filed on Oct. 2, 2020, provisional application No. 63/001,585, filed on Mar. 30, 2020.

(51) Int. Cl.
*A61B 5/00* (2006.01)
*A61B 5/0205* (2006.01)
(Continued)

(52) U.S. Cl.
CPC .......... *A61B 5/6892* (2013.01); *A61B 5/0205* (2013.01); *A61B 5/1102* (2013.01);
(Continued)

(58) Field of Classification Search
CPC ... A61B 5/6892; A61B 5/0205; A61B 5/1102; A61B 5/7221; A61B 5/7246;
(Continued)

(56) References Cited

U.S. PATENT DOCUMENTS

| 299,649 A | 6/1884 | Keep et al. |
| 1,758,546 A | 5/1930 | Wartmann |

(Continued)

FOREIGN PATENT DOCUMENTS

| CN | 109431482 A | 3/2019 |
| CN | 109893113 A | 6/2019 |

(Continued)

OTHER PUBLICATIONS

Extended European Search Report for European Patent Application No. 21165658.2 dated Jun. 16, 2021 (10 pages).

(Continued)

*Primary Examiner* — Jennifer Robertson
*Assistant Examiner* — Nidhi N Patel
(74) *Attorney, Agent, or Firm* — Barnes & Thornburg LLP

(57) ABSTRACT

A bed-based ballistocardiogram (BCG) enables non-invasive cardiovascular monitoring of a patient on a patient bed. A method for bed-based BCG recordings includes (1) creating templates for standing BCG signals obtained from subjects in a prior study, and (2) quantifying the distance between these templates and BCG waveforms obtained in different body positions on the patient bed for a new set of subjects. The different body positions on the patient bed include supine, left lying, right lying, prone, and seated.

19 Claims, 15 Drawing Sheets

(51) Int. Cl.
*A61B 5/11* (2006.01)
*G01G 19/44* (2006.01)
*G01G 19/50* (2006.01)
*G01G 19/52* (2006.01)
*G16H 40/67* (2018.01)
*A61B 5/08* (2006.01)
*A61G 7/015* (2006.01)
*A61G 7/018* (2006.01)

(52) U.S. Cl.
CPC .......... *A61B 5/7221* (2013.01); *A61B 5/7246* (2013.01); *A61B 5/725* (2013.01); *G01G 19/445* (2013.01); *G01G 19/50* (2013.01); *G01G 19/52* (2013.01); *G16H 40/67* (2018.01); *A61B 5/0816* (2013.01); *A61B 5/7278* (2013.01); *A61B 5/7435* (2013.01); *A61B 5/7475* (2013.01); *A61B 2562/0252* (2013.01); *A61B 2562/046* (2013.01); *A61G 7/015* (2013.01); *A61G 7/018* (2013.01); *A61G 2200/322* (2013.01); *A61G 2200/325* (2013.01); *A61G 2200/327* (2013.01); *A61G 2203/44* (2013.01)

(58) Field of Classification Search
CPC ..... A61B 5/725; A61B 5/0816; A61B 5/7278; A61B 5/7435; A61B 5/7475; A61B 5/0255; A61B 5/0803; A61B 5/6891; A61B 5/024; A61B 5/7203; A61B 5/7235; A61B 2562/0252; A61B 2562/046; G01G 19/445; G01G 19/50; G01G 19/52; G16H 40/67; A61G 7/015; A61G 7/018; A61G 7/0527; G61G 2200/322; G61G 2200/325; G61G 2200/327; G61G 2200/44

See application file for complete search history.

(56) References Cited

U.S. PATENT DOCUMENTS

| | | | |
|---|---|---|---|
| 1,969,554 A | 8/1934 | Gloudemans | |
| 2,249,645 A | 7/1941 | Applegarth, Sr. | |
| 2,260,715 A | 10/1941 | Ketchen | |
| 2,425,790 A | 8/1947 | Fletcher | |
| 2,430,702 A | 11/1947 | Bohannan | |
| 2,644,332 A | 7/1953 | Ulrich | |
| 2,735,291 A | 2/1956 | Quinn | |
| 2,780,693 A | 2/1957 | McClellan | |
| 2,784,395 A | 3/1957 | Gorby | |
| 2,818,477 A | 12/1957 | Golhofer | |
| 2,819,612 A | 1/1958 | Borgstrom et al. | |
| 2,990,899 A | 7/1961 | DeBella | |
| 3,096,061 A | 7/1963 | Bertell | |
| 3,217,818 A | 11/1965 | Engelsher et al. | |
| 3,325,799 A | 6/1967 | Farris | |
| 3,338,323 A | 8/1967 | Swersey | |
| 3,360,062 A | 12/1967 | Potter | |
| 3,418,847 A | 12/1968 | Nantz | |
| 3,439,358 A | 4/1969 | Salmons | |
| 3,492,865 A | 2/1970 | Johnson | |
| 3,504,540 A | 4/1970 | Pradko et al. | |
| 3,512,595 A | 5/1970 | Laimins | |
| 3,533,095 A | 10/1970 | Collins | |
| 3,589,457 A | 6/1971 | Joos | |
| 3,656,478 A | 4/1972 | Swersey | |
| 3,657,475 A | 4/1972 | Peronneau et al. | |
| 3,712,294 A | 1/1973 | Muller | |
| 3,722,611 A | 3/1973 | Tirkkonen | |
| 3,741,328 A | 6/1973 | Anderson et al. | |
| 3,760,794 A | 9/1973 | Bashan | |
| 3,766,344 A | 10/1973 | Nevett | |
| 3,773,124 A | 11/1973 | Bullivant | |
| 3,781,843 A | 12/1973 | Harrison et al. | |
| 3,795,284 A | 3/1974 | Mracek et al. | |
| 3,796,208 A | 3/1974 | Bloice | |
| 3,826,145 A | 7/1974 | McFarland | |
| 3,836,900 A | 9/1974 | Mansfield | |
| 3,852,736 A | 12/1974 | Cook et al. | |
| 3,876,018 A | 4/1975 | Mracek et al. | |
| 3,890,958 A * | 6/1975 | Fister | A61B 5/1102 600/587 |
| RE28,754 E | 3/1976 | Cook et al. | |
| 3,961,201 A | 6/1976 | Rosenthal | |
| 3,961,675 A | 6/1976 | Siegel | |
| 3,972,320 A | 8/1976 | Kalman | |
| 3,974,491 A | 8/1976 | Sipe | |
| 3,988,790 A | 11/1976 | Mracek et al. | |
| 3,991,414 A | 11/1976 | Moran | |
| 3,991,746 A | 11/1976 | Hanna | |
| 4,006,789 A | 2/1977 | Stulz et al. | |
| 4,015,677 A | 4/1977 | Silva et al. | |
| 4,020,482 A | 4/1977 | Feldl | |
| 4,023,633 A | 5/1977 | Swersey et al. | |
| 4,066,506 A | 1/1978 | Levy et al. | |
| 4,067,005 A | 1/1978 | Levy et al. | |
| 4,121,049 A | 10/1978 | Roeber | |
| 4,129,189 A | 12/1978 | Maglecic et al. | |
| 4,140,998 A | 2/1979 | Bettle | |
| 4,175,263 A | 11/1979 | Triplett et al. | |
| 4,179,692 A | 12/1979 | Vance | |
| 4,195,287 A | 3/1980 | McCoy et al. | |
| 4,228,426 A | 10/1980 | Roberts | |
| 4,231,030 A | 10/1980 | Weiss | |
| 4,242,672 A | 12/1980 | Gault | |
| 4,245,651 A | 1/1981 | Frost | |
| 4,263,586 A | 4/1981 | Nicholas | |
| 4,264,904 A | 4/1981 | McCoy et al. | |
| 4,281,730 A | 8/1981 | Swersey et al. | |
| 4,282,412 A | 8/1981 | Florin | |
| 4,295,133 A | 10/1981 | Vance | |
| 4,298,863 A | 11/1981 | Naitus et al. | |
| 4,320,766 A | 3/1982 | Alihanka et al. | |
| 4,336,533 A | 6/1982 | Wettach | |
| 4,337,726 A | 7/1982 | Czekajewski et al. | |
| 4,346,771 A | 8/1982 | Persson et al. | |
| 4,348,562 A | 9/1982 | Florin | |
| 4,363,368 A | 12/1982 | Paddon et al. | |
| 4,411,327 A | 10/1983 | Lockery et al. | |
| 4,420,052 A | 12/1983 | Hale | |
| 4,426,884 A | 1/1984 | Polchaninoff | |
| 4,438,823 A | 3/1984 | Hussels et al. | |
| 4,474,185 A | 10/1984 | Diamond | |
| 4,482,783 A | 11/1984 | Laimins | |
| 4,484,043 A | 11/1984 | Musick et al. | |
| 4,487,276 A | 12/1984 | Swersey et al. | |
| 4,492,281 A | 1/1985 | Van Allen et al. | |
| 4,526,043 A | 7/1985 | Boie et al. | |
| 4,536,755 A | 8/1985 | Holzgang et al. | |
| 4,539,560 A | 9/1985 | Fleck et al. | |
| 4,540,057 A | 9/1985 | Freeman | |
| 4,550,793 A | 11/1985 | Giles | |
| 4,551,882 A | 11/1985 | Swersey et al. | |
| 4,558,757 A | 12/1985 | Mori et al. | |
| 4,565,910 A | 1/1986 | Musick et al. | |
| 4,573,475 A | 3/1986 | Dukes et al. | |
| 4,577,185 A | 3/1986 | Andersen | |
| 4,583,084 A | 4/1986 | Henderson et al. | |
| 4,584,989 A | 4/1986 | Stith | |
| 4,595,016 A | 6/1986 | Fertig et al. | |
| 4,601,356 A | 7/1986 | Muccillo, Jr. | |
| 4,629,015 A | 12/1986 | Fried et al. | |
| 4,633,237 A | 12/1986 | Tucknott et al. | |
| 4,638,307 A | 1/1987 | Swartout | |
| 4,649,759 A | 3/1987 | Lee | |
| 4,657,026 A | 4/1987 | Tagg | |
| 4,700,180 A | 10/1987 | Vance | |
| 4,751,754 A | 6/1988 | Bailey et al. | |
| 4,777,944 A | 10/1988 | Green et al. | |
| 4,793,428 A | 12/1988 | Swersey | |
| 4,796,013 A | 1/1989 | Yasuda et al. | |
| 4,803,744 A | 2/1989 | Peck et al. | |

(56) References Cited

U.S. PATENT DOCUMENTS

| | | |
|---|---|---|
| 4,804,052 A | 2/1989 | Griffen |
| 4,805,637 A | 2/1989 | Walthert |
| 4,827,763 A | 5/1989 | Bourland et al. |
| 4,839,512 A | 6/1989 | Speck |
| 4,845,323 A | 7/1989 | Beggs |
| 4,858,622 A | 8/1989 | Osterweil |
| 4,899,840 A | 2/1990 | Boubille |
| 4,907,845 A | 3/1990 | Wood |
| 4,909,338 A | 3/1990 | Vitunic et al. |
| 4,926,951 A | 5/1990 | Carruth et al. |
| 4,934,468 A | 6/1990 | Koerber, Sr. et al. |
| 4,947,152 A | 8/1990 | Hodges |
| 4,947,298 A | 8/1990 | Stephen |
| 4,951,032 A | 8/1990 | Langsam |
| 4,953,244 A | 9/1990 | Koerber, Sr. et al. |
| 4,953,410 A | 9/1990 | Tabota |
| 4,955,947 A | 9/1990 | Hajianpour |
| 4,961,470 A | 10/1990 | Koerber, Sr. |
| 4,967,384 A | 10/1990 | Molinar et al. |
| 4,972,177 A | 11/1990 | Nolan |
| 4,974,692 A | 12/1990 | Carruth et al. |
| 5,003,654 A | 4/1991 | Vrzalik |
| 5,008,654 A | 4/1991 | Callaway |
| 5,010,772 A | 4/1991 | Bourland et al. |
| 5,010,774 A | 4/1991 | Kikao et al. |
| 5,033,563 A | 7/1991 | Brainerd, Jr. et al. |
| 5,044,029 A | 9/1991 | Vrzalik |
| 5,060,174 A | 10/1991 | Gross |
| 5,140,309 A | 8/1992 | Gusakov |
| 5,144,284 A | 9/1992 | Hammett |
| 5,166,679 A | 11/1992 | Vranish et al. |
| 5,170,364 A | 12/1992 | Gross et al. |
| 5,173,977 A | 12/1992 | Carruth et al. |
| 5,183,126 A | 2/1993 | Kellenbach |
| 5,184,112 A | 2/1993 | Gusakov |
| 5,209,126 A | 5/1993 | Grahn |
| 5,232,064 A | 8/1993 | Kroll et al. |
| 5,235,319 A | 8/1993 | Hill et al. |
| 5,253,656 A | 10/1993 | Rincoe et al. |
| 5,268,670 A | 12/1993 | Brasch et al. |
| 5,269,388 A | 12/1993 | Reichow et al. |
| 5,276,432 A | 1/1994 | Travis |
| 5,279,010 A | 1/1994 | Ferrand et al. |
| 5,319,817 A | 6/1994 | Hay et al. |
| 5,353,012 A | 10/1994 | Barham et al. |
| 5,393,935 A | 2/1995 | Hasty et al. |
| 5,393,938 A | 2/1995 | Bumbalough |
| 5,410,297 A | 4/1995 | Joseph et al. |
| D361,462 S | 8/1995 | Newham |
| 5,446,391 A | 8/1995 | Aoki et al. |
| 5,448,996 A | 9/1995 | Bellin et al. |
| 5,459,452 A | 10/1995 | DePonte |
| 5,471,198 A | 11/1995 | Newham |
| 5,479,939 A | 1/1996 | Ogino |
| 5,487,196 A | 1/1996 | Wilkinson et al. |
| 5,494,046 A | 2/1996 | Cross |
| 5,519,380 A | 5/1996 | Edwards |
| RE35,301 E | 7/1996 | Reichow |
| 5,554,835 A | 9/1996 | Newham |
| 5,571,142 A | 11/1996 | Brown et al. |
| 5,571,973 A | 11/1996 | Taylot |
| 5,590,650 A | 1/1997 | Genova |
| 5,600,108 A | 2/1997 | Newham |
| 5,602,734 A | 2/1997 | Kithil |
| 5,620,003 A | 4/1997 | Sepponen |
| 5,623,760 A | 4/1997 | Newham |
| 5,633,627 A | 5/1997 | Newham |
| 5,640,145 A | 6/1997 | Newham |
| 5,654,694 A | 8/1997 | Newham |
| 5,664,270 A | 9/1997 | Bell et al. |
| 5,672,849 A | 9/1997 | Foster et al. |
| 5,684,460 A | 11/1997 | Scanlon |
| 5,699,038 A | 12/1997 | Ulrich et al. |
| 5,715,548 A | 2/1998 | Weismiller et al. |
| 5,717,167 A | 2/1998 | Filing et al. |
| 5,747,745 A | 5/1998 | Newman |
| 5,760,688 A | 6/1998 | Kasai |
| 5,767,774 A | 6/1998 | Wright et al. |
| 5,780,781 A | 7/1998 | Berger et al. |
| 5,780,798 A | 7/1998 | Hall-Jackson |
| 5,796,059 A | 8/1998 | Boon |
| 5,801,339 A | 9/1998 | Boult |
| 5,802,479 A | 9/1998 | Kithil et al. |
| 5,802,640 A | 9/1998 | Ferrand et al. |
| 5,808,552 A | 9/1998 | Wiley et al. |
| 5,810,392 A | 9/1998 | Gagon |
| 5,815,864 A | 10/1998 | Sloop |
| 5,823,278 A | 10/1998 | Geringer |
| 5,831,221 A | 11/1998 | Geringer et al. |
| 5,844,488 A | 12/1998 | Musick |
| 5,846,206 A | 12/1998 | Bader |
| 5,859,390 A | 1/1999 | Stafford et al. |
| 5,861,581 A | 1/1999 | Evans et al. |
| 5,861,582 A | 1/1999 | Flanagan et al. |
| 5,869,788 A | 2/1999 | Gordon et al. |
| 5,879,309 A | 3/1999 | Johnson et al. |
| 5,906,016 A | 5/1999 | Ferrand et al. |
| 5,933,083 A | 8/1999 | Sobczynski et al. |
| 5,941,836 A | 8/1999 | Friedman |
| 5,945,914 A | 8/1999 | Holmes et al. |
| 5,957,838 A | 9/1999 | Rantala |
| 5,990,799 A | 11/1999 | Boon et al. |
| 5,999,100 A | 12/1999 | Wright et al. |
| 6,025,782 A | 2/2000 | Newham |
| 6,036,660 A | 3/2000 | Toms |
| 6,047,424 A | 4/2000 | Osborne et al. |
| D424,650 S | 5/2000 | Reichow |
| 6,067,019 A | 5/2000 | Scott |
| 6,075,464 A | 6/2000 | Cloutier et al. |
| 6,078,253 A | 6/2000 | Fowler |
| 6,078,261 A | 6/2000 | Davsko |
| 6,094,762 A | 8/2000 | Viard et al. |
| 6,111,509 A | 8/2000 | Holmes |
| 6,115,860 A | 9/2000 | Vrzalik |
| 6,133,837 A | 10/2000 | Riley |
| 6,147,592 A | 11/2000 | Ulrich et al. |
| 6,166,644 A | 12/2000 | Stroda |
| D436,322 S | 1/2001 | Wajer |
| 6,180,893 B1 | 1/2001 | Salgo |
| 6,204,767 B1 | 3/2001 | Sparks |
| 6,208,249 B1 | 3/2001 | Saito et al. |
| 6,208,250 B1 | 3/2001 | Dixon et al. |
| 6,239,706 B1 | 5/2001 | Yoshiike et al. |
| 6,252,512 B1 | 6/2001 | Riley |
| 6,280,392 B1 | 8/2001 | Yoshimi et al. |
| 6,297,738 B1 | 10/2001 | Newham |
| 6,307,476 B1 | 10/2001 | Smith et al. |
| 6,320,510 B2 | 11/2001 | Menkedick et al. |
| RE37,467 E | 12/2001 | Brasch et al. |
| 6,362,439 B1 | 3/2002 | Reichow |
| 6,362,725 B1 | 3/2002 | Ulrich et al. |
| 6,374,140 B1 | 4/2002 | Rise |
| 6,417,777 B2 | 7/2002 | Fitzgerald et al. |
| 6,438,776 B2 | 8/2002 | Ferrand et al. |
| 6,441,742 B1 | 8/2002 | Lovely et al. |
| 6,450,957 B1 | 9/2002 | Yoshimi et al. |
| 6,502,048 B1 | 12/2002 | Lichtinger et al. |
| 6,544,200 B1 | 4/2003 | Smith et al. |
| 6,546,813 B2 | 4/2003 | Hubbard, Jr. |
| 6,547,743 B2 | 4/2003 | Brydon |
| 6,583,727 B2 | 6/2003 | Nunome |
| 6,636,820 B2 | 10/2003 | Livingston |
| 6,646,556 B1 | 11/2003 | Smith et al. |
| 6,727,445 B2 | 4/2004 | Cullinan et al. |
| 6,784,379 B2 | 8/2004 | Breed et al. |
| 6,784,797 B2 | 8/2004 | Smith et al. |
| 6,791,460 B2 | 9/2004 | Dixon et al. |
| 6,792,342 B2 | 9/2004 | Breed et al. |
| 6,819,254 B2 | 11/2004 | Riley |
| 6,822,571 B2 | 11/2004 | Conway |
| 6,984,207 B1 | 1/2006 | Sullivan et al. |
| 7,077,810 B2 | 7/2006 | Lange et al. |
| 7,100,439 B2 | 9/2006 | Carlucci |
| 7,126,065 B2 | 10/2006 | Petrucelli |

(56) References Cited

U.S. PATENT DOCUMENTS

| | | | |
|---|---|---|---|
| 7,176,391 | B2 | 2/2007 | Metz et al. |
| 7,253,366 | B2 | 8/2007 | Bhai |
| 7,296,312 | B2 | 11/2007 | Menkedick et al. |
| 7,314,451 | B2 | 1/2008 | Halperin et al. |
| 7,335,839 | B2 | 2/2008 | Metz et al. |
| 7,437,787 | B2 | 10/2008 | Bhai |
| 7,699,784 | B2 | 4/2010 | Wan Fong et al. |
| 8,262,582 | B2 | 9/2012 | Kortelainen |
| 10,178,964 | B2 | 1/2019 | Meriheina et al. |
| 10,292,605 | B2 | 5/2019 | Vanderpohl, III |
| 10,292,658 | B2 | 5/2019 | Borkholder et al. |
| 10,376,214 | B2 | 8/2019 | Hayes et al. |
| 10,426,411 | B2 | 10/2019 | Li |
| 10,463,311 | B2 | 11/2019 | Zhu et al. |
| 10,517,784 | B2 | 12/2019 | Zerhusen et al. |
| 10,699,206 | B2 | 6/2020 | Teixeira |
| 2001/0001235 | A1 | 5/2001 | Menedick et al. |
| 2001/0001237 | A1 | 5/2001 | Stroda et al. |
| 2001/0015292 | A1 | 8/2001 | Salgo |
| 2002/0067273 | A1 | 6/2002 | Jaues et al. |
| 2002/0070867 | A1 | 6/2002 | Conway et al. |
| 2002/0080037 | A1 | 6/2002 | Dixon et al. |
| 2002/0189924 | A1 | 12/2002 | Cullinan et al. |
| 2002/0196148 | A1 | 12/2002 | Nunome |
| 2003/0063010 | A1 | 4/2003 | Smith et al. |
| 2003/0073936 | A1 | 4/2003 | Raisanen |
| 2003/0090383 | A1 | 5/2003 | Conway |
| 2003/0114736 | A1 | 6/2003 | Reed et al. |
| 2003/0197614 | A1 | 10/2003 | Smith et al. |
| 2004/0046668 | A1 | 3/2004 | Smith et al. |
| 2004/0087865 | A1 | 5/2004 | Kelly |
| 2004/0194220 | A1 | 10/2004 | Price et al. |
| 2006/0028350 | A1 | 2/2006 | Bhai |
| 2006/0100534 | A1 | 5/2006 | Colombo et al. |
| 2006/0129047 | A1 | 6/2006 | Ruotoistenmaki |
| 2007/0118054 | A1 | 5/2007 | Pinhas et al. |
| 2007/0149883 | A1 | 6/2007 | Yesha |
| 2007/0157385 | A1 | 7/2007 | Lemire et al. |
| 2007/0266499 | A1 | 11/2007 | O'Keefe et al. |
| 2008/0005838 | A1 | 1/2008 | Wan Fong et al. |
| 2009/0306487 | A1 | 12/2009 | Crowe et al. |
| 2010/0094147 | A1 | 4/2010 | Inan et al. |
| 2010/0210921 | A1 | 8/2010 | Park et al. |
| 2011/0251493 | A1 | 10/2011 | Poh et al. |
| 2011/0251502 | A1 | 10/2011 | Friedrich et al. |
| 2013/0310700 | A1* | 11/2013 | Wiard .............. A61B 5/318 600/500 |
| 2014/0124273 | A1* | 5/2014 | Receveur .......... G01G 19/445 177/7 |
| 2014/0135635 | A1 | 5/2014 | Vanderpohl, III |
| 2016/0007870 | A1 | 1/2016 | Brueser et al. |
| 2018/0161225 | A1* | 6/2018 | Zerhusen .......... A61G 7/05769 |
| 2018/0206793 | A1* | 7/2018 | Akatsu ............. A61B 5/0255 |
| 2019/0029543 | A1* | 1/2019 | Hutchinson ........ G06T 7/269 |
| 2020/0163627 | A1 | 5/2020 | Sayadi et al. |

FOREIGN PATENT DOCUMENTS

| | | |
|---|---|---|
| CN | 110742585 A | 2/2020 |
| EP | 2459065 B1 | 1/2014 |
| EP | 2124747 B1 | 9/2018 |
| JP | 2000175904 A1 | 6/2000 |
| JP | 2000316915 A | 11/2000 |
| JP | 2001000401 A | 1/2001 |
| JP | 2001037821 A | 2/2001 |
| JP | 2004180804 A | 7/2004 |
| JP | 2005013259 A | 1/2005 |
| WO | WO 2005/074379 A2 | 8/2005 |
| WO | WO 2016/126146 A1 | 8/2016 |
| WO | WO 2020169550 A1 | 8/2020 |

OTHER PUBLICATIONS

P. D. Ziegler, J. L. Koehler, and R. Mehra, "Comparison of continuous versus intermittent monitoring of atrial arrhythmias," *Heart Rhythm*, 2006.

M. A. Konstam, "Does Home Monitoring Heart Failure Care Improve Patient Outcomes? Home monitoring should be the central element in an effective program of heart failure disease management," *Circulation*, 2012.

B. H. Cuthbertson, M. Boroujerdi, L. McKie, L. Aucott, and G. Prescott, "Can physiological variables and early warning scoring systems allow early recognition of the deteriorating surgical patient?," *Critical Care Medicine*, 2007.

O. T. Inan, P. F. Migeotte, K. S. Park, M. Etemadi, K. Tavakolian, R. Casanella, J. Zanetti, J. Tank, I. Funtova, G. K. Prisk, and M. Di Rienzo, "Ballistocardiography and Seismocardiography: A Review of Recent Advances," *IEEE Journal of Biomedical and Health Informatics*, 2015.

C. S. Kim, S. L. Ober, M. S. McMurtry, B. A. Finegan, O. T. Inan, R. Mukkamala, and J. O. Hahn, "Ballistocardiogram: Mechanism and Potential for Unobtrusive Cardiovascular Health Monitoring," *Scientific Reports*, 2016.

O. T. Inan, M. Baran Pouyan, A. Q. Javaid, S. Dowling, M. Etemadi, A. Dorier, J. A. Heller, A. O. Bicen, S. Roy, T. De Marco, and L. Klein, "Novel Wearable Seismocardiography and Machine Learning Algorithms Can Assess Clinical Status of Heart Failure Patients," *Circulation. Heart failure*, 2018.

C. Brüser, K. Stadlthanner, S. De Waele, and S. Leonhardt, "Adaptive beat-to-beat heart rate estimation in ballistocardiograms," *IEEE Transactions on Information Technology in Biomedicine*, 2011.

A. M. Carek and O. T. Inan, "Robust Sensing of Distal Pulse Waveforms on a Modified Weighing Scale for Ubiquitous Pulse Transit Time Measurement," *IEEE Transactions on Biomedical Circuits and Systems*, 2017.

S. Junnila, A. Akhbardeh, and A. Värri, "An electromechanical film sensor based wireless ballistocardiographic chair: Implementation and performance," *Journal of Signal Processing Systems*, 2009.

O. T. Inan, M. Etemadi, A. Paloma, L. Giovangrandi, and G. T. Kovacs, "Non-invasive cardiac output trending during exercise recovery on a bathroom-scale-based ballistocardiograph," *Physiological Measurement*, 2009.

B. H. Choi, G. S. Chung, J. S. Lee, D. U. Jeong, and K. S. Park, "Slow-wave sleep estimation on a load-cell-installed bed: A non-constrained method," *Physiological Measurement*, 2009.

A. Q. Javaid, A. D. Wiens, N. F. Fesmire, M. A. Weitnauer, and O. T. Inan, "Quantifying and Reducing Posture-Dependent Distortion in Ballistocardiogram Measurements," *IEEE Journal of Biomedical and Health Informatics*, 2015.

J. S. Zia, J. Kimball, S. Hersek, M. Shandhi, B. Semiz, and O. Inan, "A Unified Framework for Quality Indexing and Classification of Seismocardiogram Signals," *IEEE Journal of Biomedical and Health Informatics*, 2019.

C. D. Woody, "Characterization of an adaptive filter for the analysis of variable latency neuroelectric signals," *Medical & Biological Engineering*, 1967.

A. N. Tikhonov, "Solution of Incorrectly Formulated Problems and the Regularisation Method.pdf," *Soviet Mathematics Doklady*, 1963.

E. J. Benjamin, P. Muntner, A. Alonso, M. S. Bittencourt, C. W. Callaway, A. P. Carson, A. M. Chamberlain, A. R. Chang, S. Cheng, S.R. Das, F.N. Delling, L. Djousse, M. S. Elkind, J. F. Ferguson, M. Fornage, L. C. Jordan, S. S. Khan, B. M. Kissela, K. L. Knutson, T. W. Kwan, D. T. Lackland, T. T. Lewis, J. H. Lichtman, C. T. Longenecker, M. S. Loop, P. L. Lutsey, S. S. Martin, K. Matsushita, A. E. Moran, M. E. Mussolino, M. O'Flaherty, A. Pandey, A. M. Perak, W. D. Rosamond, G. A. Roth, U. K. Sampson, G. M. Satou, E. B. Schroeder, S. H. Shah, N. L. Spartano, A. Stokes, D. L. Tirschwell, C. W. Tsao, M. P. Turakhia, L. B. VanWagner, J. T. Wilkins, S. S. Wong, and S. S. Virani, "Heart Disease and Stroke Statistics—2019 Update: A Report From the American Heart Association," *Circulation*, 2019.

C. Mathukia, W. Fan, K. Vadyak, C. Biege, and M. Krishnamurthy, "Modified Early Warning System improves patient safety and clinical outcomes in an academic community hospital," *Journal of Community Hospital Internal Medicine Perspectives*, 2015.

(56) References Cited

OTHER PUBLICATIONS

C. H. Antink, Y. Mai, J. Ranta, A. Tamiceriu, C. Brüser, S. Leonhardt, N. Oksala, and A. Vehkaoja, "On the Performance of Bed-Integrated Ballistocardiography in Long-Term Heart Rate Monitoring of Vascular Patients," in Computing in Cardiology, 2019.

G. G. Berntson, J. Thomas Bigger, D. L. Eckberg, P. Grossman, P. G. Kaufmann, M. Malik, H. N. Nagaraja, S. W. Porges, J. P. Saul, P. H. Stone, and M. W. Van Der Molen, "Heart rate variability: Origins Methods, and interpretive caveats," 1997.

K. Umetani, D. H. Singer, R. McCarty, and L. Atkinson, "Twenty-four hour time domain heart rate variability and heart rate: Relations to age and gender over nine decades," Journal of the American College of Cardiology, 1998.

Z. Zhang, "Photoplethysmography-based heart rate monitoring in physical activities via joint sparse spectrum reconstruction," IEEE Transactions on Biomedical Engineering, 2015.

S. Isono, N. Nozaki-Taguchi, M. Hasegawa, S. Kato, S. Todoroki, S. Masuda, N. Iida, T. Nishimura, M. Noto, and Y. Sato, "Contact-free unconstraint respiratory measurements with load cells under the bed in awake healthy volunteers: Breath-by-breath comparison with pneumotachography," Journal of Applied Physiology, 2019.

C. H. Antink, H. Gao, C. Brüser, and S. Leonhardt, "Beat-to-beat heart rate estimation fusing multimodal video and sensor data," Biomedical Optics Express, 2015.

O.T. Inan, L. Etemadi, R.M. Wiard, L. Giovangrandi, and G. T. Kovacs, "Robust ballistocardiogram acquisition for home monitoring," Physiological Measurement, 2009.

C. Brüser, S. Winter, and S. Leonhardt, "Robust inter-beat interval estimation in cardiac vibration signals," Physiological Measurement, 2013.

C. Brüser, J.M. Kortelainen, S. Winter, M. Tenhunen, J. Pärkkä, and S. Leonhardt, "Improvement of force- sensor-based heart rate estimation using multichannel data fusion," IEEE Journal of Biomedical and Health Informatics, 2015.

J.K. Kimotho, T. Hemsel, and W. Sextro, "Estimation of Remaining Useful Lifetime of Piezoelectric Transducers Based on Self-Sensing," IEEE Transactions on Reliability, 2017.

M. Tenhunen, J. Hyttinen, J.A. Lipponen, J. Virkkala, S. Kuusimäki, L.P. Tarvainen, P.A. Karjalainen, and S.L. Himanen, "Heart rate variability evaluation of Emfit sleep mattress breathing categories in NREM sleep," Clinical Neurophysiology, 2015.

M. Helfand, V. Christensen, and J. Anderson, Technology Assessment: Early Sense for Monitoring Vital Signs in Hospitalized Patients. May 2016.

J. Tuominen, K. Peltola, T. Saaresranta, and K. Valli, "Sleep parameter assessment accuracy of a consumer home sleep monitoring ballistocardiograph beddit sleep tracker: A validation study," Journal of Clinical Sleep Medicine, 2019.

E. Zimlichman, M. Szyper-Kravitz, Z. Shinar, T. Klap, S. Levkovich, A. Unterman, R. Rozenblum, J.M. Rothschild, H. Amital, and Y. Shoenfeld, "Early recognition of acutely deteriorating patients in non-intensive care units: Assessment of an innovative monitoring technology," Journal of Hospital Medicine, 2012.

T. Reinvuo, M. Hannula, H. Sorvoja, E. Alasaarela, and R. Myllylä, "Measurement of respiratory rate with high-resolution accelerometer and EmFit pressure sensor," in Proceedings of the 2006 IEEE Sensors Applications Symposium, 2006.

H.J. Baek, G.S. Chung, K.K. Kim, and K.S. Park, "A smart health monitoring chair for nonintrusive Measurement of biological signals," IEEE Transactions on Information Technology in Biomedicine, 2012.

O.T. Inan, D. Park, L. Giovangrandi, and G. T. Kovacs, "Noninvasive Measurement of physiological signals on a modified home bathroom scale," IEEE Transactions on Biomedical Engineering, 2012.

Aleksandrowicz, A. and Leonhardt, S., "Wireless and Non-contact ECG Measurement System—the "Aachen SmartChair"," Acta Polytechnica, 2007.

C.H. Lund, L.B. Nonato, J.M. Kuller, L.S. Franck, C. Cullander, and D. J. Durand, "Disruption of barrier function in neonatal skin with adhesive removal," Journal of Pediatrics, 1997.

Z. Zhang, Z. Pi, and B. Liu, "TROIKA: A general framework for heart rate monitoring using wrist-type photoplethysmographic signals during intensive physical exercise," IEEE Transactions on Biomedical Engineering, 2015.

Won Kyu Lee, Heenam Yoon, Chungmin Han, Kwang Min Joo and Kwang Suk Park, "Physiological Signal Monitoring Bed for Infants Based on Load-Cell Sensors," belongs to the Collection *Sensors for Globalized Healthy Living and Wellbeing*, published Mar. 19, 2016.

Y Huang, C. Sun, T. Jim, S Yang, Z Zhang, "Unobtrusive Inter-beat Interval Estimation from Multichannel Ballistocardiogram Signal Using Kalman Filter," published in the 2020 $42^{nd}$ Annual International Conference of the IEEE Engineering in Medicine & Biology Society (EMBC), published Aug. 27, 2020.

M.E. Griffith, M.W. Portnoy, L.J. Stotts, and J.L. Day, "Improved capacitive electrocardiogram electrodes for burn applications," *Medical & Biological Engineering & Computing*, 1979.

I. Sadek, T. Tan Soon Heng, E. Seet, and B. Abdulrazek, "A new approach for detecting sleep apena using a contactless bed sensor: Comparison study," *Journal of Medical Internet Research*, 2020.

D. Heise and L. Skubic, "Monitoring pulse and respiration with a non-invasive hydraulic bed sensor," in *2010 Annual International Conference of the IEEE Engineering in Medicine and Biology Society, EMBC '10*, 2010.

C. Jiao, B.Y. Su, P. Lyon, A. Zare, K.C., Ho, and M. Skubic, "Multiple instance dictionary learning for beat-to-beat heart rate monitoring from ballistocardiograms," *IEEE Transactions on Biomedical Engineering*, 2018.

A. Alivar, C. Carlson, A Suliman, S. Warren, P. Prakash, D.E. Thompson, B. Natarajan, "Motion Artifact Detection and Reduction in Bed-Based Ballistocardiogram," *IEEE Access*, 2019.

European Search Report for European Patent Application No. 21165658.2 dated Jun. 16, 2021 (9 pages).

L. Rosales, M. Skubic, D. Heise, M.J. Devaney, and M. Schaumburg, "Heartbeat detection from a hydraulic bed sensor using a clustering approach," in *Proceedings of the Annual International Conference of the IEEE Engineering in Medicine and Biology Society, EMBS*, 2012.

D. Hai, C. Chen, R. Yi, S. Gou, B. Yu Su, C. Jiao, and L. Skubic "Heartbeat Detection and Rate Estimation from Ballistocardiograms using the Gated Recurrent Unit Network," in *Proceedings of an Annual International Conference of the IEEE Engineering in Medicine and Biology Society, EMBS*, 2020.

W. Jia, Y. Li, Y. Bai, Z.H. Mao, M. Sun, and Q. Zhao, "Estimation of heart rate from a chest-worn inertial measurement unit," in $4^{th}$ *International Symposium on Bioelectronics and Bioinformatics, ISBB 2015*, 2015.

G. Ligorio, E. Bargamini, I. Pasciuto, G. Vannozzi, A. Cappozzo, and A.M. Sabatini, "Assessing the performance of sensor fusion methods: Application to magnetic-inertial-based human body tracking," *Sensors* (Switzerland), 2016.

Z. Chen, J.T. Teo, S.H. Ng, and X. Yang, "Portable fiber optic ballistocardiogram sensor for home use," in *Optical Fibers and Sensors for Medical Diagnostics and Treatment Applications XII*, 2012.

Y. Zhu, H. Zhang, M. Jayachandran, A.K. Ng, J. Biswas, and Z. Chen, "Ballistocardiography with fiber optic sensor in headrest position: A feasibility study and a new processing algorithm," in *Proceedings of the Annual International Conference of the IEEE Engineering in Medicine and Biology Society, EMBS*, 2013.

C. Brüser, A. Kerekes, S. Winter, and S. Leonhardt, "Multi-channel optical sensor-array for measuring ballistocardiograms and respiratory activity in bed," in *Proceedings of the Annual International Conference of the IEEE Engineering in Medicine and Biology Society, EMBS*, 2012.

Abdul Q. Javaid, Sean Dowling, Mozziyar Etemadi, J Alex. Heller, Shuvo Roy, Liviu Klein, and Omer T. Inan, "Quantification of Posture Induced Changes in Wearable Seismocardiogram Signals for Heart Failure Patients," 2016 Computing in Cardiology Conference (CINC), CCAL, Sep. 11, 2016.

(56) References Cited

OTHER PUBLICATIONS

L. Sörnmo and P. Laguna, Chapter 7 "ECG Signal Processing," from the book *Bioelectrical Signal Processing in Cardiac and Neurological Applications*, 2005.

I. Sadek, "Ballistocardiogram signal processing: A literature review," 2018.

C. Hoog Antink, Y. Mai, R. Aalto, C. Brüser, S. Leonhardt, N. Oksala, and A. Vehkaoja, "Ballistocardiography can estimate beat-to-beat heart rate accurately at night in patients after vascular intervention," *IEEE Journal of Biomedical and Health Informatics*, 2020.

J. Paalasmaa, H. Toivonen, and L. Partinen, "Adaptive heart modeling for beat-to-beat heart rate measurement in ballistocardiograms," *IEEE Journal of Biomedical and Health Informatics*, 2015.

S. Soleimani Gilakjani, H. Azimi, L. Bouchard, R.A. Goubran, and F. Knoefel, "Improved Sensor Selection Method during movement for Breathing Rate Estimation with Unobtrusive Pressure Sensor Arrays," IEEE Sensors Applications Symposium (SAS), IEEE, Mar. 12, 2018, pp. 1-6.

J. Alametsä, J. Viik, J. Alakare, A. Värri, and A. Palomäki, "Ballistocardiography in sitting and horizontal positions," Physiological Measurement, vol. 29, No. 9.

Communication pursuant to Article 94(3) EPC issued by the European Patent Office on Nov. 3, 2023, in European Patent Application No. 21165658.2 (7 pages).

"Bed-Embedded Heart and Respiration Rates Detection by Longitudinal Ballistocardiography and Pattern Recognition," by Almothana Albukhari et al.; Sensor 2019, 19, 1451; doi: 10.3390/S19061451.

First Office Action issued in Chinese Patent Application No. 2021103045377 on May 1, 2024, and its English translation (16 pages).

Summons to attend oral proceedings pursuant to Rule 115(1) EPC issued by the European Patent Office on Aug. 1, 2024, in European Patent Application No. 21165658.2 (9 pages).

Chinese Office Action issued by the Chinese Patent Office on Feb. 14, 2025, in Chinese Patent Application No. 202110304537.7 and its English translation (17 pages).

Office Action for U.S. Appl. No. 17/849,815 dated Feb. 13, 2025 (32 pages).

Communication under Rule 71(3) EPC in EP Application No. 21 165 658.2 1113, dated Mar. 14, 2025 (73 pages).

* cited by examiner

TABLE I
ACCURACY OF HEART RATE ESTIMATION - MEAN ABSOLUTE ERROR (BPM)

| SUBJECTS | SUPINE | | | LEFT | | | RIGHT | | | PRONE | | | SEATED | | |
|---|---|---|---|---|---|---|---|---|---|---|---|---|---|---|---|
| | S1 | S2 | S3 | S1 | S2 | S3 | S1 | S2 | S3 | S1 | S2 | S3 | S1 | S2 | S3 |
| 1 | 2.53 | 1.66 | 1.55 | 4.55 | 3.55 | 2.97 | 12.37 | 10.58 | 8.16 | 7.60 | 5.29 | 3.58 | 9.01 | 7.62 | 6.02 |
| 2 | 3.65 | 2.05 | 1.98 | 7.83 | 3.62 | 2.25 | 7.78 | 2.86 | 2.68 | 5.57 | 3.86 | 2.84 | 5.26 | 3.96 | 3.21 |
| 3 | 3.65 | 2.35 | 1.52 | 1.22 | 1.08 | 1.04 | 0.80 | 0.74 | 0.73 | 1.33 | 1.17 | 0.94 | 13.43 | 11.73 | 6.64 |
| 4 | 5.19 | 1.74 | 1.46 | 17.68 | 13.46 | 4.38 | 27.14 | 6.81 | 3.50 | 15.84 | 2.08 | 1.50 | 18.87 | 1.69 | 0.91 |
| 5 | 1.21 | 1.02 | 1.02 | 2.09 | 1.71 | 1.61 | 3.84 | 2.57 | 1.86 | 2.74 | 1.95 | 1.68 | 1.17 | 1.17 | 0.95 |
| 6 | 2.52 | 2.30 | 2.24 | 5.24 | 3.43 | 2.79 | 2.95 | 2.94 | 3.04 | 4.22 | 3.42 | 3.07 | 2.14 | 2.14 | 1.59 |
| 7 | 1.02 | 0.69 | 0.64 | 5.69 | 2.16 | 1.12 | 5.07 | 3.68 | 2.15 | 1.41 | 1.20 | 0.94 | 3.22 | 1.90 | 1.28 |
| 8 | 1.71 | 1.71 | 1.72 | 5.56 | 4.07 | 3.60 | 3.48 | 2.89 | 2.01 | 1.95 | 1.88 | 1.75 | 4.70 | 5.00 | 3.54 |
| 9 | 5.37 | 4.94 | 4.92 | 13.83 | 11.49 | 8.98 | 8.52 | 6.33 | 4.96 | 4.99 | 3.90 | 3.32 | 4.93 | 3.75 | 3.73 |
| 10 | 1.67 | 1.51 | 1.36 | 1.21 | 1.21 | 1.22 | 2.05 | 1.56 | 1.63 | 7.84 | 6.24 | 3.07 | 6.24 | 4.15 | 3.80 |
| 11 | 0.98 | 0.98 | 0.99 | 1.86 | 1.85 | 1.80 | 4.05 | 3.33 | 2.64 | 9.26 | 5.05 | 3.96 | 1.22 | 1.05 | 1.06 |
| MEAN | 2.68 | 1.91 | 1.76 | 6.07 | 4.33 | 2.89 | 7.09 | 4.03 | 3.03 | 5.70 | 3.28 | 2.42 | 6.38 | 4.02 | 2.98 |
| SE | 0.48 | 0.34 | 0.34 | 1.60 | 1.26 | 0.69 | 2.24 | 0.85 | 0.61 | 1.30 | 0.53 | 0.33 | 1.65 | 0.97 | 0.61 |
| MEAN $E_{rel}$ (%) | 3.99 | 2.94 | 2.74 | 9.22 | 6.50 | 4.59 | 9.97 | 6.01 | 4.63 | 7.88 | 4.89 | 3.62 | 8.85 | 6.09 | 4.56 |
| MEAN COVERAGE (%) | 99.81 | 99.85 | 98.69 | 97.16 | 97.51 | 94.48 | 98.38 | 98.96 | 95.50 | 99.50 | 99.69 | 97.86 | 97.57 | 97.92 | 93.86 |

THE MEAN ABSOLUTE ERROR (MAE) OF HEART RATE ESTIMATION IS PRESENTED FOR EACH SUBJECT, POSTURE, AND SCENARIO. THE AVERAGE OF RELATIVE ERROR ($E_{rel}$;%), AND THE COVERAGE (%) IS ALSO GIVEN IN THE LAST ROWS. SE = STANDARD ERROR.

*FIG. 14*

BED-BASED BALLISTOCARDIOGRAM APPARATUS AND METHOD

The present application claims the benefit, under 35 U.S.C. § 119 (e), to U.S. Provisional Application No. 63/001,585, filed Mar. 30, 2020 and U.S. Provisional Application No. 63/086,724, filed Oct. 2, 2020, each of which is hereby incorporated by reference herein in its entirety.

BACKGROUND

The present disclosure relates to patient beds used in healthcare facilities and particularly, to patient beds having sensors integrated therein for detecting patient physiological conditions. More particularly, the present disclosure relates to patient beds using load cell signals to provide a bed-based ballistocardiogram.

Continuous and unobtrusive vitals monitoring has gained attention for the treatment and prevention of diseases as the number of patients with chronic cardiorespiratory conditions grows. In home settings, such monitoring may allow longitudinal tracking of the patient's physiological conditions. See, P. D. Ziegler, J. L. Koehler, and R. Mehra, "Comparison of continuous versus intermittent monitoring of atrial arrhythmias," *Heart Rhythm,* 2006, and M. A. Konstam, "Home monitoring should be the central element in an effective program of heart failure disease management," *Circulation,* 2012. Furthermore, it serves a key role in hospitals for patient safety and earlier detection of patient deterioration without increasing the burden on caregivers. See, B. H. Cuthbertson, M. Boroujerdi, L. McKie, L. Aucott, and G. Prescott, "Can physiological variables and early warning scoring systems allow early recognition of the deteriorating surgical patient?," *Critical Care Medicine,* 2007.

Advances in sensing cardiogenic vibration signals have paved the way for such unobtrusive vitals monitoring. One of the most commonly investigated sensing modalities for unobtrusive monitoring is the ballistocardiogram (BCG). See, O. T. Inan, P. F. Migeotte, K. S. Park, M. Etemadi, K. Tavakolian, R. Casanella, J. Zanetti, J. Tank, I. Funtova, G. K. Prisk, and M. Di Rienzo, "Ballistocardiography and Seismocardiography: A Review of Recent Advances," *IEEE Journal of Biomedical and Health Informatics,* 2015 (hereinafter "Inan and Migeotte"). The BCG measures the micro-displacement of the whole body in response to the movement of blood caused by cardiac ejection. See, C. S. Kim, S. L. Ober, M. S. McMurtry, B. A. Finegan, O. T. Inan, R. Mukkamala, and J. O. Hahn, "Ballistocardiogram: Mechanism and Potential for Unobtrusive Cardiovascular Health Monitoring," *Scientific Reports,* 2016 (hereinafter "Kim and Ober"). Recent literature has reported promising results for BCG use on monitoring patients with heart failure (see, O. T. Inan, M. Baran Pouyan, A. Q. Javaid, S. Dowling, M. Etemadi, A. Dorier, J. A. Heller, A. O. Bicen, S. Roy, T. De Marco, and L. Klein, "Novel Wearable Seismocardiography and Machine Learning Algorithms Can Assess Clinical Status of Heart Failure Patients," *Circulation. Heart failure,* 2018), and the assessment of physiological indicators in home settings. See, C. Brüser, K. Stadlthanner, S. De Waele, and S. Leonhardt, "Adaptive beat-to-beat heart rate estimation in ballistocardiograms," *IEEE Transactions on Information Technology in Biomedicine,* 2011 (hereinafter "Brüser"), and A. M. Carek and O. T. Inan, "Robust Sensing of Distal Pulse Waveforms on a Modified Weighing Scale for Ubiquitous Pulse Transit Time Measurement," *IEEE Transactions on Biomedical Circuits and Systems,* 2017 (hereinafter "Carek"). Modern forms of ballistocardiographic measurement include beds (see, Brüser), chairs (see, S. Junnila, A. Akhbardeh, and A. Värri, "An electromechanical film sensor based wireless ballistocardiographic chair: Implementation and performance," *Journal of Signal Processing Systems,* 2009), and weighing scales (see, O. T. Inan, M. Etemadi, A. Paloma, L. Giovangrandi, and G. T. Kovacs, "Non-invasive cardiac output trending during exercise recovery on a bathroom-scale-based ballistocardiograph," *Physiological Measurement,* 2009 (hereinafter, "Inan and Paloma") and Carek), all of which are everyday objects without any interference to normal daily activities.

However, BCG measurement systems are sensitive to the posture of the subject during the recording period, in that the signal shape may be distorted when the subject's posture changes. For BCG signals measured with a weighing scale or force plate, subjects are required to stand upright and still to obtain high-quality signals. Any modification in the position or posture of the subject such as slouching will distort signal morphology, making the physiological interpretation of the BCG challenging. Additionally, for bed-based BCG recordings, commonly used for long-term monitoring such as overnight sleep studies (see, B. H. Choi, G. S. Chung, J. S. Lee, D. U. Jeong, and K. S. Park, "Slow-wave sleep estimation on a load-cell-installed bed: A non-constrained method," *Physiological Measurement,* 2009), changes in body position are inevitable—subjects may lay supine for part of the night, then laterally for some time, then prone, for exam-ple. Moreover, bed-based BCG is even more susceptible to postural effects than standing BCG as the head-to-foot and dorso-ventral forces are unavoidably coupled together in the measurement. See, Inan and Migeotte.

SUMMARY

An apparatus, system, or method may comprise one or more of the features recited in the appended claims and/or the following features which, alone or in any combination, may comprise patentable subject matter:

According to a first aspect of the present disclosure, a patient bed may include a frame that may be configured to support a patient. The frame may include a first frame portion and a second frame portion. First, second, third, and fourth load cells may support the first frame portion relative to the second frame portion. Each of the first, second, third, and fourth load cells may produce a respective first, second, third, and fourth load cell signal that may be indicative of a weight that may be supported by the corresponding first, second, third, and fourth load cell. Circuitry may include a controller that may have a processor and a memory. The circuitry may receive the first, second, third, and fourth load cell signals and the controller may be configured to determine a weight of the patient that may be based on a summation of the first, second, third, and fourth load cell signals. The controller also may be configured to determine a heart rate of the patient or a respiration rate of the patient or both by processing only two of the first, second, third, and fourth load cell signals.

In some embodiments of the first aspect, the frame may have a head end and a foot end. The first and second load cells may be situated closer to the head end of the frame than to the foot end of the frame. The third and fourth load cells may be situated closer to the foot end of the frame than to the head end of the frame. The third and fourth load cell signals from the third and fourth load cells, respectively, may be used to determine the heart rate or respiration or both.

It is contemplated by the present disclosure that the heart rate or respiration rate or both may be determined based on a comparison by the controller of the third and fourth load cell signals to at least one template waveform that may have been generated previously during a force plate ballistocardiogram test of a test subject in a standing position on a force plate ballistocardiogram. Optionally, the comparison may involve the controller accounting for a posture of the patient relative to the frame. For example, the posture accounted for by the controller may include one or more of the following: supine, left lying, right lying, prone, or seated. Further optionally, the controller may be configured to implement a transformation function that may map the third and fourth load cell signals that may correspond to left lying, right lying, prone or seated postures to the supine posture.

In some embodiments of the first aspect, the comparison may involve the controller using a signal quality index (SQI) that may be determined as a function of an inverse of a distance between the third and fourth load cells signals and the respective at least one template waveform. For example, the distance may be determined by the controller using a dynamic-time feature matching (DTFM) technique. Alternatively or additionally, the comparison of the first aspect may involve the controller calculating a Pearson correlation coefficient. Further alternatively or additionally, the circuitry may include at least one finite impulse response (FIR) band-pass filter with a Kaiser window through which the third and fourth load cell signals may be fed prior to reaching the controller.

According to a second aspect of the present disclosure, a patient bed may include a frame that may be configured to support a patient. The frame may include a first frame portion and a second frame portion. A plurality of load cells may support the first frame portion relative to the second frame portion. Each load cell of the plurality of load cells may produce a respective load cell signal that may be indicative of a weight that may be supported by the corresponding load cell of the plurality of load cells. Circuitry may include a controller that may have a processor and a memory. The circuitry may receive the plurality of load cell signals and the controller may be configured to determine a weight of the patient based on a summation of the plurality of load cell signals. The controller also may be configured to determine a heart rate of the patient or a respiration rate of the patient or both by comparing at least some of the load cell signals to at least one template waveform that may have been generated previously during a force plate ballistocardiogram test of a test subject in a standing position on a force plate ballistocardiogram.

In some embodiments of the second aspect, the comparison may involve the controller accounting for a posture of the patient relative to the frame. For example, the posture accounted for by the controller may include one or more of the following: supine, left lying, right lying, prone, or seated. Optionally, the controller may be configured to implement a transformation function that may map the at least some of the load cell signals that may correspond to left lying, right lying, prone or seated postures to the supine posture.

If desired, the comparison may involve the controller using a signal quality index (SQI) that may be determined as a function of an inverse of a distance between the at least some of the load cells signals and the respective at least one template waveform. For example, the distance may be determined by the controller using a dynamic-time feature matching (DTFM) technique. Alternatively or additionally, the comparison may involve the controller calculating a Pearson correlation coefficient. Optionally, the circuitry may include at least one finite impulse response (FIR) band-pass filter with a Kaiser window through which the at least some of the load cell signals may be fed prior to reaching the controller.

According to a third aspect of the present disclosure, a patient bed may include a weigh scale to weigh a patient that may be supported on the patient bed. The weigh scale may have four load cells that may produce signals from which a patient weight may be determined. Signals from only two of the four load cells may be used to implement a ballistocardiogram to determine a heart rate of the patient.

In some embodiments of the third aspect, the signals from the only two of the four load cells also may be used to determine a respiration rate of the patient. It is contemplated by the present disclosure that a frame may support the weigh scale. The frame may have a head end and a foot end. Optionally, the only two of the four load cells may be situated closer to the foot end than to the head end.

The patient bed of the third aspect may further include circuitry to implement the ballistocardiogram and the heart rate may be determined based on a comparison of the signals from the two of the four load cells to at least one template waveform generated previously during a force plate ballistocardiogram test of a test subject in a standing position on a force plate ballistocardiogram. If desired, the comparison may involve the circuitry accounting for a posture of the patient relative to the frame. For example, the posture accounted for by the circuitry may include one or more of the following: supine, left lying, right lying, prone, or seated.

In some embodiments of the third aspect, the circuitry may be configured to implement a transformation function that may map the signals from the two of the four load cells corresponding to left lying, right lying, prone or seated postures to the supine posture. Optionally, the comparison may involve the circuitry using a signal quality index (SQI) that may be determined as a function of an inverse of a distance between the signals from the two of the four load cells and the respective at least one template waveform. Further optionally, the distance may be determined by the circuitry using a dynamic-time feature matching (DTFM) technique. Alternatively or additionally, the comparison may involve the circuitry calculating a Pearson correlation coefficient. If desired, the circuitry may include at least one finite impulse response (FIR) band-pass filter with a Kaiser window through which the signals from the two of the four load cells may be fed prior to reaching the controller.

According to a fourth aspect of the present disclosure, a patient bed may include a weigh scale to weigh a patient that may be supported on the patient bed. The weigh scale may have a plurality of load cells that may produce signals from which a patient weight may be determined. The signals from at least some of the plurality of load cells may be used to implement a ballistocardiogram to determine a heart rate of the patient by comparing signals from at least some of the plurality of load cells to at least one template waveform that may have been generated previously during a force plate ballistocardiogram test of a test subject in a standing position on a force plate ballistocardiogram.

In some embodiments of the fourth aspect, comparing signals may involve accounting for a posture of the patient relative to the frame. For example, the posture accounted for may include one or more of the following: supine, left lying, right lying, prone, or seated. Optionally, a transformation function may be used to map the signals corresponding to left lying, right lying, prone or seated postures to the supine posture. Further optionally, comparing signals may involve using a signal quality index (SQI) that may be determined as a function of an inverse of a distance between the signals and the respective at least one template waveform. For example, the distance may be determined by using a dynamic-time feature matching (DTFM) technique.

It is contemplated by the present disclosure with regard to the fourth aspect that comparing signals may involve calculating a Pearson correlation coefficient. Alternatively or additionally, determining the heart rate in connection with the fourth aspect may involve the use of at least one finite impulse response (FIR) band-pass filter with a Kaiser window through which the signals may be fed prior to comparing the signals to the respective at least one template waveform.

According to a fifth aspect of the present disclosure, a bed-based ballistocardiogram method may include weighing a patient supported on a bed by using a weigh scale of the patient bed. The weigh scale may have four load cells that may produce signals from which a patient weight may be determined. The method may also include implementing a ballistocardiogram to determine a heart rate of the patient by using signals from only two of the four load cells.

In some embodiments of the fifth aspect, the bed-based ballistocardiogram method further may include determining a respiration rate of the patient using the signals from only two of the four load cells. The bed of the method of the fifth aspect may include a frame that may support the weigh scale. The frame having a head end and a foot end, and the only two of the four load cells are situated closer to the foot end than to the head end.

If desired, implementing the ballistocardiogram to determine the heart rate in connection with the fifth aspect may include determining the heart rate based on a comparison of the signals from the two of the four load cells to at least one template waveform that may have been generated previously during a force plate ballistocardiogram test of a test subject in a standing position on a force plate ballistocardiogram. Optionally, the comparison may involve accounting for a posture of the patient relative to the frame. For example, the posture accounted for may include one or more of the following: supine, left lying, right lying, prone, or seated.

The bed-based ballistocardiogram method of the fifth aspect further may include implementing a transformation function that may map the signals from the two of the four load cells corresponding to left lying, right lying, prone or seated postures to the supine posture. If desired, the comparison may involve using a signal quality index (SQI) that may be determined as a function of an inverse of a distance between the signals from the two of the four load cells and the respective at least one template waveform. Furthermore, the method of the fifth aspect further may include using a dynamic-time feature matching (DTFM) technique to determine the distance between the signals from the two of the four load cells and the respective at least one template waveform.

In some embodiments of the method of the fifth aspect, the comparison involves calculating a Pearson correlation coefficient. Optionally, the method of the fifth aspect further may include feeding the signals from the two of the four load cells through at least one finite impulse response (FIR) band-pass filter with a Kaiser window.

According to a sixth aspect of the present disclosure, a bed-based ballistocardiogram method may include weighing a patient that may be supported on a bed by using a weigh scale of the patient bed. The weigh scale may have a plurality of load cells that may produce signals from which a patient weight may be determined. The method of the sixth aspect may also include implementing a ballistocardiogram to determine a heart rate of the patient by comparing signals from at least some of the plurality of load cells to at least one template waveform that may have been generated previously during a force plate ballistocardiogram test of a test subject in a standing position on a force plate ballistocardiogram.

In some embodiments of the sixth aspect, comparing the signals may include accounting for a posture of the patient relative to the frame. For example, the posture accounted for may include one or more of the following: supine, left lying, right lying, prone, or seated. Optionally, the method of the sixth aspect further may include using a transformation function to map the signals corresponding to left lying, right lying, prone or seated postures to the supine posture.

If desired, comparing signals in the sixth aspect may include using a signal quality index (SQI) that may be determined as a function of an inverse of a distance between the signals and the respective at least one template waveform. For example, the method of the sixth aspect further may include using a dynamic-time feature matching (DTFM) technique to determine the distance between the signals and the respective at least one template waveform. Alternatively or additionally, comparing signals in the sixth aspect may include calculating a Pearson correlation coefficient. Optionally, the method of the sixth aspect further may include feeding the signals from the at least some of the plurality of load cells through at least one finite impulse response (FIR) band-pass filter with a Kaiser window.

With regard to the first, second, third, and fourth aspects, the patient bed further may include an angle sensor that may provide an angle signal that may correspond to an angle of elevation of a head section of a mattress support deck of the patient bed. In such aspects, the angle signal may be used to determine that the patient may be in the seated posture. For example, the patient being in the seated posture may correspond to the angle signal being indicative that the head section may be pivotably raised at or above a threshold angle. Optionally, the threshold angle may be between about 30 degrees and about 80 degrees.

With regard to the fifth and sixth aspects, the bed-based ballistocardiogram method further may include using an angle signal from an angle sensor that may be coupled to a pivotable head section of a mattress support deck of the bed to determine that the patient may be in the seated posture. It is contemplated by the present disclosure that determining that the patient may be in the seated posture comprises determining that the angle signal may be indicative that the head section may be pivotably raised at or above a threshold angle. For example, the threshold angle may be between about 30 degrees and about 80 degrees.

According to a seventh aspect of the present disclosure, a patient bed may include a frame that may be configured to support a patient. The frame may include a first frame portion and a second frame portion. A plurality of load cells may support the first frame portion relative to the second frame portion. Each load cell of the plurality of load cells may produce a respective load cell signal that may be indicative of a weight that may be supported by the corresponding load cell of the plurality of load cells. Circuitry may include a controller that may include a processor and a memory. The circuitry may receive the plurality of load cell signals and the controller may be configured to determine a weight of the patient based on a summation of the plurality of load cell signals. The controller also may be configured to determine a heart rate of the patient or a respiration rate of the patient or both by comparing at least some of the load cell signals to at least one template waveform that may be generated previously during a ballistocardiogram test of a test subject that may be in a test position on the frame.

In some embodiments of the seventh aspect, the comparison may involve the controller accounting for a posture of the patient relative to the frame. For example, the posture accounted for by the controller may include one or more of the following: supine, left lying, right lying, prone, or seated. Optionally, the controller of the seventh aspect may be configured to implement a transformation function that may map the at least some of the load cell signals that may correspond to left lying, right lying, prone or seated postures to the supine posture.

If desired, the comparison of the seventh aspect may involve the controller using a signal quality index (SQI) that may be determined as a function of an inverse of a distance between the at least some of the load cells signals and the respective at least one template waveform. For example, the distance may be determined by the controller using a dynamic-time feature matching (DTFM) technique. Alternatively or additionally, the comparison of the seventh aspect may involve the controller calculating a Pearson correlation coefficient. Optionally, the circuitry of the seventh aspect may include at least one finite impulse response (FIR) band-pass filter with a Kaiser window through which the at least some of the load cell signals may be fed prior to reaching the controller.

According to an eighth aspect of the present disclosure, a patient bed may include a weigh scale to weigh a patient that may be supported on the patient bed. The weigh scale may have a plurality of load cells that may produce signals from which a patient weight may be determined. The signals from at least some of the plurality of load cells may be used to implement a ballistocardiogram to determine a heart rate of the patient by comparing signals from at least some of the plurality of load cells to at least one template waveform that may be generated previously during a ballistocardiogram test of a test subject in a test position on the patient bed.

In some embodiments of the eighth aspect, comparing signals may involve accounting for a posture of the patient relative to the frame. For example, the posture accounted for may include one or more of the following: supine, left lying, right lying, prone, or seated. Optionally, a transformation function may be used in the eighth aspect to map the signals corresponding to left lying, right lying, prone or seated postures to the supine posture. Further optionally, comparing signals in the eighth aspect may involve using a signal quality index (SQI) that may be determined as a function of an inverse of a distance between the signals and the respective at least one template waveform. For example, the distance may be determined by using a dynamic-time feature matching (DTFM) technique.

It is contemplated by the present disclosure with regard to the eighth aspect that comparing signals may involve calculating a Pearson correlation coefficient. Alternatively or additionally, determining the heart rate in connection with the eighth aspect may involve the use of at least one finite impulse response (FIR) band-pass filter with a Kaiser window through which the signals may be fed prior to comparing the signals to the respective at least one template waveform.

According to a ninth aspect of the present disclosure, a bed-based ballistocardiogram method may include weighing a patient that may be supported on a bed by using a weigh scale of the patient bed. The weigh scale may have a plurality of load cells that may produce signals from which a patient weight may be determined. The method of the eighth aspect may further include implementing a ballistocardiogram to determine a heart rate of the patient by comparing signals from at least some of the plurality of load cells to at least one template waveform that may be generated previously during a ballistocardiogram test of a test subject in a test position on the bed.

In some embodiments of the ninth aspect, comparing the signals may include accounting for a posture of the patient relative to the frame. For example, the posture accounted for may include one or more of the following: supine, left lying, right lying, prone, or seated. Optionally, the method of the ninth aspect further may include using a transformation function to map the signals corresponding to left lying, right lying, prone or seated postures to the supine posture.

If desired, comparing signals in the ninth aspect may include using a signal quality index (SQI) that may be determined as a function of an inverse of a distance between the signals and the respective at least one template waveform. For example, the method of the ninth aspect further may include using a dynamic-time feature matching (DTFM) technique to determine the distance between the signals and the respective at least one template waveform. Alternatively or additionally, comparing signals in the ninth aspect may include calculating a Pearson correlation coefficient. Optionally, the method of the ninth aspect further may include feeding the signals from the at least some of the plurality of load cells through at least one finite impulse response (FIR) band-pass filter with a Kaiser window.

With regard to the seventh and eighth aspects, the patient bed further may include an angle sensor that may provide an angle signal that may correspond to an angle of elevation of a head section of a mattress support deck of the patient bed. In such aspects, the angle signal may be used to determine that the patient may be in the seated posture. For example, the patient being in the seated posture may correspond to the angle signal being indicative that the head section may be pivotably raised at or above a threshold angle. Optionally, the threshold angle may be between about 30 degrees and about 80 degrees.

With regard to the ninth aspect, the bed-based ballistocardiogram method further may include using an angle signal from an angle sensor that may be coupled to a pivotable head section of a mattress support deck of the bed to determine that the patient may be in the seated posture. It is contemplated by the present disclosure that determining that the patient may be in the seated posture comprises determining that the angle signal may be indicative that the head section may be pivotably raised at or above a threshold angle. For example, the threshold angle may be between about 30 degrees and about 80 degrees.

Referring again to the seventh and eighth aspects of the patient bed, the test position may include, for example, a supine position and the at least one template waveform may include a supine waveform that may be captured in response to initiation by a user while the test subject may be in the supine position on the patient bed. The patient bed of the seventh and eighth aspects may further include a graphical user interface (GUI) that may receive at least one user input to initiate capturing the supine waveform. For example, the supine waveform may be captured during a waveform capture process that may proceed for a predetermined amount of time and that automatically may terminate after the predetermined amount of time. If desired, a terminate input may be selectable to stop the waveform capture process prior to the predetermined amount of time terminating automatically.

In some embodiments of the seventh aspect, the plurality of load cells may be included in a weigh scale of the patient bed. Optionally, therefore, the at least one template waveform may include a supine waveform that may be captured in response to a user of the patient bed of the seventh aspect taking a patient weight with the weigh scale. Also optionally, the test position may include, for example, a supine position of the test subject and the at least one template waveform of the seventh and eighth aspects may include a supine waveform that may be captured in response to a user of the patient bed taking a patient weight with the weigh scale while the test subject is in the supine position.

It is contemplated by the present disclosure that the patient bed of the seventh and eighth aspect may further include a graphical user interface (GUI) on the patient bed. The GUI may be operable to display a message to the user to coach the patient to move into and maintain the supine position prior to, and during, the supine waveform being captured.

With regard to the seventh aspect, the test position may include, for example, a supine position of the test subject and the at least one template waveform may include a supine waveform that may be captured in response to the controller and/or an independent system detecting that the patient may have moved into the supine position. With regard to the eighth aspect, the test position may include, for example, a supine position of the test subject and the patient bed further may include circuitry that may include a controller and the circuitry may be coupled to the plurality of load cells. Optionally, the at least one template waveform of the eighth aspect may further include a supine waveform that may be captured in response to the controller and/or an independent system detecting that the patient may have moved into the supine position.

In the seventh and eighth aspects, the controller may determine that the patient may be in the supine position based on signals from one or more of the plurality of load cells. In some embodiments of the seventh and eighth aspects, the independent system may include a camera system and/or a patient worn position sensor, each of which may be operable to classify the patient as being in the supine position.

Referring again to the bed-based ballistocardiogram method of the ninth aspect, the test position may include a supine position of the test subject, the at least one template waveform may include a supine waveform, and the method may further include capturing the supine waveform in response to initiation by a user while the test subject may be in the supine position on the bed. If desired, the method of the ninth aspect may further include receiving at least on user input on a graphical user interface (GUI) of the bed to initiate capturing the supine waveform. Optionally, the supine waveform of the ninth aspect may be captured during a waveform capture process that proceeds for a predetermined amount of time and that automatically may terminate after the predetermined amount of time. Further optionally, the bed-based ballistocardiogram method of the ninth aspect may include terminating the waveform capture process prior to the predetermined amount of time terminating automatically in response to selection by the user of a terminate input.

Still with reference to the bed-based ballistocardiogram method of the ninth aspect in which the at least one template waveform comprises a supine waveform and the test position includes a supine position of the test subject, the method may further include capturing the supine waveform in response to a user of the bed taking a patient weight with the weigh scale while the test subject is in the supine position.

If desired, the method of the ninth aspect may further include displaying a message on a graphical user interface (GUI) of the bed and the message may instruct the user to coach the patient to move into and maintain the supine position prior to, and during, the supine waveform being captured.

In some embodiments of the ninth aspect in which the at least one template waveform comprises a supine waveform and the test position includes a supine position of the test subject, the method may further include capturing the supine waveform in response to a controller of the bed and/or an independent system detecting that the patient may have moved into the supine position. Optionally, the controller may determine that the patient may be in the supine position based on signals from one or more of the plurality of load cells. In some embodiments of the ninth aspect, the independent system may include a camera system and/or a patient worn position sensor, each of which may be operable to classify the patient as being in the supine position.

According to a tenth aspect of the present disclosure, patient bed includes a frame, first, second, third, and fourth load cells, and circuitry including a controller having a processor and memory. The frame may be configured to support a patient, the frame including a first frame portion and a second frame portion. The first, second, third, and fourth load cells may support the first frame portion relative to the second frame portion. Each of the first, second, third, and fourth load cells may produce a respective first, second, third, and fourth load cell signal indicative of a weight supported by the corresponding first, second, third, and fourth load cell. The circuitry may receive the first, second, third, and fourth load cell signals and the controller may be configured to determine a weight of the patient based on a summation of the first, second, third, and fourth load cell signals. The controller may also be configured to determine the heart rate of the individual using the first, second, third, and fourth load cell signals by probabilistically estimating the inter-beat-interval.

In some embodiments of the tenth aspect, the circuitry may further include instructions in memory, that, when executed by the processor applies a Bayesian approach to fusion to selectively fuse the signals from the first, second, third, and fourth load cells.

In some embodiments of the tenth aspect, the circuitry may further include instructions in memory, that, when executed by the processor cause the selective fusion of the signal includes applying an assessment of a probability density function obtained from each signal.

In some embodiments of the tenth aspect, the circuitry may further include instructions in memory, that, when executed by the processor, performs an assessment of the reliability of the probability density function for each signal.

In some embodiments of the tenth aspect, the circuitry may further include instructions in memory, that, when executed by the processor, assesses the reliability of the probability density function for each signal by introducing a modified q-value.

In some embodiments of the tenth aspect, the circuitry may further include instructions in memory, that, when executed by the processor, applies Gaussian weights to each of the respective signals from each of the first, second, third, and fourth load cells to produce a weighted joint probability density function.

In some embodiments of the tenth aspect, the circuitry may further include instructions in memory, that, when executed by the processor, combines three time-domain local estimators to obtain a joint probability density function for each respective load cell signal.

In some embodiments of the tenth aspect, the circuitry may further include instructions in memory, that, when executed by the processor, applies Bayesian fusion to the four load cell signals establish a fused data set.

In some embodiments of the tenth aspect, the circuitry may further include instructions in memory, that, when executed by the processor, applies a Gaussian weighting to the load cell signals to remove deviations due to patient movement on the load cells.

In some embodiments of the tenth aspect, the circuitry may further include instructions in memory, that, when executed by the processor, cause the Gaussian weighting to be applied in near-real-time to provide near-real-time heart rate.

In some embodiments of the tenth aspect, the circuitry may further include instructions in memory, that, when executed by the processor, the quality of the weighted probability density function is assessed by comparing the q-value for the respective signal curve.

In some embodiments of the tenth aspect, the circuitry may further include instructions in memory, that, when executed by the processor, identifies a potential inter-beat-interval based on maximizing the probability of the probability density function for each channel and combining those channels by Bayesian fusion.

In some embodiments of the tenth aspect, the circuitry may further include instructions in memory, that, when executed by the processor, discriminates between multiple potential inter-beat-interval values by comparing potential inter-beat-interval values and their absolute difference to a reference value for the particular inter-beat-interval value and choosing the value that has the smallest absolute difference.

In some embodiments of the tenth aspect, the circuitry may further include instructions in memory, that, when executed by the processor, apply a finite impulse response band-pass filter with a Kaiser window to the respective load cell signals.

According to an eleventh aspect of the present disclosure, patient bed includes a frame, and a plurality of load cells, and circuitry including a controller having a processor and memory. The frame may be configured to support a patient, the frame including a first frame portion and a second frame portion. The plurality of load cells may support the first frame portion relative to the second frame portion. The circuitry may receive the plurality of load cell signals. The controller may be configured to determine a weight of the patient based on a summation of the plurality of load cell signals, the controller also being configured to determine the heart rate of the individual using plurality of load cell signals by probabilistically estimating the inter-beat-interval.

In some embodiments of the eleventh aspect, the circuitry may further include instructions in memory, that, when executed by the processor applies a Bayesian approach to fusion to selectively fuse the signals from plurality of load cells.

In some embodiments of the eleventh aspect, the circuitry may further include instructions in memory, that, when executed by the processor cause the selective fusion of the signal includes applying an assessment of a probability density function obtained from each signal.

In some embodiments of the eleventh aspect, the circuitry may further include instructions in memory, that, when executed by the processor, performs an assessment of the reliability of the probability density function for each signal.

In some embodiments of the eleventh aspect, the circuitry may further include instructions in memory, that, when executed by the processor, assesses the reliability of the probability density function for each signal by introducing a modified q-value.

In some embodiments of the eleventh aspect, the circuitry may further include instructions in memory, that, when executed by the processor, applies Gaussian weights to each of the respective signals from each of the plurality of load cells to produce a weighted joint probability density function.

In some embodiments of the eleventh aspect, the circuitry may further include instructions in memory, that, when executed by the processor, combines three time-domain local estimators to obtain a joint probability density function for each respective load cell signal.

In some embodiments of the eleventh aspect, the circuitry may further include instructions in memory, that, when executed by the processor, applies Bayesian fusion to the four load cell signals establish a fused data set.

In some embodiments of the eleventh aspect, the circuitry may further include instructions in memory, that, when executed by the processor, applies a Gaussian weighting to the load cell signals to remove deviations due to patient movement on the load cells.

In some embodiments of the eleventh aspect, the circuitry may further include instructions in memory, that, when executed by the processor, cause the Gaussian weighting to be applied in near-real-time to provide near-real-time heart rate.

In some embodiments of the eleventh aspect, the circuitry may further include instructions in memory, that, when executed by the processor, the quality of the weighted probability density function is assessed by comparing the q-value for the respective signal curve.

In some embodiments of the eleventh aspect, the circuitry may further include instructions in memory, that, when executed by the processor, identifies a potential inter-beat-interval based on maximizing the probability of the probability density function for each channel and combining those channels by Bayesian fusion.

In some embodiments of the eleventh aspect, the circuitry may further include instructions in memory, that, when executed by the processor, discriminates between multiple potential inter-beat-interval values by comparing potential inter-beat-interval values and their absolute difference to a reference value for the particular inter-beat-interval value and choosing the value that has the smallest absolute difference.

1 In some embodiments of the eleventh aspect, the circuitry may further include instructions in memory, that, when executed by the processor, apply a finite impulse response band-pass filter with a Kaiser window to the respective load cell signals.

According to a twelfth aspect of the present disclosure, a patient bed includes a weigh scale to weigh a patient on the bed, the weigh scale having a plurality of load cells that produce a signal. The patient bed includes circuitry including a processor and a memory device, the memory device including instructions that, when executed by the processor, determine the heart rate of the individual from the load cell signals by probabilistically estimating the inter-beat-interval.

In some embodiments of the twelfth aspect, the circuitry may further include instructions in memory, that, when executed by the processor applies a Bayesian approach to fusion to selectively fuse the signals from the load cells.

In some embodiments of the twelfth aspect, the circuitry may further include instructions in memory, that, when executed by the processor cause the selective fusion of the signal includes applying an assessment of a probability density function obtained from each signal.

In some embodiments of the twelfth aspect, the circuitry may further include instructions in memory, that, when executed by the processor, performs an assessment of the reliability of the probability density function for each signal.

In some embodiments of the twelfth aspect, the circuitry may further include instructions in memory, that, when executed by the processor, assesses the reliability of the probability density function for each signal by introducing a modified q-value.

In some embodiments of the twelfth aspect, the circuitry may further include instructions in memory, that, when executed by the processor, applies Gaussian weights to each of the respective signals from each of the load cells to produce a weighted joint probability density function.

In some embodiments of the twelfth aspect, the circuitry may further include instructions in memory, that, when executed by the processor, combines three time-domain local estimators to obtain a joint probability density function for each respective load cell signal.

In some embodiments of the twelfth aspect, the circuitry may further include instructions in memory, that, when executed by the processor, applies Bayesian fusion to the load cell signals establish a fused data set.

In some embodiments of the twelfth aspect, the circuitry may further include instructions in memory, that, when executed by the processor, applies a Gaussian weighting to the load cell signals to remove deviations due to patient movement on the load cells.

In some embodiments of the twelfth aspect, the circuitry may further include instructions in memory, that, when executed by the processor, cause the Gaussian weighting to be applied in near-real-time to provide near-real-time heart rate.

In some embodiments of the twelfth aspect, the circuitry may further include instructions in memory, that, when executed by the processor, the quality of the weighted probability density function is assessed by comparing the q-value for the respective signal curve.

In some embodiments of the twelfth aspect, the circuitry may further include instructions in memory, that, when executed by the processor, identifies a potential inter-beat-interval based on maximizing the probability of the probability density function for each channel and combining those channels by Bayesian fusion.

In some embodiments of the twelfth aspect, the circuitry may further include instructions in memory, that, when executed by the processor, discriminates between multiple potential inter-beat-interval values by comparing potential inter-beat-interval values and their absolute difference to a reference value for the particular inter-beat-interval value and choosing the value that has the smallest absolute difference.

In some embodiments of the twelfth aspect, the circuitry may further include instructions in memory, that, when executed by the processor, apply a finite impulse response band-pass filter with a Kaiser window to the respective load cell signals.

According to a thirteenth aspect of the present disclosure, a method of probabilistically estimating the heart rate of a patient supported on a patient bed having a weigh scale to weigh a patient on the bed, the weigh scale having a plurality of load cells that produce a signal includes determining the heart rate of the individual from the load cell signals by probabilistically estimating the inter-beat-interval.

In some embodiments of the thirteenth aspect, the method may further include applying a Bayesian approach to fusion to selectively fuse the signals from the first, second, third, and fourth load cells.

In some embodiments of the thirteenth aspect, the method may further include causing the selective fusion of the signal by applying an assessment of a probability density function obtained from each signal.

In some embodiments of the thirteenth aspect, the method may further include performing an assessment of the reliability of the probability density function for each signal.

In some embodiments of the thirteenth aspect, the method may further include assessing the reliability of the probability density function for each signal by introducing a modified q-value.

In some embodiments of the thirteenth aspect, the method may further include applying Gaussian weights to each of the respective signals from each of the load cells to produce a weighted joint probability density function.

In some embodiments of the thirteenth aspect, the method may further include combining three time-domain local estimators to obtain a joint probability density function for each respective load cell signal.

In some embodiments of the thirteenth aspect, the method may further include applying Bayesian fusion to the load cell signals establish a fused data set.

In some embodiments of the thirteenth aspect, the method may further include applying a Gaussian weighting to the load cell signals to remove deviations due to patient movement on the load cells.

In some embodiments of the thirteenth aspect, the method may further include causing the Gaussian weighting to be applied in near-real-time to provide near-real-time heart rate.

In some embodiments of the thirteenth aspect, the method may further include assessing the quality of the weighted probability density function by comparing the q-value for the respective signal curve.

In some embodiments of the thirteenth aspect, the method may further include identifying a potential inter-beat-interval based on maximizing the probability of the probability density function for each channel and combining those channels by Bayesian fusion.

In some embodiments of the thirteenth aspect, the method may further include discriminating between multiple potential inter-beat-interval values by comparing potential inter-beat-interval values and their absolute difference to a reference value for the particular inter-beat-interval value and choosing the value that has the smallest absolute difference.

In some embodiments of the thirteenth aspect, the method may further include applying a finite impulse response band-pass filter with a Kaiser window to the respective load cell signals.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which:

FIG. 14 is a table showing the mean absolute error analysis of the heart rate estimation to analyze the accuracy of the different approach shown in FIG. 11.

DETAILED DESCRIPTION

Figure 1:
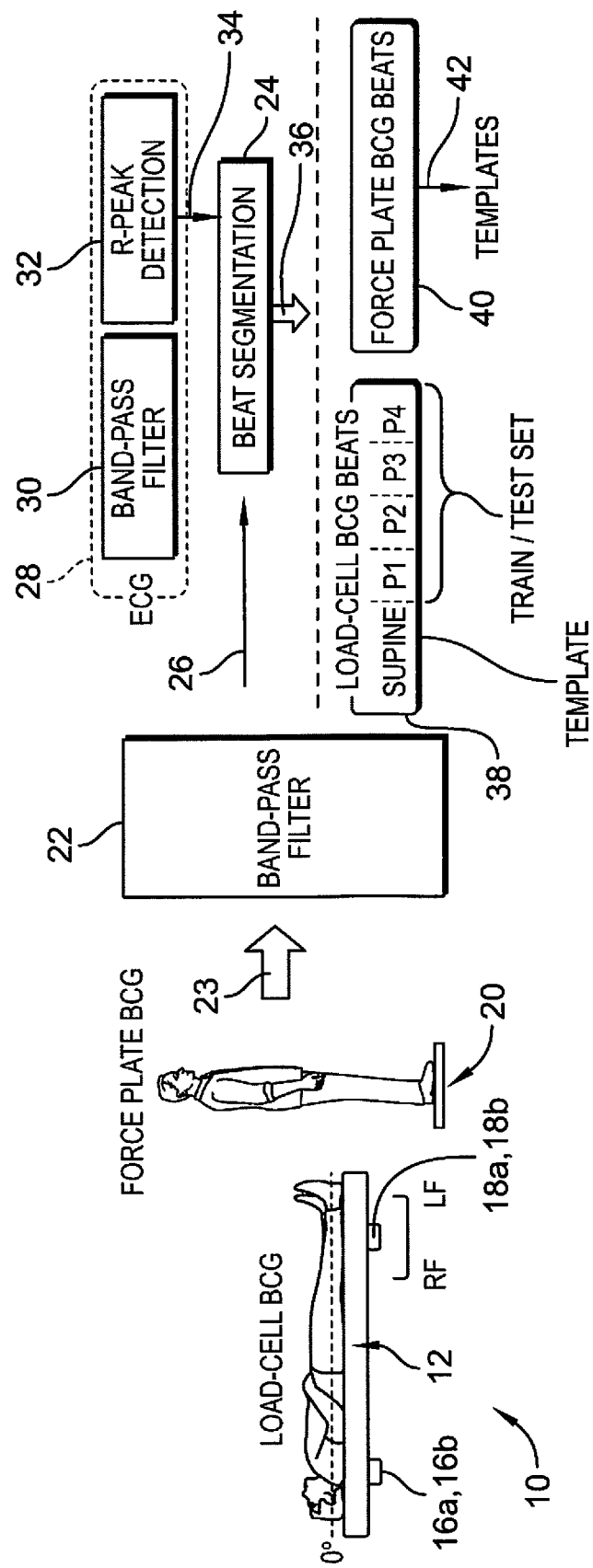
FIG. 1 is a block diagram showing a test setup for a bed-based ballistocardiogram (BCG) and standing BCG measured with a force plate.

The ballistocardiogram (BCG), a measurement of cardiogenic whole body movements, is a technique that enables non-invasive cardiovascular monitoring. A main challenge of the BCG signal is that its morphology and amplitude are sensitive to the posture and/or position of the subject during the recording period. The effects of posture on the BCG measured from a subject standing on a weighing scale have been investigated in the literature, but the effects of body posture and/or position on BCG signals measured from a subject lying in bed have not been quantified. This work elucidates these effects in bed-based BCG recordings by (1) creating templates for standing BCG signals obtained from subjects in a prior study, and (2) quantifying the distance between these templates and BCG waveforms obtained in different body positions on the bed for a new set of subjects. The signal quality index (SQI), defined in previous work and corresponding to the inverse of the distance to the templates, was the highest for the supine posture and the lowest for the lateral postures. A previously-reported system identification approach to correct for distortions in the lateral, prone, and seated postures was further validated. The system identification algorithm significantly improved the signal quality and correlation to the reference morphology—the supine BCG. This work has implications for robust signal processing that allows for accurate physiological interpretation of the BCG obtained in a variety of postures from a subject in bed.

To account for the postural influence on BCG signals, the effects of different standing and seated postures on BCG signals measured with the scale have been quantified in A. Q. Javaid, A. D. Wiens, N. F. Fesmire, M. A. Weitnauer, and O. T. Inan, "Quantifying and Reducing Posture-Dependent Distortion in Ballistocardiogram Measurements," *IEEE Journal of Biomedical and Health Informatics*, 2015 (hereinafter "Javaid and Wiens"). This study also presented a system identification method to correct distorted signals and demonstrated improvement in correlation to the pre-ejection period (PEP) in reference to the impedance cardiogram (ICG). However, such an approach has never been used for bed-based BCG. This work quantifies the effects of body position in the bed on BCG signals measured with the load cells in a hospital patient bed. The quality of BCG signals from five different postures—supine, left/right lateral, prone, and seated are demonstrated using the standing BCG as a reference. Signal quality was assessed with a previously described method which has shown robust performance with other cardiogenic signals. See, J. S. Zia, J. Kimball, S. Hersek, M. Shandhi, B. Semiz, and O. Inan, "A Unified Framework for Quality Indexing and Classification of Seismocardiogram Signals," *IEEE Journal of Biomedical and Health Informatics*, 2019 (hereinafter "Zia"). Furthermore, signal morphology was corrected with the system identification method found in Javaid and Wiens.

I. METHODS

A. Experimental Protocol

The human subjects study was approved by the Georgia Institute of Technology Institutional Review Board (IRB). Written informed consent was obtained for each subject prior to the data collection. In total, 11 healthy subjects (Male: 6, Female: 5; Age: 27.8±4; Weight: 71.54±19.5 kg; Height: 172.27±12.3 cm) were recruited for this study. FIG. 1 shows the test setup for the data collection. BCG signals from the load cells embedded in a patient bed (CENTRELLA™, Hill-Rom) along with the reference electrocardiogram (ECG) signal were recorded while subjects were on the bed. The outputs from the load cells were amplified through a custom-designed circuit similar to Inan and Paloma. Note that there are four output channels in this system, but only the left/right foot channels were recorded for this work. The outputs from two foot channels were concatenated posture-wise. Three electrodes were placed on the chest of each subject for Lead II electrocardiogram (ECG) recording via the Biopac BN-ECG2 system; note that this ECG was acquired for purposes of verifying the heartbeat detection capability of the BCG, and would not be required in a future deployment of the system. Both ECG and BCG signals were continuously recorded via a data acquisition unit (DAQ, MP150, Biopac Systems) with a sampling rate of 1 kHz. During the protocol, subjects were asked to lay down on the bed and remain still in five different postures including supine, left and right lateral ($P_1$ and $P_2$), prone ($P_3$), and seated ($P_4$). The seated posture required the bed to be adjusted to the seated configuration. Subjects remained in each posture for one minute.

To generate templates of the BCG signal measured in the standing upright posture, the data set from another study was used. This data set consists of 30 healthy patients (Male: 20, Female: 10, Age: 26.4±3.2, Weight: 70.95±14.43 kg; Height: 172.94±9.69 cm). The subjects were asked to stand upright on the force plate for two minutes while the BCG and ECG signals were recorded. The methods of template generation will be described below.

B. Pre-Processing

A block diagram of pre-processing steps is shown in FIG. 1. All signals were filtered using a finite impulse response (FIR) band-pass filter with Kaiser window. Cut-off frequencies were 1-40 Hz for ECG and 0.5-12 Hz for BCG. ECG R-peaks were detected by thresholding and used as a reference for segmenting BCG signals into beats corresponding to cardiac cycles. For each BCG beat, a few samples before the ECG R-peaks were padded to account for the filter length t in the system identification, which will be discussed in Section II-C. This segmentation resulted in a frame length of d=600 samples after R-peaks+filter length t. The padded segment of length t was removed for testing.

A set of BCG beats extracted from the recordings while the $k^{th}$ subject was in the supine posture—denoted as $B_s^k$— was used to generate a template for the supine posture. Templates of supine BCG signals ($t_s^k$) were generated by Woody's algorithm, which iteratively aligns and averages beats in a set. See, C. D. Woody, "Characterization of an adaptive filter for the analysis of variable latency neuroelectric signals," *Medical & Biological Engineering*, 1967. Templates of standing BCG signals ($t_f$) were generated in the same way and the set of standing BCG templates from all N=30 subjects was defined as, $$T_f = \{t_{p'}^1, t_{p'}^1, \ldots, t_f^N\}.$$

For all other postures, beats from the first 20 seconds of the one-minute recording were smoothed with an exponential moving average filter with a window of five beats, and included in a training set $$B_i^k (B_i^k \in \mathbb{R}^{d \times M},$$

i=posture $P_i$, M=number of heartbeats). The remaining beats from each posture were included in a testing set $$U_i^k (U_i^k \in \mathbb{R}^{l \times M'},$$

i=posture $P_i$, l=600, M'=number of heartbeats). For each training and testing set, beats from left and right foot channels were included in equal proportions.

C. BCG Morphology Correction

To correct the BCG morphology distorted by the posture, a transformation function that maps distorted BCG signals to "good-posture" BCG signals was found. In this study, BCG signals from the supine posture were considered as "good-posture" BCG signals for beat correction, as the signal quality was the highest in the supine posture based on the analysis in Section III, and prior knowledge on BCG signals. See, Inan and Migeotte. This transformation function can be determined via a linear system identification method (see, Javaid and Wiens), which can be formulated as the following least-squares problem:

$$y = Ax \qquad (1)$$

Here, for each subject k and posture $P_i$, the matrix A was composed with lagged vectors from each training beats $$b_{i,j}^k (b_{i,j}^k \in B_i^k,$$

i=posture $P_i$, j=$j^{th}$ beat), and the output vector y was made up with samples from the supine template $t_s^k$. The variable x serves as 1-D FIR filter coefficients for a linear mapping between each training beats and the supine BCG template. With the filter order of t, and $H_i^k$ denoting a transformation from posture $P_i$ to the supine template $t_s^k$, mathematical expressions of y, A, and x are given as:

$$y = [t_s^k[t] \quad t_s^k[t+1] \quad \ldots \quad t_s^k[d]]^T \qquad (2)$$

$$x = [H_i^k[1] \quad H_i^k[2] \quad \ldots \quad H_i^k[t]]^T \qquad (3)$$

$$A = \begin{bmatrix} b_{i,j}^k[t] & b_{i,j}^k[t-1] & \ldots & b_{i,j}^k[1] \\ b_{i,j}^k[t+1] & b_{i,j}^k[t] & \ldots & b_{i,j}^k[2] \\ \vdots & \vdots & \ddots & \vdots \\ b_{i,j}^k[d] & b_{i,j}^k[d-1] & \ldots & b_{i,j}^k[d-t+1] \end{bmatrix} \qquad (4)$$

The filter length t was determined through 3-fold cross validation as done in Javaid and Wiens. The filter length t determined through this procedure was used for the final training.

The least-squares solution û to (1) that minimizes the $l_2$-norm of error in (5) can be expressed as (6). The Tikhonov regularization term δ was added in (5) to avoid overfitting and increase robustness to mild noise. See, A. N. Tikhonov, "Solution of Incorrectly Formulated Problems and the Regularisation Method.pdf," *Soviet Mathematics Doklady*, 1963. The parameter δ was set to 0.01 in this work.

$$\min_{x \in \mathbb{R}^M} \|y - Ax\|_2^2 + \delta \|x\|_2^2 \qquad (5)$$

$$\hat{x} = (A^T A + \delta I)^{-1} A^T y \qquad (6)$$

The FIR coefficients û found for each training beat were averaged across all training beats of posture $P_i$, and the averaged coefficients were used as the transformation function $H_i^k$ during testing.

D. Evaluation

The evaluation of this work was based on the signal quality index (SQI), a function of the inverse distance between a captured signal and the reference template. There are multiple methods to estimate distance, but the dynamic-time feature matching (DTFM) distance in Zia was used in this study. DTFM computes distance by matching features in a signal to corresponding features in a template. The work in Zia has shown this metric to be a reliable measure of the signal quality for noninvasive cardiac bio-signals.

To compare the morphology of raw beats and the corrected beats for each posture, the SQI and Pearson correlation coefficient were calculated. The three metrics computed for each testing beat $$u_{i,j}^k, (u_{i,j}^k, \in U_i^k)$$

were SQI for the standing BCG templates ($SQI_{standing}$) (7), SQI for the supine templates ($SQI_{supine}$) (8), and correlation to the supine template ($\rho_{supine}$) (9). Note that $SQI_{supine}$ and $\rho_{supine}$ are for intra-subject evaluation, such that scores were computed against the supine template of the subject corresponding to the test beats. SQIs were averaged over all testing beats of each posture and the mean SQIs were reported as the final scores. For consistent scaling, corrected, raw, and template beats were normalized for SQI computation. The expressions for the aforementioned evaluation metrics are given as:

$$SQI_{standing} = \frac{1}{M'} \frac{1}{N} \sum_{j=1}^{M'} \sum_{t_f \in T_f} SQI(u_{i,j}^k, t_f) \quad (7)$$

$$SQI_{supine} = \frac{1}{M'} \sum_{j=1}^{M'} SQI(u_{i,j}^k, t_s^k) \quad (8)$$

$$\rho_{supine} = \frac{Cov(u_i^k, t_s^k)}{\sigma_{u_i^k} \sigma_{t_s^k}} \quad (9)$$

II. RESULTS

Figure 2:
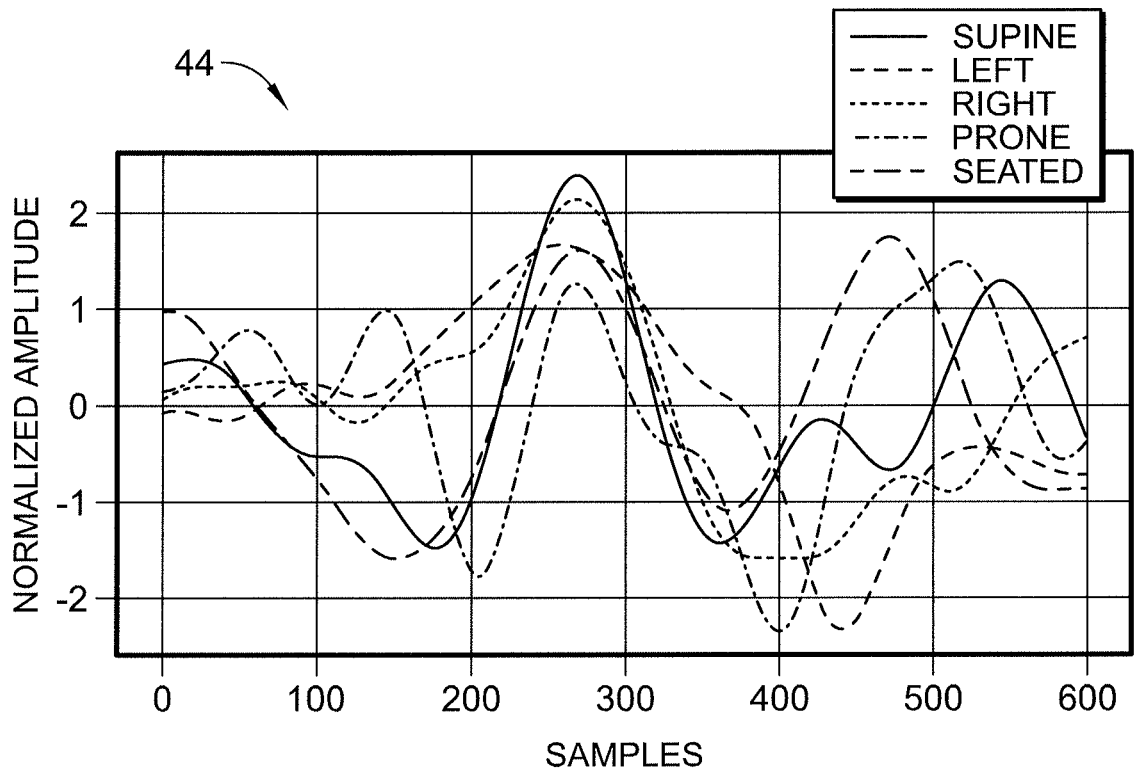
FIG. 2 is a graph of an ensemble-averaged raw heart beats for supine, left-lying, right-lying, prone and seated patient postures with a y-axis of the graph showing a normalized signal amplitude.

FIG. 2 shows an example plot of ensemble-averaged raw beats for each posture. Note that the whole protocol, which included all five postures, was 10-minutes long without any interventions that could result in physiological changes. Therefore, the differences in morphology between postures shown in FIG. 2 are due mainly to postural changes. The $SQI_{standing}$ shown in FIG. 3 quantifies this observation. The median SQI for the supine posture was the highest with 0.67, followed by the seated posture (0.65). Left and right lateral postures showed the lowest scores (0.57 and 0.56, respectively), while the prone posture was slightly higher with a score of 0.60.

The supine posture had significantly higher SQI than all other postures, indicating that the morphology in this posture—among the five postures explored—is closest to the BCG measured in the standing upright posture, a reference standard for the BCG measurement. However, the standing BCG templates themselves cannot be used as the reference for beat correction, as they were measured from other subjects or at a different time; thus the temporal physiological information specific to the patient is not reflected. Therefore, templates generated from the supine posture were used as the reference to train coefficients in the system identification method.

Figure 4A:
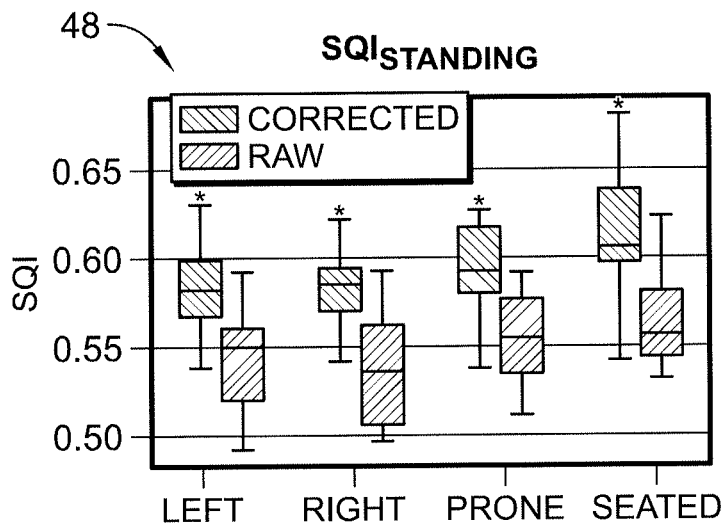
FIG. 4A is a box plot of SQI for raw and corrected beats of a patient standing on the force plate.

FIG. 4A shows $SQI_{supine}$ for both raw and corrected beats. Corrected beats have significantly higher SQI than the raw beats for all postures. The same trend was observed in FIG. 4B, where the SQI was computed against the supine templates. The decrease in distance to standing BCG templates demonstrates the improvement in signal quality in general, based on the gold standard measurement. Furthermore, the decreased distance to supine templates indicates that the transformation allows consistency among BCG beats that are measured at the same time point. The correlation to supine templates in FIG. 4C also supports this result, showing significant improvement after correction.

III. DISCUSSION AND CONCLUSION

In this work, changes in BCG morphology induced by the body position in the patient bed were quantified. The assessment of signal quality was done—for the first time—based on the distance between bed-based BCG and the standard standing BCG. In accordance with the known characteristics of BCG forces, BCG in the supine posture had the highest similarity to the standing upright posture as measured by the SQI, while the BCG in the lateral postures had the lowest quality. The seated posture in this work had relatively high SQI unlike the previous study of Javaid and Wiens, where significant distortions were observed. This could possibly be due to the difference in the method of measurement—in this work, the load-cells were fixed to the frame of the patient bed underneath the mattress. Thus, the load cell locations remained the same regardless of subject posture, potentially leading to relatively smaller measured differences between positions. This is in contrast to the setup in Javaid and Wiens, where the dampened BCG forces in the seated posture were directly reflected in the recordings as the scale was placed between the subject and the chair.

Furthermore, system identification demonstrably corrected distortions in the signal morphology due to different body postures. The corrected beats for each posture had significantly higher signal quality than the raw beats based on both the general and subject-specific evaluations. These results indicate the feasibility of this approach for robust signal processing to extract physiologically relevant features from BCG signals recorded from a patient bed.

Correcting postural effects on signal morphology may not be required for the estimation of cardiac cycles as posture distortion would consistently appear in the same pattern across neighboring beats while the posture is maintained. However, removing these effects is important for investigating the in-depth correlation of BCG signals to cardiorespiratory parameters, particularly those related to timings and amplitudes of the I-, J-, and K-points of the BCG, such as PEP, pulse transit time, and aortic pulse amplitude. See, Kim and Ober. The effects of morphology correction on estimating such cardiorespiratory parameters could be done as future work.

A limitation of this study is that the model was trained on each individual for each manually identified posture. Future work could automate this by training a machine learning model to identify the postures and use corresponding pre-trained coefficients for linear transformation. With this approach, the method in this work could extend to real-time applications.

IV. ADDITIONAL INFORMATION

As noted above, the bed used in the study was a CENTRELLA™ bed available from Hill-Rom Company, Inc. of Batesville, Indiana. Additional details of the CENTRELLA™ bed can be found in U.S. Pat. No. 10,517,784 B2 ("the '784 patent") which is hereby incorporated by reference herein in its entirety for all that it teaches to the extent not inconsistent with the present disclosure which shall control as to any inconsistencies. See particularly, FIG. 20 of the '784 patent and the related discussion including the discussion of the four load cells 522, 524, 526, 528 found at col. 26, line 58-col. 27, line 26 of the '784 patent. See also FIGS. 51F-51I of the '784 patent which depicts the electrical control board to which the four load cells 522, 524, 526, 528 are electrically coupled. The control board is among the overall circuitry of the bed disclosed in the '784 patent and includes a controller (e.g., a microcontroller) having a processor (e.g., microprocessor) and memory.

Referring now to FIG. 1, a patient bed 10 has a patient support platform 12 supporting a test subject thereon. Platform 12 is shown diagrammatically in FIG. 1 but typically includes a mattress such as a foam mattress, an air mattress having inflatable bladders, a hybrid mattress having inflatable bladders and foam elements, and the like as well as a mattress support deck 14 (see FIG. 5) supporting the mattress. A pair of load cells 16a, 16b are shown in FIG. 1 as a single block supporting a head end region of platform 12 and a pair of load cells 18a, 18b are shown in FIG. 1 as a single block 18a, 18b supporting a foot end region of platform 12. As discussed above, signals from load cells 18a, 18b are used as inputs for the BCG circuitry and algorithm. Thus, signals from only two of the four load cells 16a, 16b, 18a, 18b are used, and the two signals used in the illustrative example originate from the two load cells 18a, 18b at the foot end of the bed 10.

Still referring to FIG. 1, the test subject is shown standing on a force plate BCG 20. Signals from load cells 18a, 18b and signals from force plate BCG 20 are processed by a band-pass filter 22 as indicated diagrammatically by arrow 23 in FIG. 1. It should be appreciated that the signals from load cells 18a, 18b and from force plate BCG 20 are provided to band-pass filter 22 at different times. That is, the signals from force plate BCG 20 are processed during a first test and signals from load cells 18a, 18b are processed during a second test that does not occur at the same time as the first test. As noted above, band-pass filter 22 is a finite impulse response (FIR) band-pass filter with Kaiser window in some embodiments.

After passing through band-pass filter 22, the resulting filtered signal is fed to a beat segmentation block 24 as indicated by arrow 26 in FIG. 1. During the testing of the test subject on bed 10 and force plate BCG 20, the test subject also was being monitored by a reference electrocardiogram 28, the details of which were discussed above. In the example of FIG. 1, ECG 28 is depicted with its own band-pass filter 30 and an R-peak detection block 32. An output signal from the ECG is also fed to the beat segmentation block 24 as indicated by arrow 34 in FIG. 1. The operation of beat segmentation block 24 was discussed above under the heading "Pre-Processing." The output from the beat segmentation block 24, which is indicated by arrow 36, is used to generate load cell BCG beats 38 if the signals from load cells 18a, 18b are the signals under test or to generate force plate BCG beats 40 if signals from force plate BCG are the signals under test. Based on the beats generated at blocks 38, 40, templates are created as indicated by arrow 42 in the case of BCG beats 40. With regard to load cell BCG beats 38, a template is created in connection with the test subject being in a supine position on bed 10. Load cell BCG beats are also analyzed in connection with a training or test set of conditions in which the test subject is in various positions as indicated by P1, P2, P3, P4 in block 38 which are referring to positions 1-4, such as right lying, left lying, prone, and sitting or seated, for example. Right lying means the test subject or bed occupant is lying on their right side and left lying means the test subject or bed occupant is lying on their left side. These positions are sometimes referred to herein as simply "right" and "left," respectively.

Referring now to FIG. 2, a graph 44 of an ensemble-averaged raw heart beats for supine, left-lying, right-lying, prone and seated patient postures is shown with a y-axis of the graph showing a normalized signal amplitude. The legend in the upper right hand portion of graph 44 indicates which line pattern corresponds to the traces regarding the respective positions of the test subject. Additional discussion of FIG. 2 is provided above under the "Evaluation" heading. As noted above, the graph 44 was generated based on data that was taken for 10 minutes for each of the indicated positions.

Figure 3:
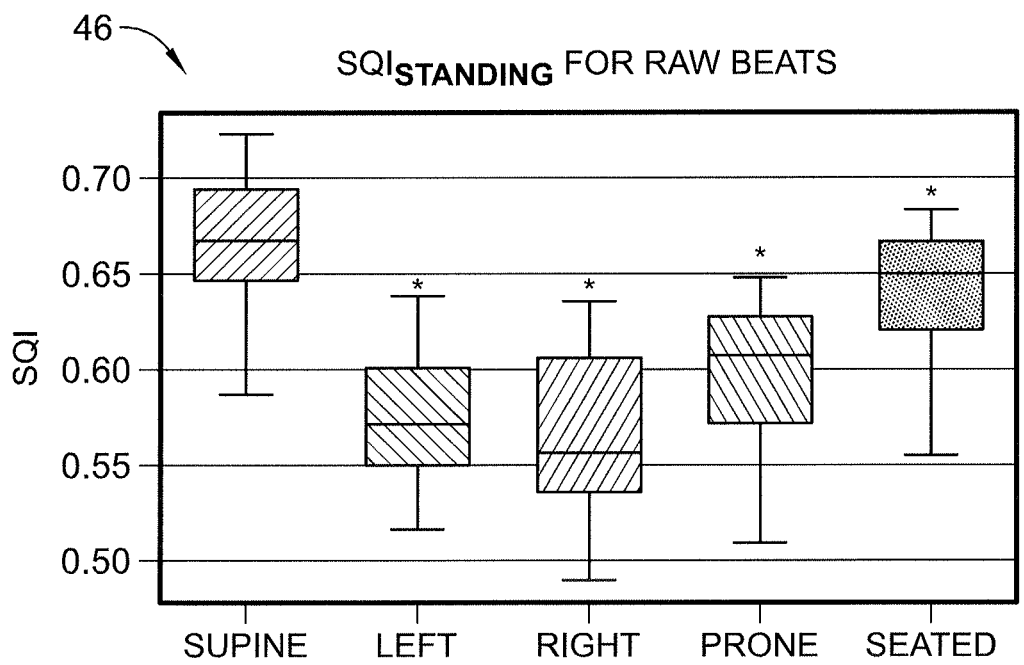
FIG. 3 is a box plot of signal quality index (SQI) computed over standing BCG templates using the ensemble-averaged raw heart beats from FIG. 2 for each posture.

Referring now to FIG. 3, a box plot 46 of signal quality index (SQI) computed over standing BCG templates using the ensemble-averaged raw heart beats from FIG. 2 for each posture is shown. Additional discussion of FIG. 3 is also provided above under the "Evaluation" heading.

Figure 4B:
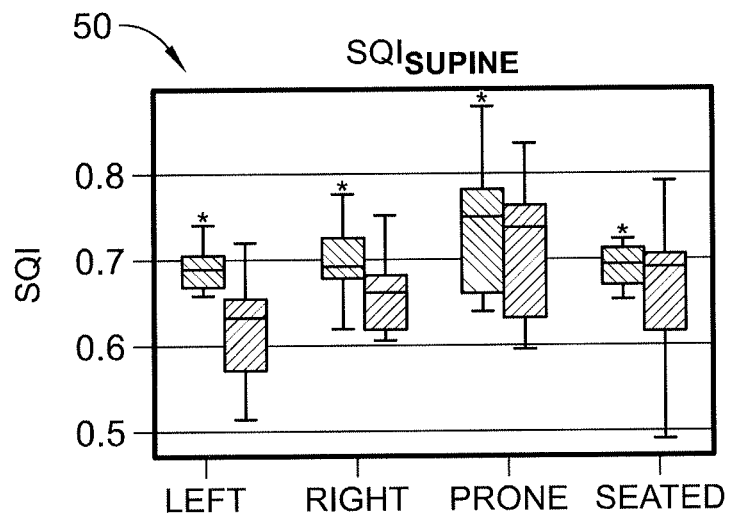
FIG. 4B is a box plot of SQI for raw and corrected beats of a patient lying on a bed in a supine position.
Figure 4C:
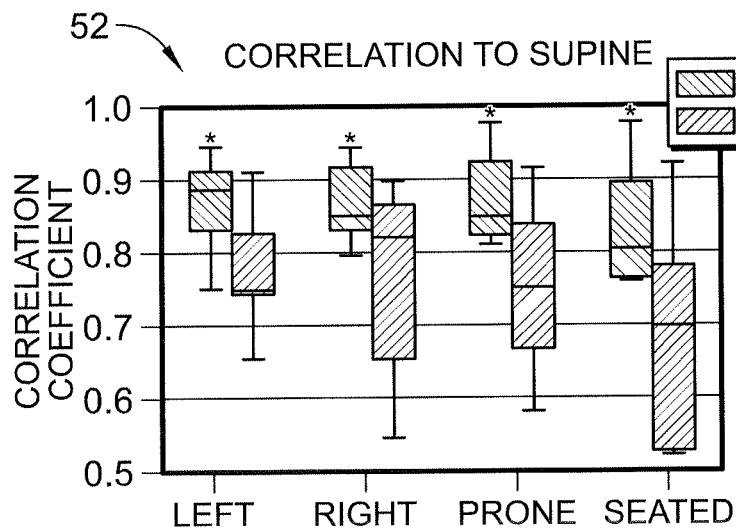
FIG. 4C is a box plot of a Pearson correlation coefficient between left-lying, right-lying, prone, and seated postures and the supine template, before and after correction.

FIG. 4A shows a box plot 48 of SQI for raw and corrected beats of a patient standing on the force plate BCG 20. FIG. 4B shows a box plot 50 of SQI for raw and corrected beats of a patient lying on bed 10 in the supine position. FIG. 4C shows a box plot 52 of a Pearson correlation coefficient between left-lying, right-lying, prone, and seated postures and the supine template, before and after correction. As was the case with FIGS. 2 and 3, additional discussion of box plots 48, 50, 52 of FIGS. 4A, 4B, 4C, respectively, is provided above under the "Evaluation" heading.

Figure 5:
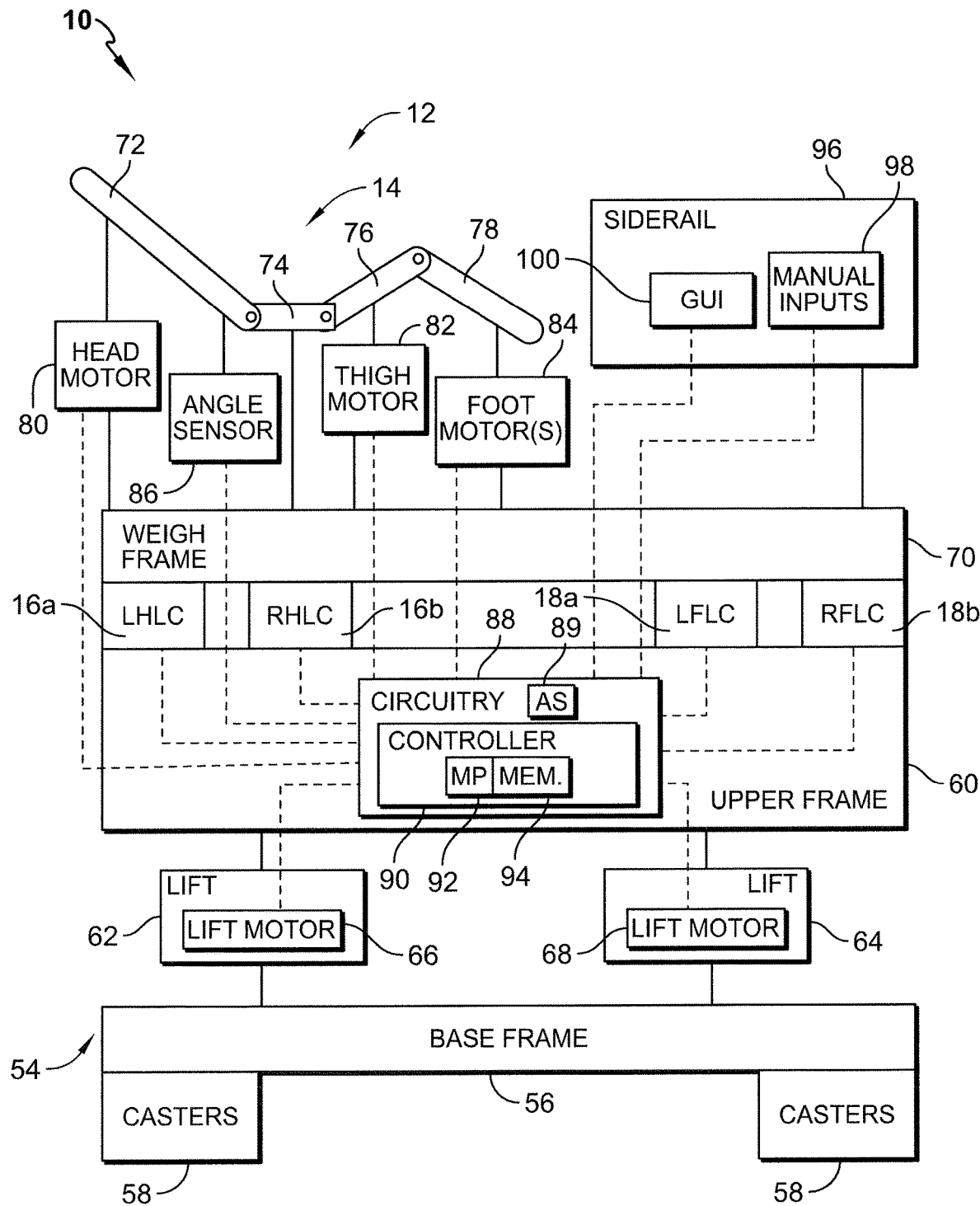
FIG. 5 is a block diagram of a patient bed in which the BCG of FIG. 1 is implemented.

Referring now to FIG. 5, bed 10 is shown in diagrammatic form to facilitate a discussion of bed components relevant to the BCG functionality of bed 10. Bed 10 includes a frame 54 including a base frame 56 with casters 58 coupled thereto for supporting bed 10 on an underlying floor (not shown). Frame 54 further includes an upper frame 60 supported above base frame 56 by a first lift 62 situated near the head end of bed 10 and a second lift 64 situated near the foot end of bed 10. Lifts 62, 64 include lift members such as lift arms and/or lift links and/or lift linkages and/or telescopic segments and/or jack screws or the like. Lift 62 includes a first lift motor 66 and lift 64 includes a second lift motor 68. Lift motors 66, 68 are operated to move the lift members to raise, lower and tilt upper frame (and the bed components supported thereby) relative to base frame 56. In some embodiments, lift motors 66, 68 are included in linear actuators that extend and retract to move the associated lift members.

Frame 54 of bed further includes a weigh frame 70 coupled to upper frame 60 by load cells 16a, 16b, 18a, 18b. In some embodiments, load cells 16a, 16b, 18a, 18b include a block of material (also known as a load beam), such as an aluminum block, and one or more strain gages mounted to the block of material. Deflection of the block of material due to an applied load changes the shape of the strain gages resulting in a change in the resistance of the strain gages. In some such embodiments, the strain gage of each load cell 16a, 16b, 18a, 18b includes resistive elements arranged in a Wheatstone bridge configuration. Generally, a known input voltage is applied to the strain gages and an output signal from the strain gages varies as the resistance of the strain gages vary to provide a signal indicative of the load applied to the load cell 16a, 16b, 18a, 18b. In other embodiments, sensors other than strain gages are included in load cells 16a, 16b, 18a, 18b and may comprise one or more of the following: a capacitor, a transducer using shaped magnetic field technology (e.g., a magnetostrictive sensor), an optical sensor, a transducer that emits electromagnetic energy, a transducer that receives electromagnetic energy, and a linear variable displacement transducer.

Referring once again to FIG. 5, mattress support deck 14 is included as part of frame 54 of bed 10 and is coupled to weigh frame 70 to be supported thereby. In the illustrative example, mattress support deck 14 includes a head section 72, a seat section 74, a thigh section 76, and a foot section 78. As indicated diagrammatically in FIG. 5, seat section 74 is mounted to or otherwise anchored to weigh frame 70. A head motor 80 interconnects head section 72 and weigh frame 70 and is operable to pivotably raise and lower head section 72 relative to seat section 74 and therefore, relative to weigh frame 70. In some embodiments, such as in the CENTRELLA® bed 10 mentioned above, the pivot joint about which head section 72 pivots also translates towards the head end of bed 10 in response to head section 72 being raised and translates towards the foot end of bed 10 in response to head section 72 being lowered. Due to the rudimentary nature of the FIG. 5 diagrammatic view, however, this compound motion of head section 72 has not been illustrated.

Still referring to FIG. 5, a thigh motor 82 interconnects thigh section 76 and weigh frame 70 and is operable to pivotably raise and lower thigh section 76 relative to seat section 74 and therefore, relative to weigh frame 70. A foot motor 84 interconnects foot section 78 and weigh frame 70 and is operable to pivotably raise and lower foot section 78 relative to thigh section 76. An angle sensor 86 is coupled to head section 72 and produces an output signal that is indicative of a head of bed (HOB) angle. Depending upon the type of angle sensor 86 used, the HOB angle is determined either with respect to weigh frame 70 or with respect to gravity (e.g., with respect to a horizontal or vertical plane). For example, in some embodiments, angle sensor 86 includes a rotary potentiometer, such as a rotary potentiometer included in head motor 80 or provided at the pivot joint between head section 72 and seat section 74 and/or frame 70. In other embodiments, angle sensor 86 includes an accelerometer (e.g., single-axis accelerometer or multi-axis accelerometer), inclinometer, one or more limit switches, one or more ball switches, one or more mercury switches, and the like that are mounted or otherwise coupled to head section 72.

Bed 10 further includes circuitry 88 carried by upper frame 60 in some embodiments as shown diagrammatically in FIG. 5. Although circuitry 88 is shown as a single block in FIG. 5, it should be understood that in some embodiments of bed 10 circuitry 88 includes multiple printed circuit boards (PCB's) with associated electrical components thereon for performing one or more dedicated functions. For example, one PCB may be dedicated to power control for bed 10 such as by receiving standard AC power from a power cord (not shown) of bed 10 that is plugged into an AC outlet, and converting the standard AC power into one or more DC voltages (e.g., 24 V, 9 V, 5V, etc.) for use by various components of bed 10. The power control PCB may include a battery charger to monitor and control charging of a battery (not shown) of bed 10. Another PCB may be dedicated to receiving and processing signals from load cells 16a, 16b, 18a, 18b and determining patient weight, for example. Such a PCB is sometimes referred to as a scale board by those skilled in the art. Another PCB in some embodiments includes one or more motor controllers that signal control of motors 66, 68, 80, 82, 84 and any other motors included in bed 10 (e.g., a foot section extension and retraction motor). Bed 10 also includes a master control board that controls various bed operations. The various PCB's are communicatively coupled to each other, or at least to master control board, in some embodiments. Some or all of the PCB's of circuitry 88 are mounted to various locations of bed 10 other than upper frame 60 in some embodiments.

Circuitry 88 includes a controller 90 that, in turn, includes one or more processors, such as a microprocessor 92, and memory 94. It is contemplated by the present disclosure that controller 90 of circuitry 88 may be embodied as, or otherwise be included in, without limitation, an embedded computing system, a System-on-a-Chip (SoC), a multiprocessor system, a processor-based system, a microcontroller, an application specific integrated circuit (ASIC), a field programmable gate array (FPGA), and/or any other similar computing device. The present disclosure also contemplates that memory 94 of circuitry 88 may be embodied as one or more of volatile memory, non-volatile memory, random access memory (RAM), read only memory (ROM), a media disk, magnetic disk, optical storage, flash memory devices, and other similar devices capable of storing software for controlling functions of bed 10 including the BCG functionality of bed 10. Thus, circuitry 88 of bed 10, including controller 90 of bed 10, is configured to implement bandpass filter 22, beat segmentation 24, and load cell BCG beats 38 blocks of FIG. 1, either in hardware or software or both. As such, the algorithms discussed above under the heading "METHODS" pertaining to load cell BCG functionality of bed 10 is implemented in software and/or hardware of circuitry 88 of bed 10.

In some embodiments, circuitry 88 of bed is configured to interface with ECG 28 to receive and process heart rate data for comparison with the heart rate determined based on load cell BCG data. Thus, circuitry 88 also includes communication circuitry in some embodiments for implementing wired and/or wireless communication with external devices such as ECG 28. In other embodiments, ECG 28 is integrated into bed 10 such that circuitry 88 includes an ECG module providing bed 10 with ECG functionality. Examples of beds having an ECG integrated therein are shown and described in U.S. Pat. No. 8,752,220 which hereby incorporated by reference herein for all that it teaches to the extent not inconsistent with the present disclosure. It is further contemplated by the present disclosure that some or all of the hardware and/or software functionality of the circuitry 88 may be embodied in a different location, such as in a computing device or circuitry in a different room or building from that of the patient bed 10. For example, in some embodiments, some or all of the hardware and/or software functionality of the circuitry 88 may be in a local server, a remote server, a cloud server, etc.

In the illustrative embodiment of FIG. 5, circuitry 88 further includes an angle sensor 89 such as an accelerometer (e.g., single-axis accelerometer, multi-access accelerometer, etc.), inclinometer, or the like to determine an angle at which upper frame 60 and the bed components supported thereby are tilted by lifts 62, 64 relative to base frame 56 or relative to gravity (e.g., horizontal or vertical). Alternatively or additionally, lifts 62, 64 may include sensors that produce signals that can be correlated to the angle at which upper frame 60 is tilted relative to base frame 56. For example, in some embodiments, motors 66, 68 may include rotary potentiometers that produce such signals.

As further shown diagrammatically in FIG. 5, bed 10 includes a siderail 96 having manual inputs 98 such as buttons or switches, including membrane switches, that are used to provide control inputs to circuitry 88 of bed to control bed functions such as operation of motors 66, 68, 80, 82, 84. Siderail 96 also carries a graphical user interface (GUI) 100 such as a touchscreen display that is also used to provide user inputs to circuitry 88 for controlling various bed functions such as the scale system of bed 10 that is used to weigh a patient and such as a pneumatic system that controls inflation of bladders of the mattress carried by mattress support deck 14. It is also contemplated by the present disclosure that GUI 100 is used to control the BCG functionality of bed 10 and also to display information, such as heart rate, determined by the BCG of bed 10. In FIG. 5, dashed lines are used to denote electrical connections between the various electrical components of bed 10 and circuitry 88.

As discussed above, load cells 16*a*, 16*b*, 18*a*, 18*b* are included in the weigh scale system of bed 10 and load cells 18*a*, 18*b* are included in the BCG of bed. The process described above for determining templates for various patient positions such as supine, right lying, left lying, seated, and prone can also be used in connection with various bed positions according to the present disclosure. The positions discussed above were based on patient position when upper frame 60 is level (i.e., substantially horizontal) with sections 72, 76, 78 of mattress support deck 14 in a flat position (i.e., substantially horizontal). However, similar templates can be generated by controller 90 when upper frame 60 is titled, such as being in a Trendelenburg position or reverse Trendelenburg position, as determined by controller 90 based on a signal from angle sensor 89. Additional templates can be generated for various positions of head section 72 as well. For example, templates when head section 72 is raised to about 30 degrees, about 45 degrees, about 60 degrees, about 80 degrees and fully raised (typically, in the range of about 75 degrees to about 88 degrees) are possible. In still further embodiments, in which one or more angle sensors are also provided for thigh section 76 and foot section 78 (similar to angle sensor 86 of head section 72), then templates can be generated by controller 90 for additional positions of frame 54 of bed 10 such as a cardiac chair position, a chair egress position, a knee gatch position, and so forth.

The present disclosure also contemplates that respiration rate of the occupant of bed 10 is determined by circuitry 88 of bed 10 based on output signals from one or more of load cells 16*a*, 16*b*, 18*a*, 18*b*. For example, the signals from load cells 18*a*, 18*b* that are processed by the BCG for determining the bed occupant's heart rate may also be processed to determine the occupant's respiration rate. In other embodiments, signals from load cells 16*a*, 16*b* are processed by circuitry 88 to determine the patient's respiration rate while signals from load cells 18*a*, 18*b* are still used by circuitry 88 for implementing the BCG of bed 10 to determine the occupant's heart rate.

In some embodiments, the output signals from only a single one of load cells 16*a*, 16*b*, 18*a*, 18*b* is used by circuitry 88 to determine the patient's respiration rate. The single load cell used may change from time to time. For example, signal noise may be determined for each of load cells 16*a*, 16*b*, 18*a*, 18*b* by circuitry 88 and then the load cell having the lowest signal noise is the one used for determining the occupant's respiration rate. In connection with determining the occupant's respiration rate, it is contemplated by the present disclosure that, whichever of the one or more output signals from load cells 16*a*, 16*b*, 18*a*, 18*b* is used for determining respiration rate, such one or more output signals are fed to a low pass filter and the output signals from the low pass filter are further processed to determine the occupant's respiration rate. For example, a low pass filter having a corner frequency or cutoff frequency of about 0.1 Hz to about 10.0 Hz may be used in some embodiments.

Figure 6:
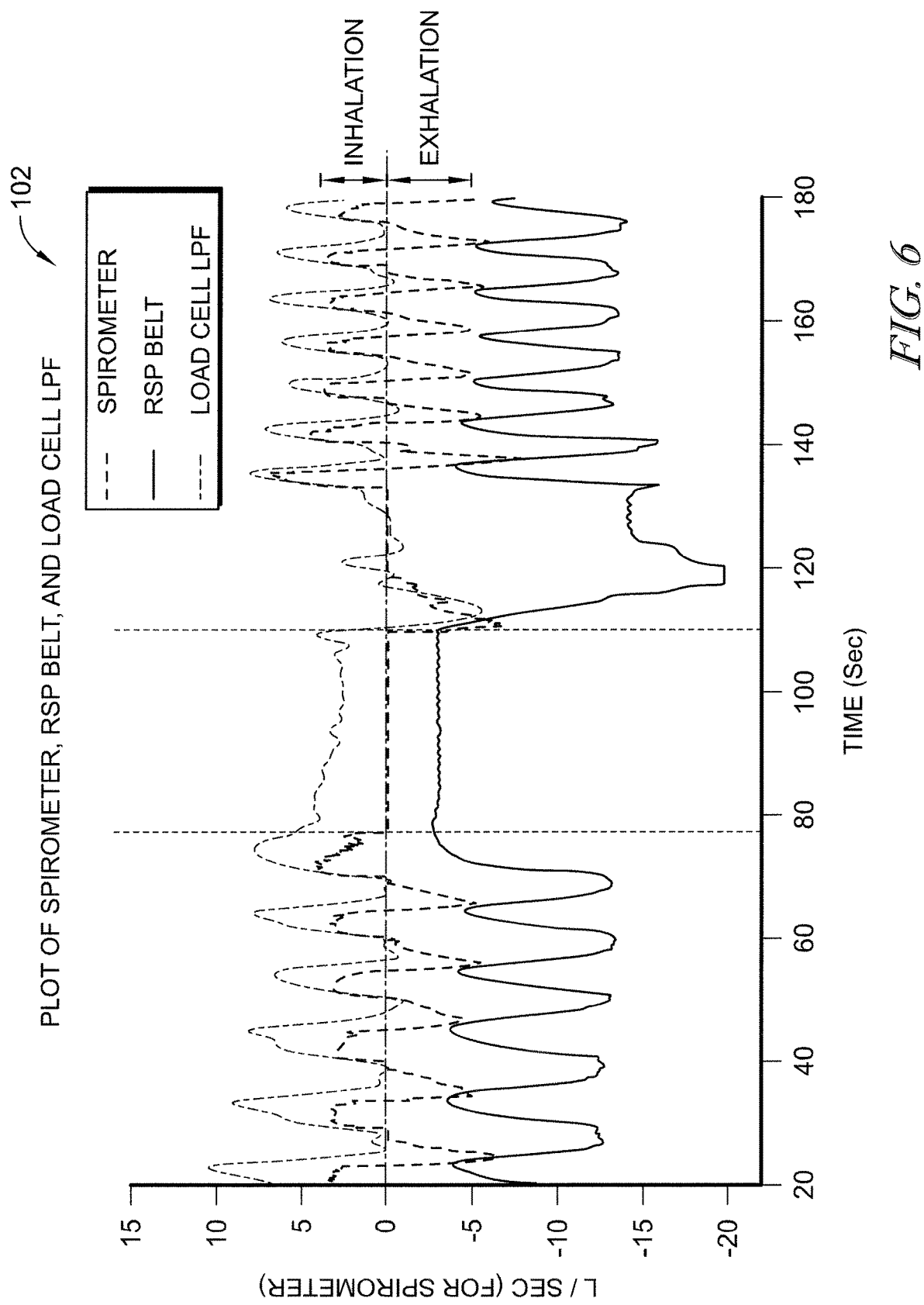
FIG. 6 is a graph showing traces for respiration as measured by a spirometer, a respiration belt, and a load cell signal that has been low pass filtered, with two of the three traces being offset upwardly and downwardly, respectively, on the y-axis relative to the x-axis to reduce the amount of overlap among the traces.

Referring now to FIG. 6, a graph 102 shows respective traces for respiration as measured by a spirometer, a respiration belt, and a load cell signal that has been low pass filtered. Two of the three traces are offset upwardly and downwardly on the y-axis of graph 102 relative to the x-axis to reduce the amount of overlap among the traces. The y-axis units of graph 102 is Liters per second (L/s) and the x-axis units of graph 102 is time in seconds(s). As is apparent in graph 102 of FIG. 6, the peaks and valleys of the respiration traces are substantially aligned vertically which is evidence that a low pass filtered signal from a load cell of bed 10, such as one of load cells 16*a*, 16*b*, 18*a*, 18*b*, is usable to determine the bed occupant's respiration and therefore, to determine the bed occupant's respiration rate. For example, by counting the number of peaks on the traces of graph 102 between 20 seconds and 80 seconds (i.e., a one minute amount of time), it can be seen that the test subject has taken 6 breaths over the course of that minute and so the respiration rate is 6 breaths per minute.

Figure 7:
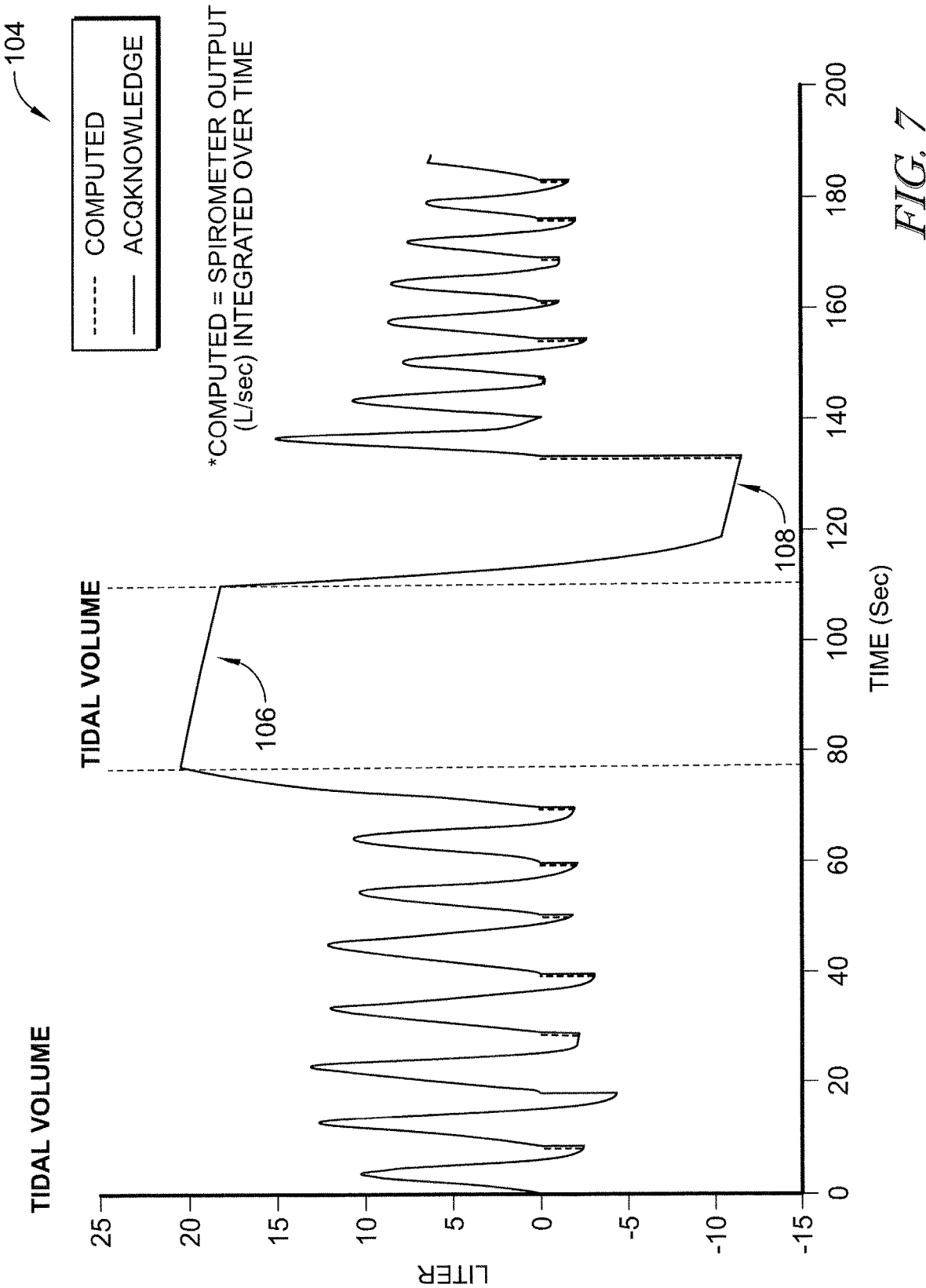
FIG. 7 is a graph of tidal volume showing, in the middle of the trace between the vertical dashed lines, a portion of the trace corresponding to a person holding their breath.

Referring now to FIG. 7, a graph 104 shows tidal volume, in Liters, vs. time in seconds. Graph 104 was generated using a spirometer output. A region 106 between the vertical dashed lines in graph 104 corresponds to the test subject holding their breath after a large inhalation. Region 108, which follows right after region 106 on graph 104, corresponds to the test subject making a large exhalation after holding their breath.

Figure 8:
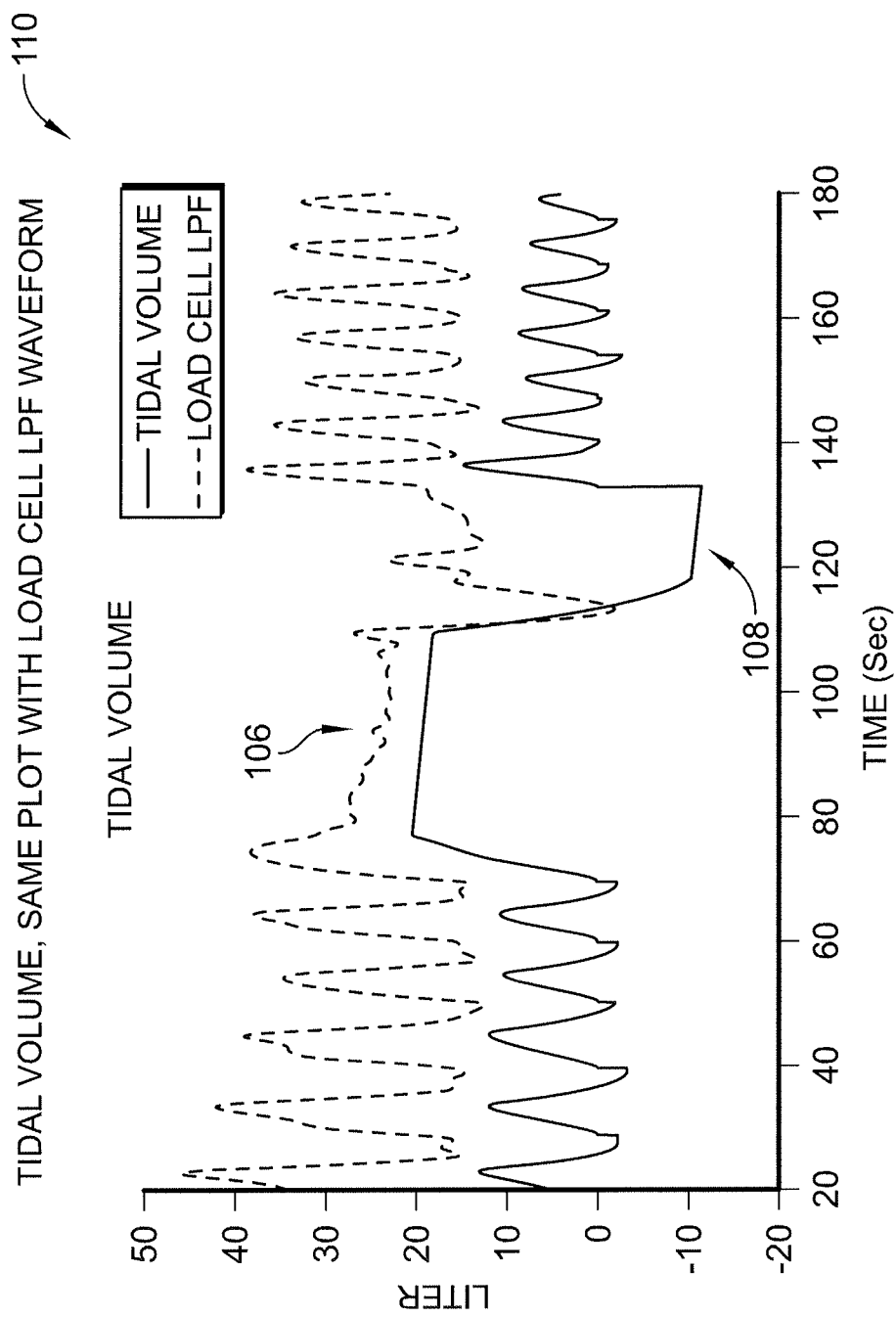
FIG. 8 is a graph showing traces for tidal volume as measured by a spirometer and with the load cell signal that has been low pass filtered.

Referring now to FIG. 8, a graph 110 shows traces for tidal volume as measured by the spirometer and by the load cell signal(s), from among load cells 16*a*, 16*b*, 18*a*, 18*b*, that has been low pass filtered. The two traces in graph 110 have their respective peaks and valleys substantially aligned vertically and also have regions 106, 108 substantially aligned vertically. This is evidence that a low pass filtered signal from a load cell of bed 10, such as one of load cells 16*a*, 16*b*, 18*a*, 18*b*, is usable to determine the bed occupant's tidal volume.

It is contemplated by the present disclosure that, in some alternative embodiments, a transformation is determined and applied without the need for a standing BCG measurement on a force plate, such as force plate BCG 20. For example, rather than measuring a template BCG from a force plate recording, a recording with a test subject in a test posture or test position on the bed 10 is used as a template. While the present disclosure contemplates that the test position or posture can be any position of the test subject (e.g., patient), such as the right, left, supine, sitting, prone, etc, position, in which a reference template is created for transformation to templates of other postures or position, the discussion below assumes that supine position of the test subject is the test position. Thus, the BCG signal from one or more of load cells 16*a*, 16*b*, 18*a*, 18*b* when the test subject is in the supine position is used as the reference signal as opposed to the standing position of the test subject on the force plate BCG 20. For example, signals from load cells 18*a*, 18*b* are used in one such embodiment. The signal processing algorithms and techniques discussed above are equally applicable to the embodiments in which the test subject in the supine position on bed 10 is used as the reference template. Signal Quality Index (SQI) a determined with respect to the supine position signals rather with respect to standing positon signals, for example. The box plots of FIGS. 4B and 4C are applicable to the contemplated alternative embodiments using supine position signals as the template.

In some embodiments, the method of capturing the supine waveforms to be used in determining the reference template while the test subject is in the supine position on bed 10 can be initiated by a caregiver or other healthcare facility personnel operating bed 10 for the purpose of finding a template to implement the transformations to other postures. GUI 100 of bed 10 receives user inputs in this regard. For example, a "capture supine waveforms" input is provided on GUI 100 of bed 10 and is selected. The waveform capturing process then proceeds for a predetermined amount of time, such as about 5 minutes, about 10 minutes, or about 15 minutes just to give some arbitrary examples, and then terminates automatically. Optionally, a "terminate waveform capture" input may be provided on GUI 100 so that the user can stop the waveform capture if the user notices that the test subject has moved out of the supine position during the waveform capture process.

Alternatively or additionally, the waveform capture process is initiated in response to a user of bed 10 taking a patient weight with the weigh scale system of bed 10. In some such embodiments, GUI 100 displays a message to the user to coach the patient to move into and maintain a supine position prior to, and during, the waveform capture process. Further alternatively or additionally, the waveform capture process is initiated in response to controller 90 of circuitry 88 of bed 10 and/or an independent system (e.g., system external to bed 10 such as a camera system, patient worn position sensor, and the like that is operable to classify the patient as being in the supine position) detecting that the patient has, in fact, moved into the supine position. In some such embodiments, controller 90 makes the supine position determination based on signals from one or more of load cells 16a, 16b, 18a, 18b.

In the discussion above, the term "test subject" was used in connection with determining various reference templates such by using force plate BCG 20 or bed 10 with the test subject in a test position, such as the supine position. The present disclosure contemplates that the test subject may or may not be the same person as the patient supported on bed 10. That is, the present disclosure contemplates that the test subject and the patient may be one in the same person, but this is not necessarily the case such that the test subject and the patient may be different people as well.

In another embodiment, a probabilistic approach to measuring an Accurate Ballistocardiogram Based Heart Rate Estimation Using an Array of Load Cells in a Hospital Bed is disclosed. As discussed above, the ballistocardiogram (BCG), a cardiac vibration signal, has been widely investigated forcontinuous monitoring of heart rate (HR). Among BCG sensing modalities, a hospital bed 10 with multi-channel load-cells provides robust HR estimation in hospital setups. The study resulting in this embodiment aimed to explore a technique to effectively exploit load-cell channels on a hospital bed to accurately estimate the heart rate of a user by optimizing the fusion of information from multiple channels. Disclosed herein, a new array processing technique is presented, which includes the application of Gaussian weights on a joint probability density function (PDF) and the similarity score called the q-value to assess those PDFs. The Gaussian curve weights the joint probability according to the reference value obtained from the previous inter-beat-interval (IBI) estimations. The PDFs were selected and combined according to their reliability measured by q-values. The study demonstrated that this array processing significantly reduces the HR estimation error by comparing the performance of selective channel combinations to the existing multi-channel algorithm. The statistical evaluation disclosed herein shows that each step of the array processing significantly reduces the HR estimation error. In the best case, the average mean absolute error (MAE) of 1.76 bpm in the supine position was achieved compared to 2.68 bpm and 1.91 bpm for two state-of-the-art methods from the existing literature. Moreover, in contrast to prior work which focused mainly on supine posture only, the error was analyzed according to the posture of the user to quantify postural effects on HR estimation. The lowest error was found in the supine posture (1.76 bpm), and the highest in the lateral posture (3.03 bpm). The IBI estimation capability was also evaluated, with a MAE of 16.66 ms and confidence interval (95%) of 38.98 ms. The results demonstrate that improved HR estimation can be obtained for a bed-based BCG system with the multi-channel data acquisition and processing approach described in this embodiment.

V. INTRODUCTION

As discussed above, continuous vitals monitoring is pivotal for managing and treating cardiovascular diseases, the leading causes of death globally amounting to 17.6 million deaths per year. See, E. J. Benjamin, P. Muntner, A. Alonso, M. S. Bittencourt, C. W. Callaway, A. P. Carson, A. M. Chamberlain, A. R. Chang, S. Cheng, S. R. Das, F. N. Delling, L. Djousse, M. S. Elkind, J. F. Ferguson, M. Fornage, L. C. Jordan, S. S. Khan, B. M. Kissela, K. L. Knutson, T. W. Kwan, D. T. Lackland, T. T. Lewis, J. H. Lichtman, C. T. Longenecker, M. S. Loop, P. L. Lutsey, S. S. Martin, K. Matsushita, A. E. Moran, M. E. Mussolino, M. O'Flaherty, A. Pandey, A. M. Perak, W. D. Rosamond, G. A. Roth, U. K. Sampson, G. M. Satou, E. B. Schroeder, S. H. Shah, N. L. Spartano, A. Stokes, D. L. Tirschwell, C. W. Tsao, M. P. Turakhia, L. B. VanWagner, J. T. Wilkins, S. S. Wong, and S. S. Virani, "Heart Disease and Stroke Statistics-2019 Update: A Report From the American Heart Association," Circulation, 2019. In hospital settings, continuous monitoring of physiological parameters enables early detection of degeneration in patients. Improving the access to continuous cardiac monitoring to all patients on hospital beds could reduce the number of days per hospital stay or deaths related to cardiac arrest and "code blue" events. See, C. Mathukia, W. Fan, K. Vadyak, C. Biege, and M. Krishnamurthy, "Modified Early Warning System improves patient safety and clinical outcomes in an academic community hospital," Journal of Community Hospital Internal Medicine Perspectives, 2015 and, Z. Zhang, Z. Pi, and B. Liu, "TROIKA: A general framework for heart rate monitoring using wrist-type photoplethysmographic signals during intensive physical exercise," IEEE Transactions on Biomedical Engineering, 2015 (hereinafter "Zhang and Pi").

Continuous physiological measurement includes invasive, non-invasive, and unobtrusive approaches. Invasive approaches require insertion of sensors into the body, such as catheters or arterial lines, and are the most accurate means of monitoring overall physiological status of patients. Non-invasive approaches use sensors placed on the skin for detection of biosignals (e.g., electrocardiograms are frequently used in cardiac patients for continuous monitoring of heart rhythm and rate. Unobtrusive approaches such as non-contact measurements where the sensor is not even touching the patient directly are preferred whenever possible, but are not commonly employed in hospital settings since their accuracy is typically limited compared to invasive or non-invasive counterparts. However, even non-invasive solutions can be uncomfortable and impractical in some situations, such as for patients who require multiple medical sensors attached to their body, infants who have small body surface area, or burn victims. See, C. H. Lund, L. B. Nonato, J. M. Kuller, L. S. Franck, C. Cullander, and D. J. Durand, "Disruption of barrier function in neonatal skin with adhesive removal," Journal of Pediatrics, 1997 (hereinafter "Lund"), and "Wireless and Non-contact ECG Measurement System—the "Aachen SmartChair"," Acta Polytechnica, 2007. Moreover, the costs of using ECG measurement systems ubiquitously for all patients in hospital settings would be unrealistically high for such a solution to be feasible broadly.

An unobtrusive measurement modality that has been investigated over the past decade for cardiovascular sensing is ballistocardiography (BCG) signal. See, Inan and Migeotte. The BCG is a cardiogenic vibration signal resulting from the micro-displacement of the whole body caused by the movement of blood through the cardiovascular tree. See, Kim and Ober. The BCG can be measured unobtrusively without any attachment of sensors or electrodes to the body. BCG measurement systems can be instrumented into various form factors including bathroom scales (see, O. T. Inan, D. Park, L. Giovangrandi, and G. T. Kovacs, "Non-invasive measurement of physiological signals on a modified home bathroom scale," IEEE Transactions on Biomedical Engineering, 2012) and chairs (see, H. J. Baek, G. S. Chung, K. K. Kim, and K. S. Park, "A smart health monitoring chair for nonintrusive measurement of biological signals," IEEE Transactions on Information Technology in Biomedicine, 2012). In hospital settings, bed-mounted sensors can be deployed to capture BCG signals throughout the day while the patient is on the bed 10. Commercially available bed-based BCG sensing systems for both hospital and at-home settings include Emfit (Vaajakoski, Finland) (see, T. Reinvuo, M. Hannula, H. Sorvoja, E. Alasaarela, and R. Myllyla¨, "Measurement of respiratory rate with high-resolution accelerometer and EMFit pressure sensor," in Proceedings of the 2006 IEEE Sensors Applications Symposium, 2006 (hereinafter "Reinvuo")), EarlySense (Ramat Gan, Israel) (see, E. Zimlichman, M. Szyper-Kravitz, Z. Shinar, T. Klap, S. Levkovich, A. Unterman, R. Rozenblum, J. M. Rothschild, H. Amital, and Y. Shoen-feld, "Early recognition of acutely deteriorating patients in non-intensive care units: Assessment of an innovative monitoring technology," Journal of Hospital Medicine, 2012 (hereinafter "Zimlichman"), and Beddit (Espoo, Finland) (see, J. Tuominen, K. Peltola, T. Saaresranta, and K. Valli, "Sleep parameter assessment accuracy of a consumer home sleep monitoring ballistocar-diograph beddit sleep tracker: A validation study," Journal of Clinical Sleep Medicine, 2019 (hereinafter "Tuominen"))—all of which are systems providing a single channel of BCG output.

Though each bed-based BCG system demonstrated promising results for continuous vitals monitoring (see, Reinvuo; Zimlichman; Tuominen; M. Helfand, V. Christensen, and J. Anderson, Technology Assessment: Early Sense for Monitoring Vital Signs in Hospitalized Patients. 2011; and M. Tenhunen, J. Hyttinen, J. A. Lipponen, J. Virkkala, S. Kuusima¨ki, M. P. Tarvainen, P. A. Karjalainen, and S. L. Himanen, "Heart rate variability evaluation of Emfit sleep mattress breathing categories in NREM sleep," Clinical Neurophysiology, 2015), such systems can be expensive, and require auxiliary sensing hard-ware beyond what is installed in the bed 10 itself. To deploy such systems, the sensor (often piezoelectric film) should be installed on existing hospital beds as an additional accessory. Periodic replacement of the sensor is then required due to the limited lifetime of the piezoelectric material, which can wear out in 1-2 years in some cases. See, J. K. Kimotho, T. Hemsel, and W. Sextro, "Estimation of Remaining Useful Lifetime of Piezoelectric Transducers Based on Self-Sensing," IEEE Transactions on Reliability, 2017. Most importantly, as mentioned above, such single-channel systems can exhibit a substantial drop in coverage depending on the posture of the person on the bed or the location of the body with respect to the sensor. See, C. Bru¨ser, J. M. Kortelainen, S. Winter, M. Tenhunen, J. Pa¨rkka¨, and S. Leonhardt, "Improvement of force-sensor-based heart rate estimation using multichannel data fusion," IEEE Journal of Biomedical and Health Informatics, 2015 (hereinafter "Kortelainen").

To this end, the load-cell based BCG system described in this disclosure has benefits over piezoelectric systems in that the BCG sensing hardware matches the lifetime of the bed, and the approach is cost-effective as load-cells are already embedded in many hospital beds to weigh patients or detect falls. As described with regard to the bed 10 above, load-cells are often located in each of the four corners of the hospital bed 10, immediately allowing for multiple channel comparisons. This enables robust estimation of physiological parameters by broadening the spatial coverage of the system to capture the BCG signals and thus achieve high coverage, i.e., rejection of fewer signal segments. Though previous work (see, Kortelainen) has shown that multi-channel systems can outperform single-channel systems, many studies tend to focus on simply averaging multiple channels in the time-domain or individually processing each channel. Few studies have been published on signal processing approaches for the effective utilization of multiple-channel knowledge for improved estimations.

In this disclosure, an improvement in heart rate (HR) estimation from bed BCG signals using a new sensor array processing technique is demonstrated. Based on a probabilistic approach to estimate the inter-beat-interval (IBI), and the Bayesian fusion of channels introduced in the previous studies (see, Kortelainen and, C. Bru¨ser, S. Winter, and S. Leonhardt, "Robust inter-beat interval estimation in cardiac vibration signals," Physiological Measurement, 2013 (hereinafter "Winter")), a selective fusion of channels according to the assessment of the probability density function (PDF) obtained from each channel is presented. To do so, a modified q-value to assess each PDF's reliability, in addition to Gaussian weights, to produce a weighted joint PDF is introduced. An evaluation of the algorithm's performance with the array processing against existing multi-channel and weighted multi-channel fusion methods on the data collected from 11 healthy subjects with the hospital bed was conducted. The improvement in HR estimation using this method is validated by analyzing statistical significance and postural error analysis. Also presented is analysis on the heartbeat interval estimation results on a beat-to-beat level.

VI. METHODS

A. Human Subjects Study and Instrumentation

Figure 9:
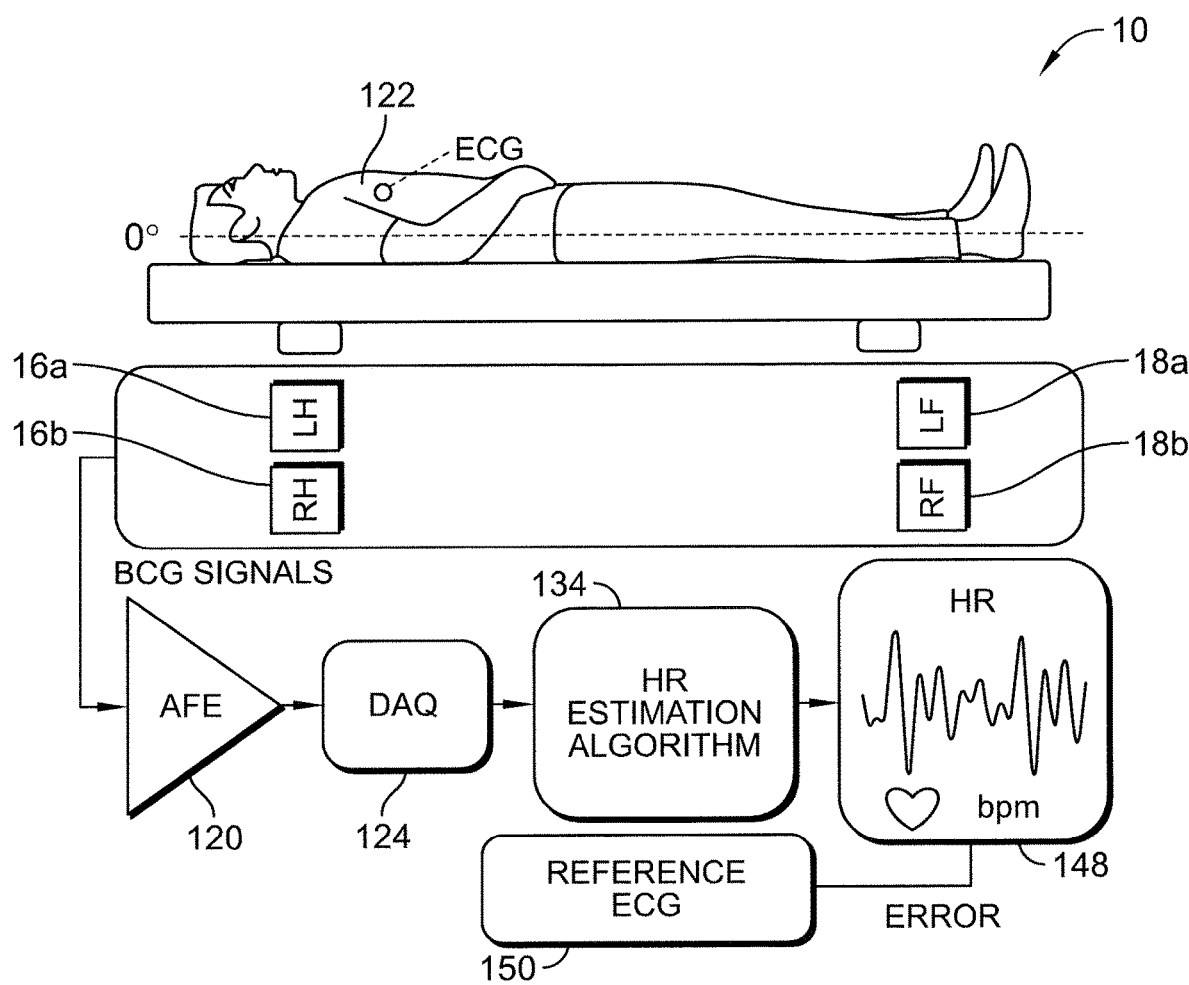
FIG. 9 is a diagrammatic representation of a test setup according to a second embodiment of the present disclosure.

Eleven subjects (Male: 6, Female: 5; Age: 27.8+/−4; Weight: 71.54+/−19.5 kg; Height: 172.27+/−12.3 cm) without any known history of cardiovascular diseases were recruited for the human subjects study. The study was conducted under the approval of the Georgia Institute of Technology Institutional Review Board (IRB). During the protocol, each subject laid down in a relaxed position on the patient bed (Centrella™, Hill-Rom), as shown in FIG. 9.

Subjects were asked to lay in five different postures, including supine, left and right lateral, prone, and seated, for one minute each. The seated posture required the bed to be adjusted to the seated configuration.

To obtain ballistocardiogram (BCG) signals, the outputs from the four load cells 16a, 16b, 18a, 18b located on the four corners of the bed frame 60—left/right of head and foot—under the mattress were fed into a custom-designed analog front end (AFE) 120. The AFE 120 was designed similarly to that found in O. T. Inan, M. Etemadi, R. M. Wiard, L. Giovangrandi, and G. T. Kovacs, "Robust ballistocardiogram acquisition for home monitoring," Physiological Measurement, 2009. Along with the BCG, three electrodes 122 were placed on each subject's chest to acquire the ECG in Lead II configuration. The ECG signal was recorded to acquire a ground truth heart rate comparison for the evaluation and was not required for the actual implementation of the BCG-based heart rate estimation. Both ECG and BCG signals were continuously recorded via a data acquisition unit 124 (DAQ, MP150, Biopac Systems) with a sampling rate of 80 Hz, but linearly interpolated to 1 kHz for the analysis. Interpolation is required for the inter-beat-interval analysis in ms resolution and is not required for window-based heart rate estimation.

B. Pre-Processing

Figure 10A:
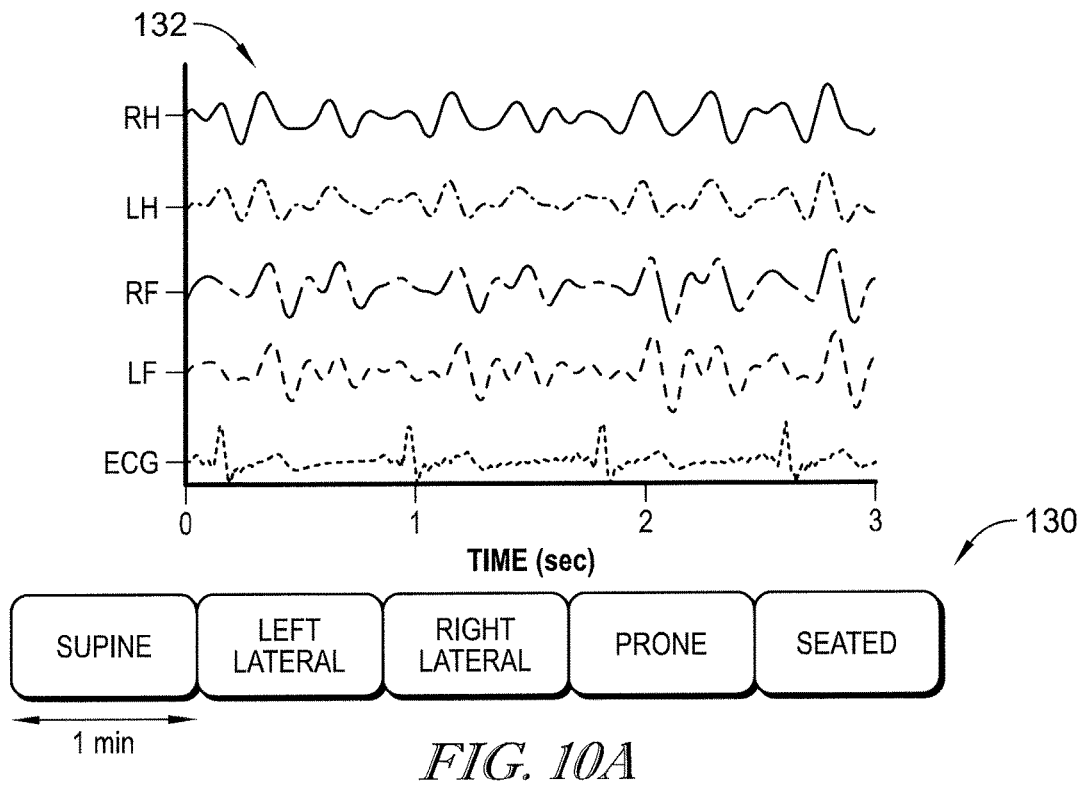
FIG. 10A is an graphical example of recorded BCG and electrocardiogram (ECG) signals using a depicted protocol for gathering data according to the test setup of FIG. 9.
Figure 10B:
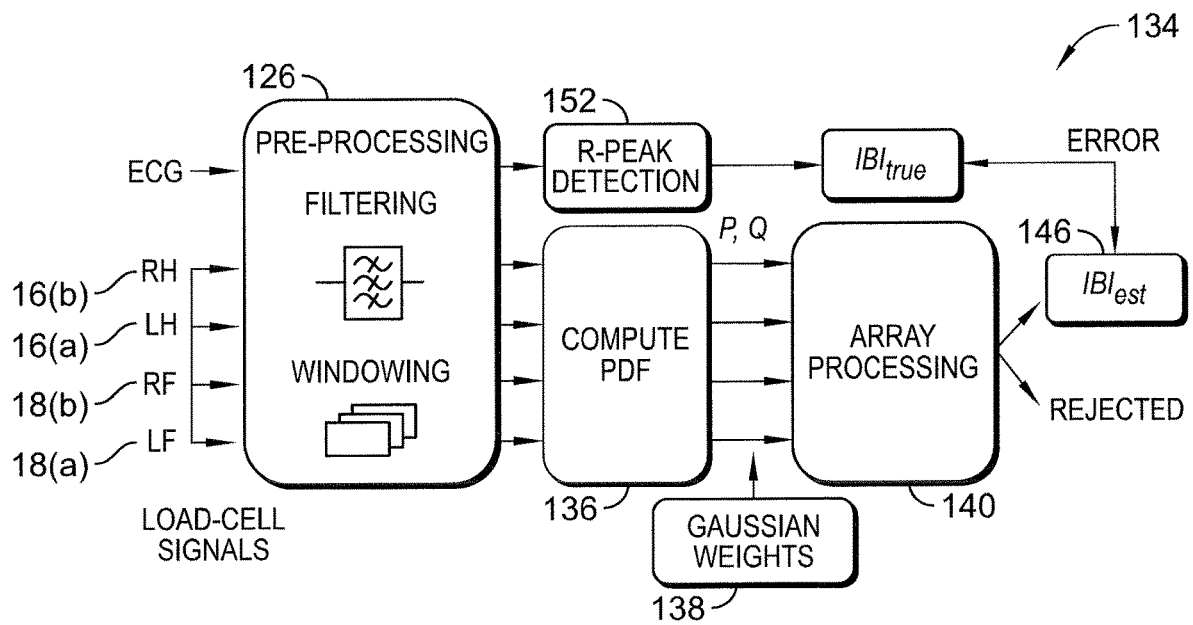
FIG. 10B is a block diagram of a heart rate estimation algorithm of the second embodiment.

All signals were pre-processed at step 126, as shown in the block diagram in FIG. 10B. BCG and ECG signals were filtered using a finite impulse response (FIR) band-pass filter with Kaiser window. Cut-off frequencies were 1-40 Hz for ECG, and 0.5-12 Hz for BCG. R-peaks of the ECG were found at step 152 using a simple threshold peak detection method, and the intervals between those R-peaks were used as a reference for inter-beat intervals.

For both BCG and ECG, one-minute recordings of each posture were segmented into a 3-second long window as suggested at 130 in FIG. 10A. The time shift between consecutive windows was 0.1 seconds. The window size was chosen as 3 seconds to ensure that each window includes at least two heartbeat cycles assuming 1.5 seconds (40 bpm) as the maximum heartbeat interval. FIG. 10A shows an example plot 132 of the windowed signals.

C. Heart Rate Estimation Algorithm

The heart rate for each window was estimated by finding the window's averaged IBI. The algorithm 134 in this embodiment was based on previous studies (see, Kortelainen; Winter; C. H. Antink, H. Gao, C. Bru¨ser, and S. Leonhardt, "Beat-to-beat heart rate estimation fusing multimodal video and sensor data," Biomedical Optics Express, 2015 (hereinafter "Antink and Gao"), and C. H. Antink, Y. Mai, J. Ranta, A. Tamiceriu, C. Bru¨ser, S. Leonhardt, N. Oksala, and A. Vehkaoja, "On the Performance of Bed-Integrated Ballistocardiography in Long-Term Heart Rate Monitoring of Vascular Patients," in Computing in Cardiology, 2019 (hereinafter "Antink and Mai")) with the addition of a new multi-channel fusion technique which selectively combines the channels through assessment of PDFs. The algorithm 134 comprises six steps, as will be explained in the following sections. A brief overview of the procedure is shown in FIG. 10B. All steps except the beat-to-beat interval estimation in Section II-C-(6) were performed in an online manner. Specifically, the estimations were made based on only the past and current windows so that the heart rate determination could be made in real-time.

1) Computation of Probability Density Function (PDF):

For the IBI estimation, the probabilistic approach in Winter was deployed. Given a window with a length longer than two times the maximum possible IBI, this method computes the likelihood for each candidate IBI being the true heartbeat interval of the window. In this work, the range of candidate IBI's was set to [400-1500] ms with the resolution of 1 ms. The algorithm 134 computes three time-domain local estimators, namely—adaptive-window autocorrelation (Corr), adaptive-window average magnitude difference function (AMDF), and maximum amplitude pairs (MAP). Three local-estimators are then combined to obtain the joint probability density function (PDF) at step 136, and the IBI estimate Tis given as follows:

$$p = P(N|\text{Corr}, AMDF, MAP) \qquad (1)$$
$$= P(N|\text{Corr}) \cdot P(N|AMDF) \cdot P(N|MAP)$$
$$\hat{T} = \underset{T}{\mathrm{argmax}} P(N|\text{Corr}, AMDF, MAP) \qquad (2)$$

This algorithm was initially implemented and validated for single-channel BCG signals (see, Winter). However, the later study, Kortelainen, demonstrated an improvement in performance with a multi-channel extension which computes and combines 3N estimators (three local-estimators/channel X N channels) from all N channels through Bayesian fusion.

2) Gaussian Weight Curve:

To make the algorithm 134 more robust to the sudden corruption of BCG signals caused by motion artifacts, the obtained PDFs P (P∈$R^{N\times 4}$, $p_c$∈P, c=channels) were weighted according to the distance between the reference value ($\text{ref}_i$) and each candidate IBI ($\text{IBI}_{cand}$). A similar approach was taken in other studies (see, Antink and Gao and, Antink and Mai), but the reference value (i.e. the center of the curve) was computed differently. Additionally, rather than applying the weights during the post-processing as done in Antink and Gao, and Antink and Mai, the weights were computed and applied online in this work. The reference value ($\text{ref}_i$) for window i was determined as the exponential moving average of the most recent 50 estimations before window i. Accordingly, the method described here can be implemented in near-real-time for immediate display of heart rate for caregivers.

The motivation behind this idea is to reduce large deviations in IBI estimations among consecutive windows that could be caused by sudden motion artifacts and not by physiological changes. In subjects with normal cardiac rhythm, physiological parameters such as heart rate or heart rate variability do not change dramatically within 50 windows, which corresponds to 7.9 seconds. See, G. G. Berntson, J. Thomas Bigger, D. L. Eckberg, P. Grossman, P. G. Kaufmann, M. Malik, H. N. Nagaraja, S. W. Porges, J. P. Saul, P. H. Stone, and M. W. Van Der Molen, "Heart rate variability: Origins methods, and interpretive caveats," 1997, and K. Umetani, D. H. Singer, R. McCraty, and M. Atkinson, "Twenty-four hour time domain heart rate variability and heart rate: Relations to age and gender over nine decades," Journal of the American College of Cardiology, 1998. Thus, 8-second window lengths are commonly used in many HR estimation studies (see, Zhang and Pi and, Z. Zhang, "Photoplethysmography-based heart rate monitoring in physical activities via joint sparse spectrum reconstruction," IEEE Transactions on Biomedical Engineering, 2015). The Gaussian weight curve for window i is given as follows.

$$w_i = \frac{1}{2k} \cdot \exp\left(\frac{|ref_i - IBI_{cand}|}{2k'}\right)^2 \quad (3)$$

$$ref_i = ema(IBI_{est,i-50:i})$$

The parameters k, and k were heuristically determined so that the curve width at 0.5 becomes approximately 700 ms. Among the recent 50 estimations, only the ones that meet all the criteria in Section II-D-(2) were included. The exponential moving average length was set to 10, to place more weight on estimations closer in time to the current window.

Additional possibly incorrect previous estimations were removed if the variability between the minimum and maximum estimations in the previous 50 IBI estimations was greater than 500 ms. In such cases, the points that lay outside the [5-95] percentile range were rejected before computing $ref_i$. The computed Gaussian weight curve was only applied to PDFs at step 138 when there were more than 50 robust previous IBI estimations. Raw PDFs were used before a sufficient number of solid estimations was obtained.

D. Load-Cell Array Processing

1) PDF Assessment:

The load cell processing occurs at step 140 and includes the quality of weighted PDFs from each channel being assessed based on the q-values, the ratio between the maximum peak height and the area of the curve, as described in Lund. Ideally, a robust PDF should only have one prominent peak for the most likely candidate IBI. However, as shown in FIG. 12A-12E, a noisy signal can result in multiple peaks at multiple candidate IBIs in the PDF. The most likely candidate IBI chosen from such a PDF may not be reliable, resulting in a significant estimation error. In the example shown in the plot, all channels but the left head show unreliable IBI estimations, resulting in the most likely IBI substantially differing from the true IBI shown as the vertical line 142.

Having multiple peaks in the PDF leads to smaller q-values in general due to increased area under the curves. However, to further penalize the case where the PDF contains multiple peaks, the q-values were adjusted by the number of prominent peaks found. Here, the prominent peaks were defined as peaks with a peak height of over 60% of the maximum peak in the PDF. Note that only the candidate IBI with the maximum peak was used as the final IBI estimation, and the other peaks detected were used to count the number of peaks in the PDF and adjust q-values. The following expresses the computation of the q-value for channel c ($q_c$), given $M_c$ as the number of prominent peaks and $p_c \in R^N$ as the PDF.

$$q_c = \frac{1}{M_c} \cdot \frac{\max(p_c)}{\sum_{j=0}^{N} p_c(j)} \quad (4)$$

2) Channel Selection and Combination:

After the q-values from all four channels $Q=[q_1, q_2, q_3, q_4]$ were calculated for a window, the window and channels were selected according to the following criteria:

Criteria 1 (window selection): At least one q-value from the four channels must be larger than the threshold.

$$\max(Q) > Q_{threshold} \quad (5)$$

Criteria 2 (channel selection): Channels must have a q-value over 70% of the maximum q-value among the four channels for the window $$\{c | q_c > \max(Q) \times 0.7\} \quad (6)$$

First, a window i that does not meet criteria 1 was considered to have unreliable PDFs for all channels and rejected. If the window met the first criteria, the channels with relatively large q-values were selected based on criteria 2 and combined via a Bayesian approach.

The IBI estimation was obtained as the candidate IBI at which the combined probability is the greatest. The remaining channels that were not selected were also combined to obtain a secondary IBI estimation in case the first IBI estimation deviated significantly from the reference value ($ref_i$). The primary and secondary IBI estimations are denoted as $IBI_{est,1}$ and $IBI_{est,2}$ respectively.

3) Determine the Final IBI Estimation:

As the last step 146 to prevent large estimation error, the absolute differences between the $ref_i$, the center of the Gaussian weights, and the first and secondary IBI estimations were checked. By default, the algorithm chooses the first IBI estimation as the IBI estimation. However, if the secondary IBI estimation shows an absolute difference much smaller than that of the first IBI estimation—by 250 ms—then the secondary IBI estimation is selected as the final IBI estimation. This is to prevent the case where a highly selective PDF with high q-value prefers a prominent peak with candidate IBI seriously differing from the true IBI.

The array processing procedure in Section D is summarized in Algorithm 1.

---

Algorithm 1 Load-cell Array Processing

Input: P, $IBI_{ref,i}$
Output: $IBI_{est,i}$
1: for each window i do
2:    Q = assessPDF(P)     ▷ Get q-values
3:
4:    if max(Q) < $Q_{threshold}$) then     ▷ Criteria 1
5:      Reject window i
6:    else
7:      selected = {c | $q_c$ ≥ max(Q) * 0.7}    ▷ Criteria 2
8:      remaining = {c | c ∉ selected}
9:
10:     for each channel c do    ▷ Channel combination
11:       if c ∈ selected then
12:         joint1 ← joint1 · P(c)
13:       else
14:         joint2 ← joint2 · P(c)
15:       end if
16:     end for
17:       ▷ Get estimations from joint probabilities
18:     joint1 · $w_i$ → $IBI_1$, $d_1$ =| $IBI_1$ − $IBI_{ref,i}$ |
19:     joint2 · $w_i$ → $IBI_2$, $d_2$ =| $IBI_2$ − $IBI_{ref,i}$ |
20:     $IBI_{est}$ = $IBI_1$     ▷ $IBI_1$ as default
21:
22:     if d2 < d1 − 250 ms then ▷ Final IBI estimation
23:       $IBI_{est,i}$ = $IBI_2$
24:     end if
25:   end if
26: end for

---

E. Heartbeat Interval Estimation

The heartbeat estimation occurs at 148 in FIG. 9. Based on IBI estimations from the algorithm above, possible heartbeat locations were found as done in Winter. For each window i, given the center of the window as $W_{mid}$, the maximum peak within the range of $[W_{mid}, W_{mid}+IBI_{est,i}]$ was found and denoted as the anchor point $J_i$. Detected anchor points can be considered as possible locations for the BCG J-peak, the maximum BCG heartbeat peak following the ECG R-peak.

As the PDF estimation algorithm was built on the assumption that each window includes at least two heartbeat cycles-one on each side of the window center—the estimated IBI reflects the interval between the heartbeat pair around the window center. As a result, it can be assumed that the second J-peak of the heartbeat pair would exist no further than $IBI_{est,i}$ from the window center.

Due to the short time shift of 0.1 seconds between windows, the same anchor point would appear multiple times across a few consecutive windows. The anchor points detected in three or more windows were considered as the final J-peak candidates. The estimated IBIs of each J-peak candidate were then averaged together for IBI analysis.

Let the averaged IBI's and the anchor point be denoted as $[T_k, J_k]$, ($T_k=IBI_{est,k}$, $k \in$ J-peak candidates). For the anchor point detection procedure, a "virtual" single channel was created by subtracting the foot channels from the head channels—(RH+LH)-(RF+LF)—as done in S. Isono, N. Nozaki-Taguchi, M. Hasegawa, S. Kato, S. Todoroki, S. Masuda, N. Iida, T. Nishimura, M. Noto, and Y. Sato, "Contact-free unconstraint respiratory measurements with load cells under the bed in awake healthy volunteers: Breath-by-breath comparison with pneumotachography," Journal of Applied Physiology, 2019. The anchor points above were detected in the "virtual" channel using the IBI estimated from the multi-channel algorithm. The anchor point detection method is described in more detail in Winter.

VII. EVALUATION

A. Window-Based HR Estimation

1) Evaluation Scenarios:

The performance of window-based HR estimation was evaluated for three different scenarios to investigate the effects of array processing. The three scenarios include—1) multi-channel fusion (see, Kortelainen), 2) weighted multi-channel fusion, and 3) the presented algorithm, weighted multi-channel fusion with the array processing. For all scenarios, the signal segments with motion artifacts were removed with the same criteria. Each scenario was performed as follows:

Scenario 1: Multi-Channel Fusion

The IBI was estimated from the joint PDF computed through the Bayesian fusion of all four channels.

Scenario 2: Weighted Multi-Channel Fusion

The joint PDF was computed through the Bayesian fusion of all four channels. The joint PDF was then weighted by the Gaussian curve described in Section II-C-2.

Scenario 3: Weighted Multi-Channel Fusion with Array Processing

PDFs from the four channels were processed via array processing as described in Section II-D. The array processing includes the application of Gaussian weight curves, assessment of PDFs via q-values, and some rejection criteria for quality assurance.

For the analysis of the postural effects on HR estimation, the errors were evaluated by postures for all cases.

2) Error Metrics:

The reference ECG 150 was used to validate the HR estimated with the load-cell BCG signals. The ECG R-R intervals in the window were averaged together and served as the ground truth averaged IBI interval ($IBI_{ECG,i}$). Ground truth HR of the window i was then computed as:

$$HR_{ECG,i} = \frac{60}{IBI_{ECG,i}} \quad (7)$$

The HR estimation ($HR_{BCG,i}$) was computed in the same way with estimated IBIs from BCG. The error between the ground truth and estimation was reported in mean absolute error (beats per minute, bpm), and percent error (%), along with the coverage (%).

B. Heartbeat Interval Estimation

For the validation of the heartbeat interval estimation, each J-peak candidate ($P_k$) was mapped to the closest ECG R-peak and the corresponding R-R interval. The averaged estimated IBIs ($T_k$) paired with each J-peak candidate were compared against the mapped ECG R-R intervals. The mean absolute error in ms along with the width of the limits of agreement ([5-95] percentile range) are reported here.

Note that the detected J-peak candidates were not used to compute the heartbeat intervals but were used to map estimated IBIs to the corresponding ECG R-R intervals.

VIII. RESULTS

A. Window-Based HR Estimation

Figure 11:
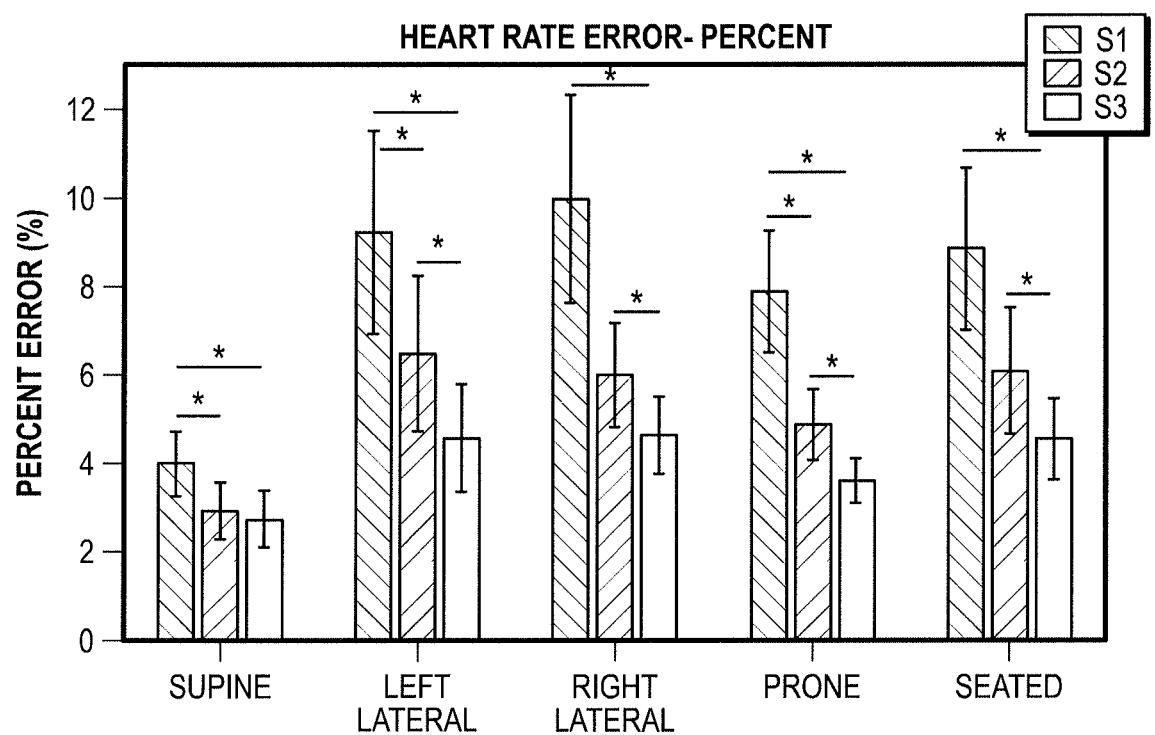
FIG. 11 is a plot comparing the heart rate estimation error percentage that was found using various approaches of the second embodiment, as compared to a known sample.
Figure 12A:
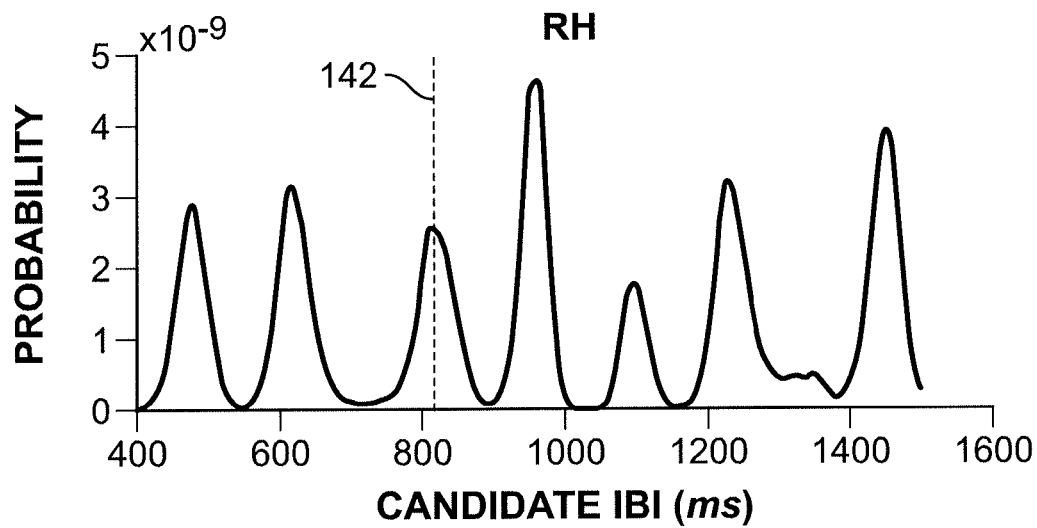
FIG. 12A-12D is each a plot of an estimated probability density function of from the signals from each of the load cells of the second embodiment.
Figure 12B:
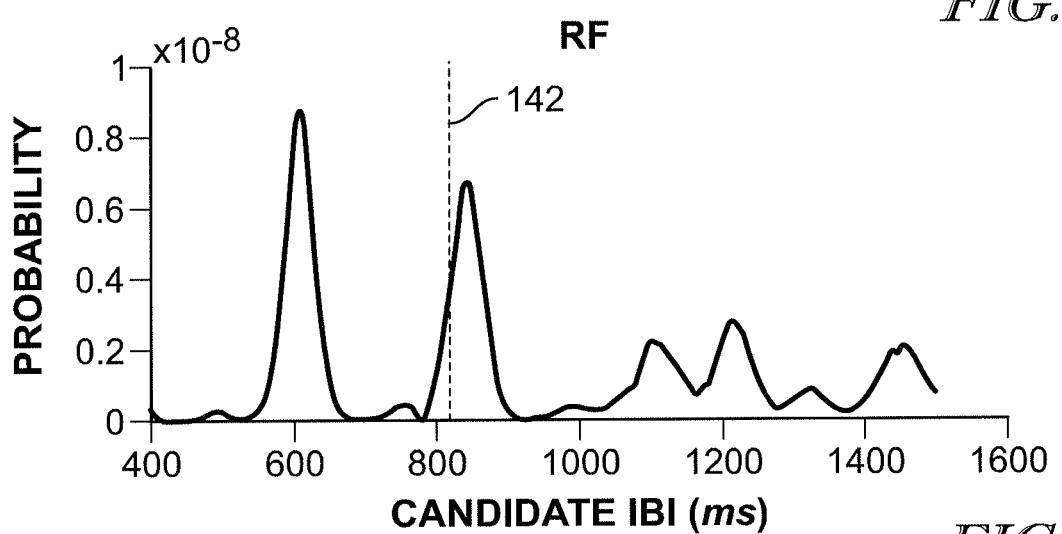
Figure 12C:
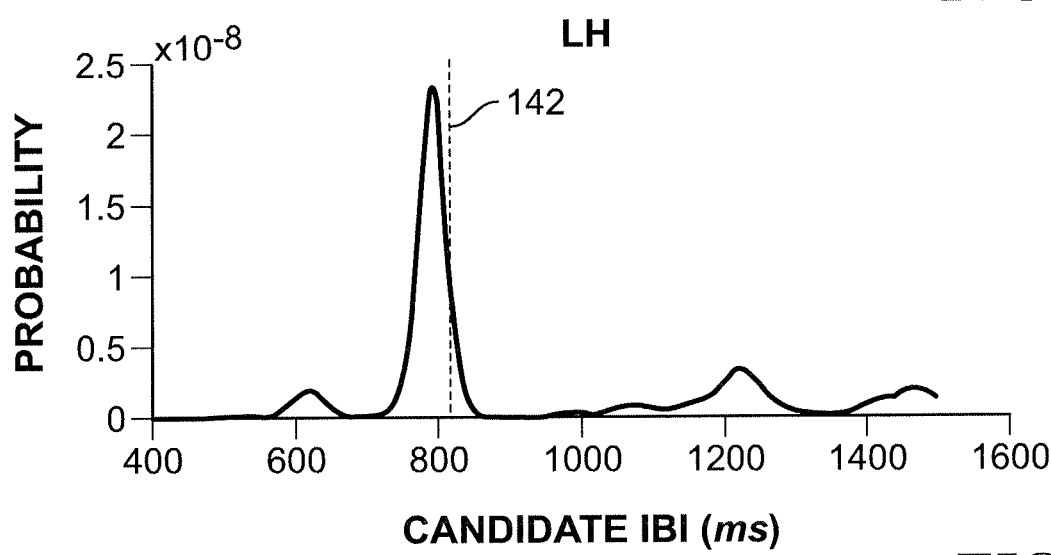
Figure 12D:
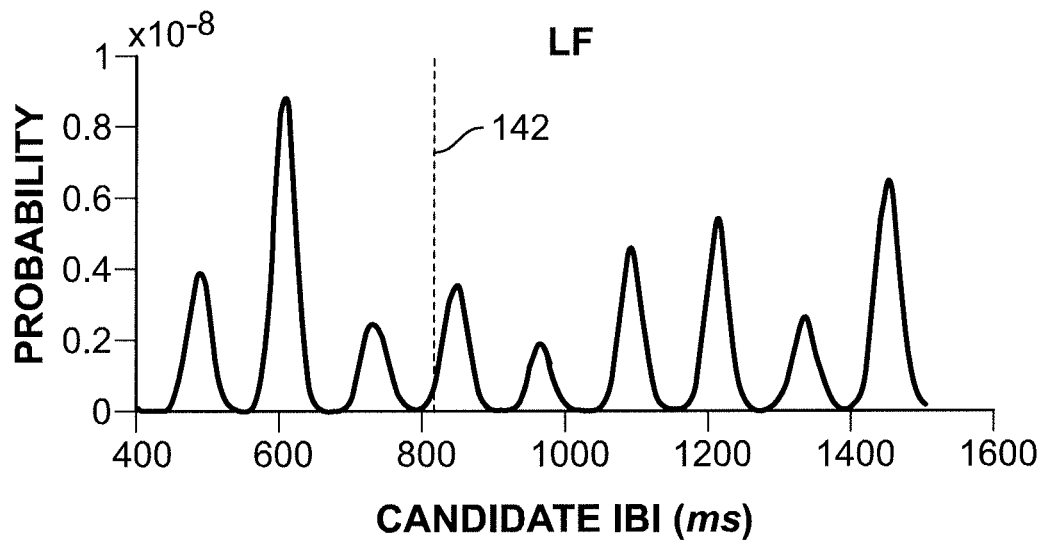
Figure 12E:
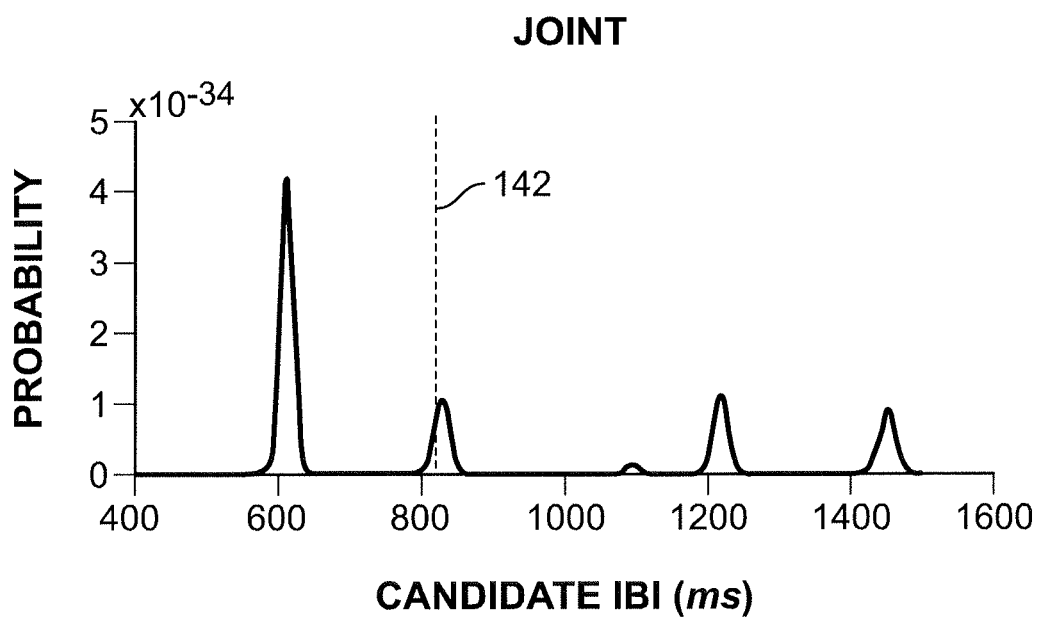
FIG. 12E is plot of the joint estimated probability distribution function of the four load cells utilizing the approach used in the algorithm of FIG. 10B.
Figure 13A:
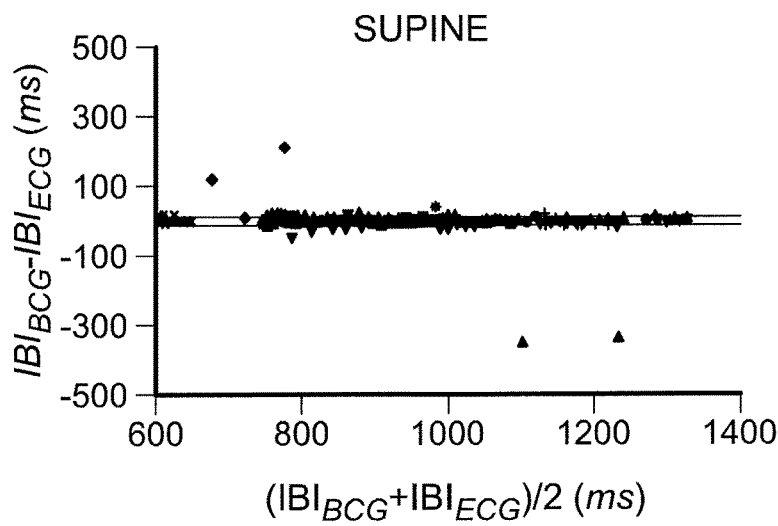
FIG. 13A-13E is a plot of the Bland-Altman plots for the heartbeat interval estimation, with each figure showing the plot of data for a given patient position identified in the title of the plot.
Figure 13B:
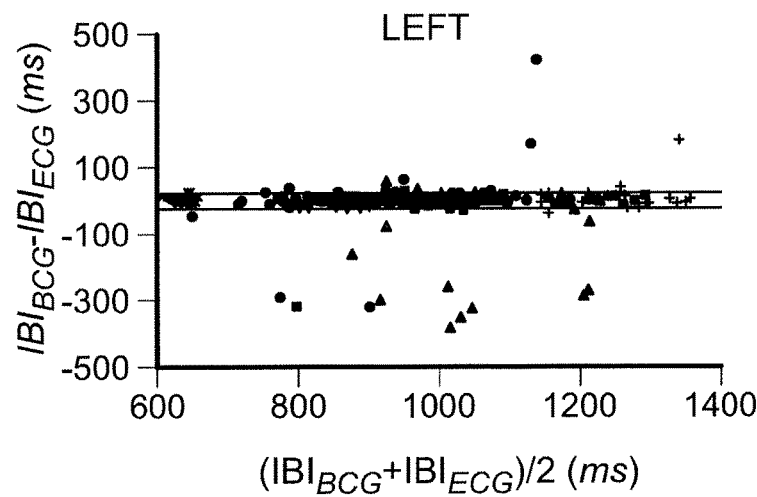
Figure 13C:
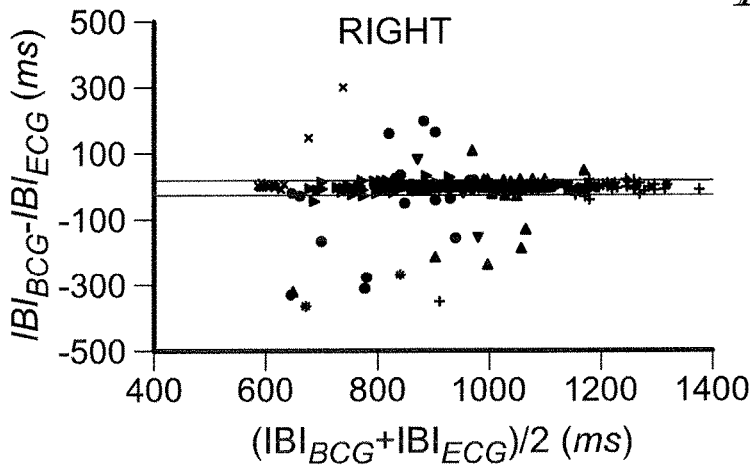
Figure 13D:
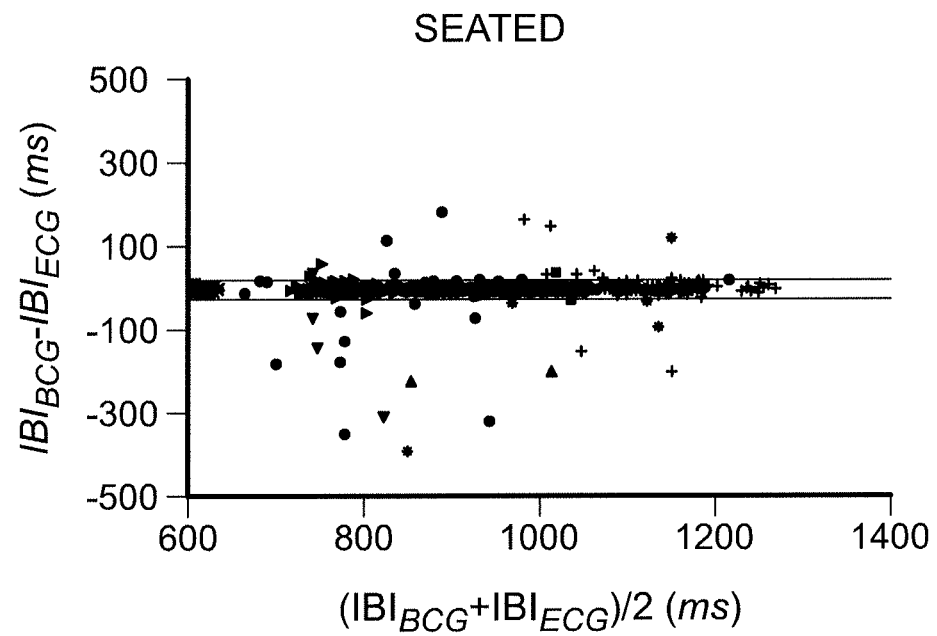
Figure 13E:
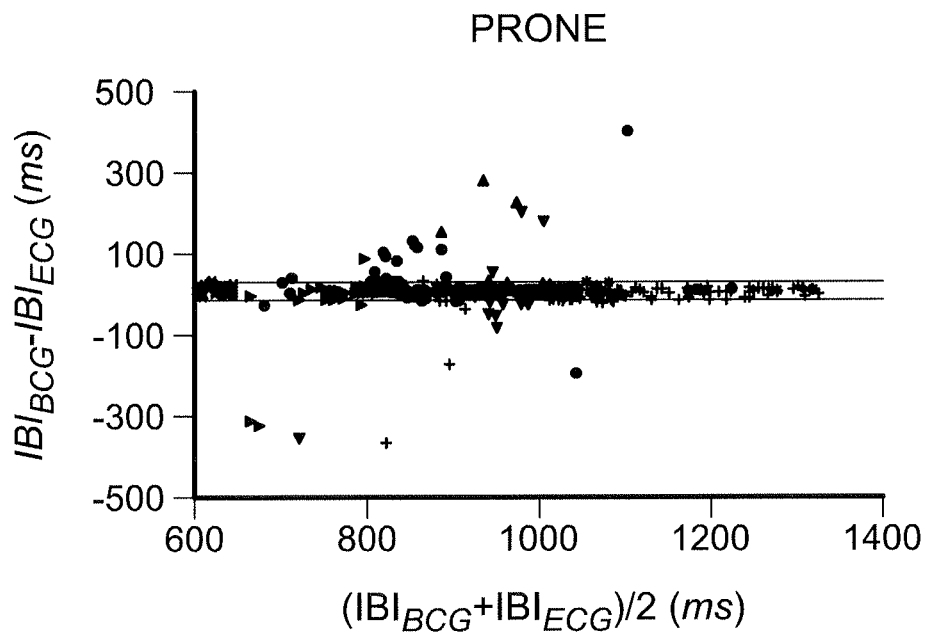

FIG. 11 shows the bar plots of mean absolute error (MAE) for each scenario and posture. Across all postures, estimation errors were lower in scenario 3 compared to the other two scenarios, at the average MAE of—1.76 bpm for supine, 2.88 bpm and 3.03 bpm for lateral postures, 2.42 bpm for prone, and 2.98 bpm for the seated posture. Following scenario 3, scenario 2 achieved an average lowest MAE of 1.96 bpm for supine and highest of 4.33 bpm for the right lateral posture. The errors computed for scenario 1 were higher than those in scenarios 2 and 3 in all postures. For posture-wise analysis, the lowest errors were achieved in the supine posture and the highest in lateral postures across all scenarios. Table I, presented in FIG. 14, shows the detailed MAE values for each patient, scenario, and posture.

Statistical significance of the relative error (Erel) and MAE was tested using a paired t-test with a 95% significance level to evaluate the differences in the error between each scenario. Comparing scenario 2 to scenario 1, the relative error and MAE were significantly decreased in scenario 2 for supine, left lateral, and prone postures, but not for right lateral and seated postures.

The relative error was significantly decreased in scenario 3 compared to scenarios 2 and 1 for all postures except one case—the difference between scenario 2 and 3 for the supine posture. Similar results were observed for the MAE, but the difference between scenario 3 and 1 in right lateral and seated postures was not significant, but close to significance with p-values of 0.07 and 0.05 respectively. Here, the mean coverage across all patients for each posture decreased in scenario 3 compared to the other two scenarios, but the coverage was still over 93% for all postures, which falls into a reasonable range of coverage in terms of usability.

B. Heartbeat Interval Estimation

For further assessment of IBI estimations given by the algorithm, the estimated IBIs were evaluated for heartbeat interval estimation, as described in Section III-B. FIGS. 5A-E shows the Bland-Altman plot for each posture in scenario 3. Although not shown in FIGS. 5A-E, the mean absolute error ($E_{abs}$) and the width of limits of agreement given by the $5^{th}$ and $95^{th}$ percentiles of the error are given for the other two scenarios in Table II presented below. Similar to the HR estimation, a lower mean absolute error and narrower width of agreement were achieved in scenario 3 in general. By posture, the lowest errors were achieved in the supine position with a MAE of 8.72 ms and width of agreement of 25.70 ms. Wider spread in errors was observed for other postures, as shown in the Bland-Altman plots. With heartbeats from all postures together, MAE and the width of agreement were 16.66 ms and 38.98 ms, respectively.

The results for HR and heartbeat interval estimation demonstrate improvements in performance with weighted probabilities and selective channel combinations. The statistical significance in the difference between scenarios 2 and 1 for HR estimation shows that the weighted joint PDF reduces the error compared to using an unweighted joint PDF in general, except for the challenging postures-lateral and seated postures. This implies a need for selective channel combinations for challenging postures to achieve a further reduction in the HR estimation error.

IX. DISCUSSION

The statistical significance in HR estimation between scenario 3 and the other two scenarios, along with the heartbeat interval estimation error, demonstrates that the performance improvement resulted from the array processing combined with the weighted PDFs. Notably, the differences between scenarios 3 and 2 for postures except supine validates the further improvement achieved by adding an array processing procedure in the algorithm. For the supine posture, the error is already minimal in all scenarios, 2.68 bpm, 1.91 bpm, and 1.76 bpm, respectively. Therefore it is considered to be at the lower limit of the probabilistic approach. For the right lateral and the seated postures-seemingly challenging postures from the results in this work-scenario 2 could not achieve a significant reduction in error while the significance was observed with scenario 3. This result demonstrates that array processing further decreased the error in addition to Gaussian weights, either by rejecting the corrupted channels or windows in challenging postures that could result in distorted joint PDFs and thus high estimation error.

The coverage is also an important metric for the evaluation of HR and heartbeat interval estimation. Decreasing the error by excluding a large portion of the data is undesirable in terms of usability. However, having the capability to automatically detect and reject segments that contain heavily corrupted heart-beats from which any methods cannot make robust estimations is important. A small decrease in coverage for the array processing could have resulted from the rejection of such windows while maintaining the coverage at over 93% for all postures.

TABLE II

ACCURACY OF HEARTBEAT INTERVAL ESTIMATION

| Posture | $E_{abs}$ (ms) | | | $P_5$ (ms) | | | $P_{95}$ (ms) | | | $(P_{95} - P_5)$ | | |
|---|---|---|---|---|---|---|---|---|---|---|---|---|
| | $S_1$ | $S_2$ | $S_3$ | $S_1$ | $S_2$ | $S_3$ | $S_1$ | $S_2$ | $S_3$ | $S_1$ | $S_2$ | $S_3$ |
| Supine | 13.77 | 9.18 | 8.72 | −12.50 | −12.02 | −12.00 | 14.60 | 13.03 | 13.70 | 27.10 | 25.05 | 25.70 |
| Left | 51.72 | 35.13 | 20.77 | −149.90 | −37.20 | −26.00 | 152.80 | 26.40 | 20.32 | 302.70 | 63.60 | 46.32 |
| Right | 55.05 | 30.57 | 22.37 | −37.70 | −52.10 | −28.15 | 351.70 | 23.00 | 20.00 | 389.40 | 75.10 | 48.15 |
| Prone | 39.96 | 20.11 | 15.37 | −27.85 | −25.57 | −19.00 | 40.77 | 24.00 | 25.05 | 68.62 | 49.58 | 44.05 |
| Seated | 50.15 | 28.23 | 17.36 | −81.75 | −44.80 | −27.57 | 309.45 | 33.00 | 19.02 | 391.20 | 77.80 | 46.60 |

The accuracy of heartbeat interval estimation is given in mean absolute error ($E_{abs}$), $5^{th}$ percentile ($P_5$) of error, $95^{th}$ percentile ($P_{95}$) of error, and the width of agreement ($P_{95} - P_5$). Errors are shown by posture and scenario.

Overall, the lowest errors were achieved in the supine posture and the highest in lateral postures across all scenarios for both HR and heartbeat interval estimation. This variability in HR estimation error across postures is expected, as the bed-based BCG is known to be susceptible to postural effects. See, Inan and Migeotte. These are due to coupling of the head-to-foot and dorso-ventral forces in the BCG measurement depending on the person's posture on the bed. Moreover, the substantial decrease in signal quality in the seated posture in Javaid and Wiens provides a basis for the high estimation errors in the seated posture. Relatively high errors in the lateral and seated postures are shown across all scenarios in this work. Among the three scenarios, however, the lowest variability between each posture was observed in scenario 3, showing it is more robust to postural changes than the other methods analyzed.

Systems with multiple, spatially distributed sensors better capture the cardiac vibration signal and outperform the single-channel system in HR estimation, as demonstrated in Kortelainen. The Bayesian fusion approach, which obtains the joint PDF by combining the PDF of each channel through element-wise multiplication, is shown to provide improved performance over simple time-domain averaging. The robustness of this method results from requiring all the channels, through multiplication in probability, to have high probability value in PDF around the candidate IBI chosen as the final estimation. However, this also suggests that having even one noisy channel with the PDF value of almost zero at the true IBI can zero-out the joint probability at that true IBI when combined with all other channels via the Bayesian approach. Depending on the posture or the location of the patient's body on the bed, it is likely that some portion of the channels are corrupted while the others are not. FIG. 4 shows an example of such cases. In this case, the left head channel alone has the most likely IBI at the true IBI, expressed as a red vertical line in the plots. However, the joint PDF computed by the Bayesian fusion of all channels, including the unreliable ones, resulted in the most likely IBI substantially differing from the true IBI, as can be seen in the plot. The assessment of PDFs using q-values in array processing could handle such cases and thus reduce the overall error.

X. CONCLUSION

This study demonstrates robust estimation of heart rate and heartbeat intervals using BCG signals obtained from the four load-cell sensors embedded in a hospital bed. The array processing technique in this work significantly improves performance by selective channel fusion/rejection via quality assessment and a Gaussian weight curve. The results suggest this technique further optimizes the benefits of a multi-channel system, which is already known to outperform a single channel system. In addition, postural error analysis validates the improved robustness of the method to postural changes.

The evaluation of this work was done with a data set collected in a lab setting over a short period of time, which limits the generalization of these results to actual use in hospital settings for a more extended recording period. Future work should be done with data collected from hospital settings through overnight study to validate the algorithm against real-world challenges. Additionally, the current study was tested on young and healthy subjects in stable condition. Future work should explore the broader population under various physiological conditions (i.e., higher heart rate), and include older patients and patient groups with cardiovascular diseases to optimize the accuracy of the algorithm. The ability to continuously monitor heart rate and heartbeat intervals from patients in hospital beds with the methods described in this paper could ultimately provide breakthrough advances in early detection of patient deterioration, and reduce the need for more systems to be worn on the body. The robustness of the array processing approach to postural differences greatly enhances the translational potential of the work, since patients are not always in a supine posture in hospital settings. Finally, leveraging load-cell sensors already embedded in commonly-deployed commercially available hospital beds (Centrella) would allow for broad utilization of these methods in many settings, without the requirement for auxiliary sensing hardware to be purchased and maintained.

When terms of degree such as "substantially" and "about" are used herein in connection with a numerical value or a qualitative term susceptible to a numerical definition (e.g., vertical, horizontal, aligned), it is contemplated that an amount that is plus or minus 10 percent, and possibly up to plus or minus 20 percent, of the numerical value is covered by such language. For example, "vertical" may be defined as 90 degrees from horizontal and so "substantially vertical" according to the present disclosure means 90 degrees plus or minus 9 degrees, and possibly up to plus or minus 18 degrees. The same tolerance range for "substantially horizontal" is also contemplated. Otherwise, a suitable definition for "substantially" is largely, but not necessarily wholly, the term specified.

Although certain illustrative embodiments have been described in detail above, variations and modifications exist within the scope and spirit of this disclosure as described and as defined in the following claims.

The invention claimed is:

1. A patient bed comprising:
 a frame configured to support a patient,
 a weigh scale coupled to the frame and configured to weigh a patient supported by the frame of the patient bed, the weigh scale having four load cells that produce signals from which a patient weight is determined,
 a ballistocardiogram carried by the frame, wherein the ballistocardiogram includes ballistocardiogram circuitry in electrical communication with only two of the four load cells of the weigh scale, wherein signals from the only two of the four load cells being processed by the ballistocardiogram circuitry to determine a heart rate of the patient, wherein a low pass filtered signal from at least one of the four load cells is processed by the ballistocardiogram circuitry to determine a tidal volume of the patient, and
 a graphical user interface (GUI) carried by the frame and coupled electrically to the ballistocardiogram circuitry, the GUI being usable to provide inputs to a pneumatic system that controls inflation of bladders of a mattress of the patient bed, wherein the bladders overlie the four load cells, the GUI also being operable to display an input to capture supine waveforms to be used in determining a reference template for the ballistocardiogram while the patient is lying supine on the mattress.

2. The patient bed of claim 1, wherein the signals from the only two of the four load cells also are processed by the ballistocardiogram circuitry to determine a respiration rate of the patient.

3. The patient bed of claim 1, wherein the frame has a head end and a foot end, and wherein the only two of the four load cells are situated closer to the foot end than to the head end.

4. The patient bed of claim 1, wherein the heart rate is determined based on a comparison of the signals from the two of the four load cells to at least one template waveform generated previously during a force plate ballistocardiogram test of a test subject in a standing position on a force plate ballistocardiogram.

5. The patient bed of claim 4, wherein the comparison involves the circuitry accounting for a posture of the patient relative to the frame.

6. The patient bed of claim 5, wherein the posture accounted for by the circuitry includes one or more of the following: supine, left lying, right lying, prone, or seated.

7. The patient bed of claim 5, wherein the ballistocardiogram circuitry is configured to implement a transformation function that maps the signals from the two of the four load cells corresponding to left lying, right lying, prone or seated postures to the supine posture.

8. The patient bed of claim 4, wherein the comparison involves the ballistocardiogram circuitry using a signal quality index (SQI) that is determined as a function of an inverse of a distance between the signals from the two of the four load cells and the respective at least one template waveform.

9. The patient bed of claim 8, wherein the distance is determined by the circuitry using a dynamic-time feature matching (DTFM) technique.

10. The patient bed of claim 4, wherein the comparison involves the ballistocardiogram circuitry calculating a Pearson correlation coefficient.

11. The patient bed of claim 4, wherein the ballistocardiogram circuitry includes at least one finite impulse response (FIR) band-pass filter with a Kaiser window through which the signals from the two of the four load cells are fed prior to reaching a controller.

12. A patient bed comprising:
a frame configured to support a patient,
a weigh scale coupled to the frame and configured to weigh a patient supported by the frame of the patient bed, the weigh scale having a plurality of load cells that produce signals from which a patient weight is determined,
a ballistocardiogram carried by the frame, wherein the ballistocardiogram includes ballistocardiogram circuitry in electrical communication with the plurality of load cells, wherein the signals from at least some, but not all, of the plurality of load cells being processed by the ballistocardiogram circuitry to determine a heart rate of the patient by comparing signals from the at least some, but not all, of the plurality of load cells to at least one template waveform generated previously during a ballistocardiogram test of a test subject in a test position on the patient bed, wherein a low pass filtered signal from at least one load cell of the plurality of load cells is processed by the ballistocardiogram circuitry to determine a tidal volume of the patient, and
a graphical user interface (GUI) carried by the frame and coupled electrically to the ballistocardiogram circuitry, the GUI being usable to provide inputs to a pneumatic system that controls inflation of bladders of a mattress of the patient bed, wherein the bladders overlie the plurality of load cells, the GUI also being operable to display an input to capture supine waveforms to be used as the at least one template waveform while the patient is lying supine on the mattress.

13. The patient bed of claim 12, wherein comparing signals involves accounting for a posture of the patient relative to the frame.

14. The patient bed of claim 13, wherein the posture accounted for includes one or more of the following: supine, left lying, right lying, prone, or seated.

15. The patient bed of claim 13, wherein a transformation function is used to map the signals corresponding to left lying, right lying, prone or seated postures to the supine posture.

16. The patient bed of claim 12, wherein comparing signals involves using a signal quality index (SQI) that is determined as a function of an inverse of a distance between the signals and the respective at least one template waveform.

17. The patient bed of claim 16, wherein the distance is determined by using a dynamic-time feature matching (DTFM) technique.

18. The patient bed of claim 12, wherein comparing signals involves calculating a Pearson correlation coefficient.

19. The patient bed of claim 12, wherein the ballistocardiogram circuitry determines the heart rate by feeding the signals through at least one finite impulse response (FIR) band-pass filter with a Kaiser window prior to comparing the signals to the respective at least one template waveform.

* * * * *